United States Patent
Anvari

(10) Patent No.: US 11,142,194 B1
(45) Date of Patent: Oct. 12, 2021

(54) USE OF IOT NETWORK AND IOT RANGING DEVICE FOR AN OBJECT CONTROL SYSTEM

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 0 days.

(21) Appl. No.: 17/187,691

(22) Filed: Feb. 26, 2021

Related U.S. Application Data

(63) Continuation-in-part of application No. 17/145,151, filed on Jan. 8, 2021, now Pat. No. 11,052,851, and a
(Continued)

(51) Int. Cl.
| | |
|---|---|
| *B60W 30/09* | (2012.01) |
| *B60R 21/01* | (2006.01) |
| *B60W 50/00* | (2006.01) |
| *G01S 13/93* | (2020.01) |
| *G01S 13/58* | (2006.01) |

(Continued)

(52) U.S. Cl.
CPC ......... *B60W 30/09* (2013.01); *B60R 21/0134* (2013.01); *B60W 50/0098* (2013.01); *G01S 13/06* (2013.01); *G01S 13/58* (2013.01); *G01S 13/931* (2013.01); *G01S 13/933* (2020.01); *G06F 16/951* (2019.01); *B60W 2420/42* (2013.01); *B60W 2420/52* (2013.01); *B60W 2420/54* (2013.01); *B60W 2554/20* (2020.02); *B60W 2554/402* (2020.02); *B60W 2554/4029* (2020.02); *B60W 2554/4042* (2020.02); *B60W 2554/4043* (2020.02); *B60W 2554/801* (2020.02); *B60W 2554/802* (2020.02); *B60W 2556/45* (2020.02)

(58) Field of Classification Search
CPC .. B60W 30/09; B60W 13/58; B60W 50/0098; B60W 2556/45; B60W 2554/20; B60W 2554/801; B60W 2554/4029; B60W 2420/52; B60W 2554/802; B60W 2420/54; B60W 2554/4043; B60W 2554/402; B60W 2420/42; B60W 2554/4042; G06F 16/951; B60R 21/0134; G01S 13/931; G01S 13/06; G01S 13/933
See application file for complete search history.

(56) References Cited

U.S. PATENT DOCUMENTS

| | | | |
|---|---|---|---|
| 10,992,755 B1 * | 4/2021 | Tran ........................ | G01S 13/86 |
| 11,027,419 B2 * | 6/2021 | Skaaksrud ........... | B65G 1/1373 |

(Continued)

*Primary Examiner* — Tyler J Lee

(57) ABSTRACT

The rise of the connected objects known as the "Internet of Things" (IoT) will rival past technological marvels. This application discloses an object control system (OCS) to control movement of an object in a smart environment. The object control system uses a virtualized shared database and a shared object management center to control the navigation and protection of moving and flying objects through an IoT network utilizing IoT devices. It also uses time of day to schedule activities of the moving, flying, stationary and fixed objects in the smart environment to allow all objects within object control system operate freely with no interference and collision.

20 Claims, 30 Drawing Sheets

Related U.S. Application Data continuation-in-part of application No. 17/106,137, filed on Nov. 29, 2020, and a continuation-in-part of application No. 16/984,995, filed on Aug. 4, 2020, now Pat. No. 11,005,582, and a continuation-in-part of application No. 16/828,013, filed on Mar. 24, 2020, now Pat. No. 11,031,106.

(51) Int. Cl.
| | |
|---|---|
| *G01S 13/06* | (2006.01) |
| *B60R 21/0134* | (2006.01) |
| *G01S 13/933* | (2020.01) |
| *G01S 13/931* | (2020.01) |
| *G06F 16/951* | (2019.01) |

(56) References Cited

U.S. PATENT DOCUMENTS

| | | | |
|---|---|---|---|
| 2007/0276600 A1* | 11/2007 | King | G08G 1/166 701/301 |
| 2013/0144490 A1* | 6/2013 | Lord | G08G 1/164 701/41 |
| 2018/0251102 A1* | 9/2018 | Han | H01M 50/20 |
| 2019/0047574 A1* | 2/2019 | Nishi | G08G 1/096741 |
| 2019/0116470 A1* | 4/2019 | Balasubramanian | H04W 4/40 |
| 2019/0196008 A1* | 6/2019 | Lee | G01S 7/4026 |
| 2019/0349959 A1* | 11/2019 | Nguyen | H04L 27/0006 |
| 2019/0362235 A1* | 11/2019 | Xu | G06N 3/082 |
| 2020/0331465 A1* | 10/2020 | Herman | G08G 1/161 |
| 2020/0409929 A1* | 12/2020 | Kodavarti | G06F 16/245 |
| 2021/0073640 A1* | 3/2021 | Palla | G06N 3/063 |

\* cited by examiner

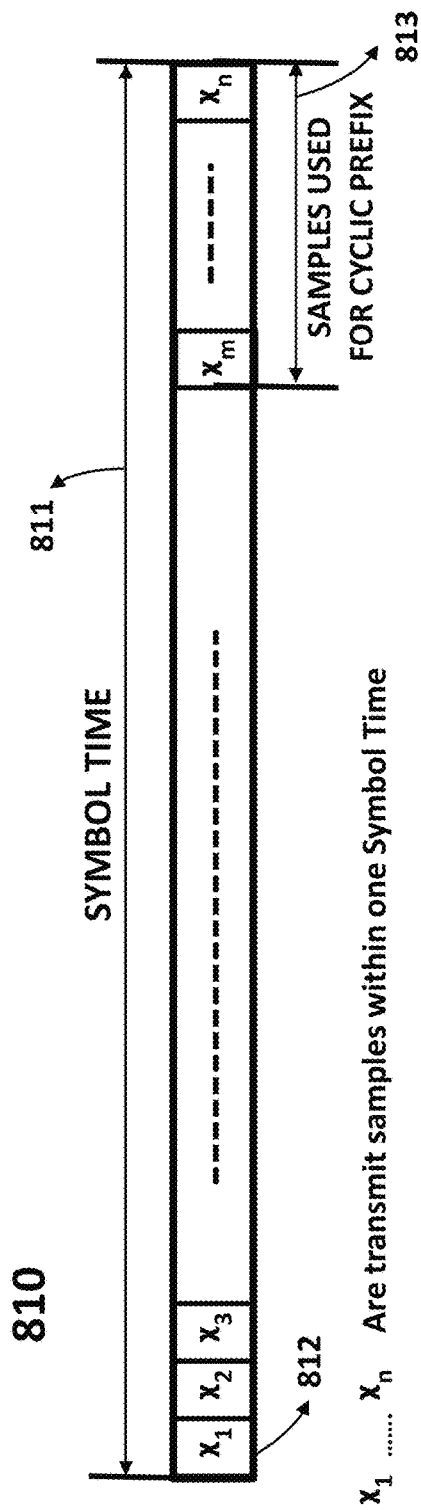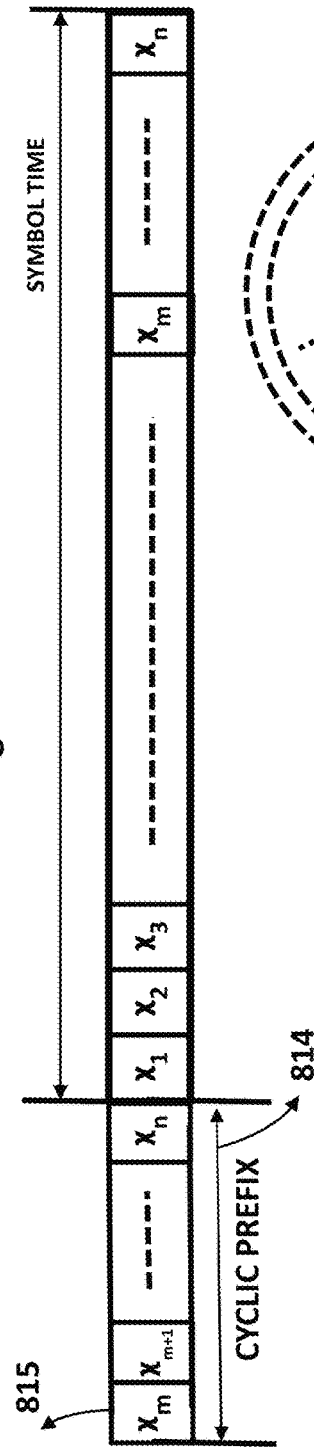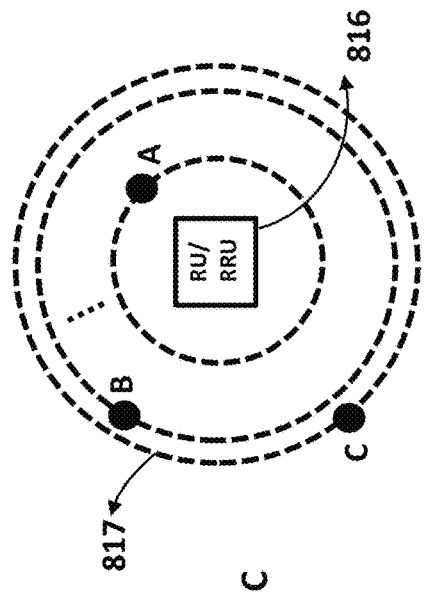
Figure 9A
Figure 9B
Figure 9C

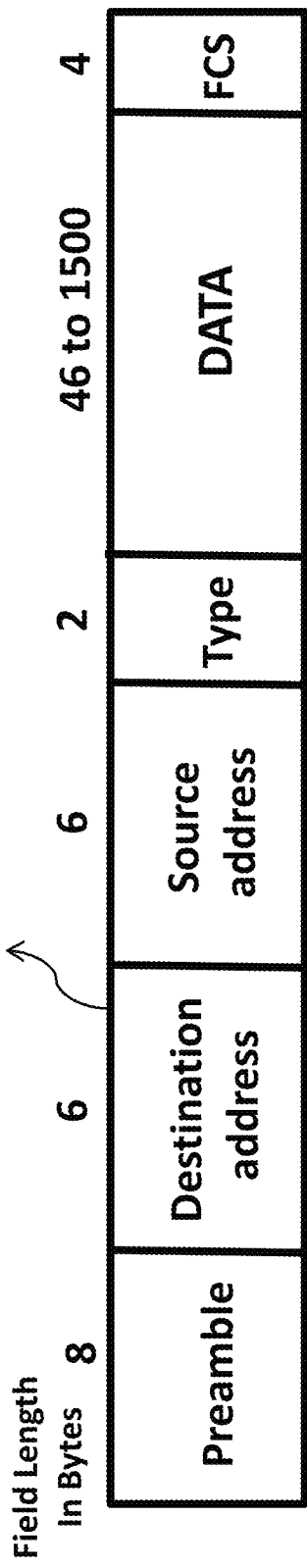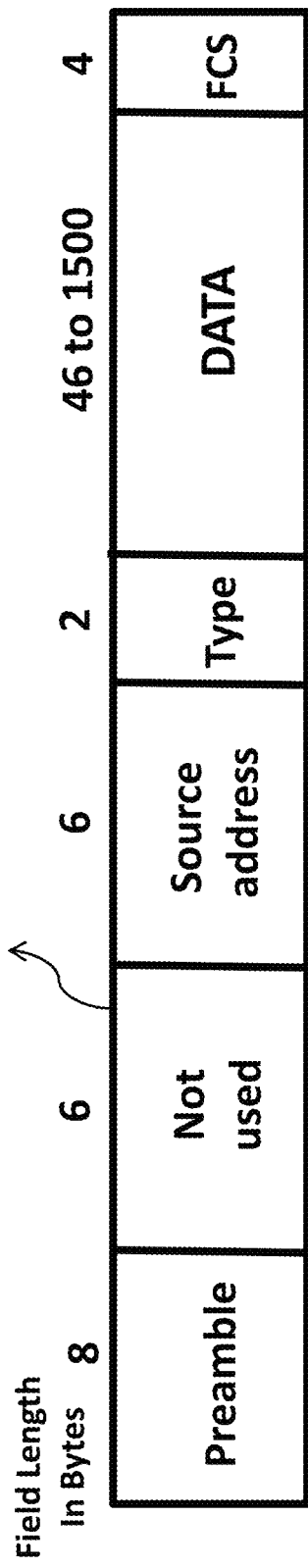
Figure 10A

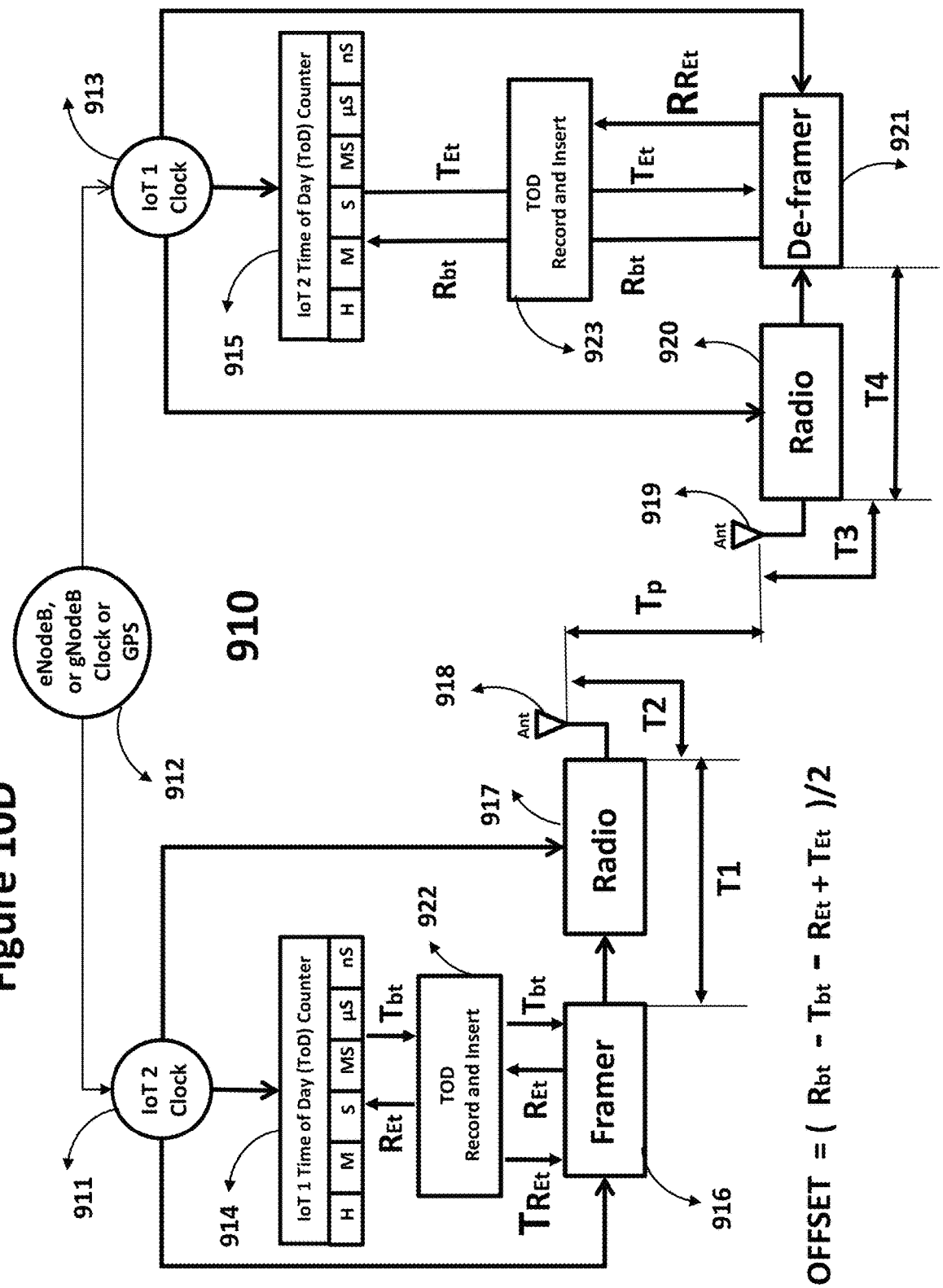

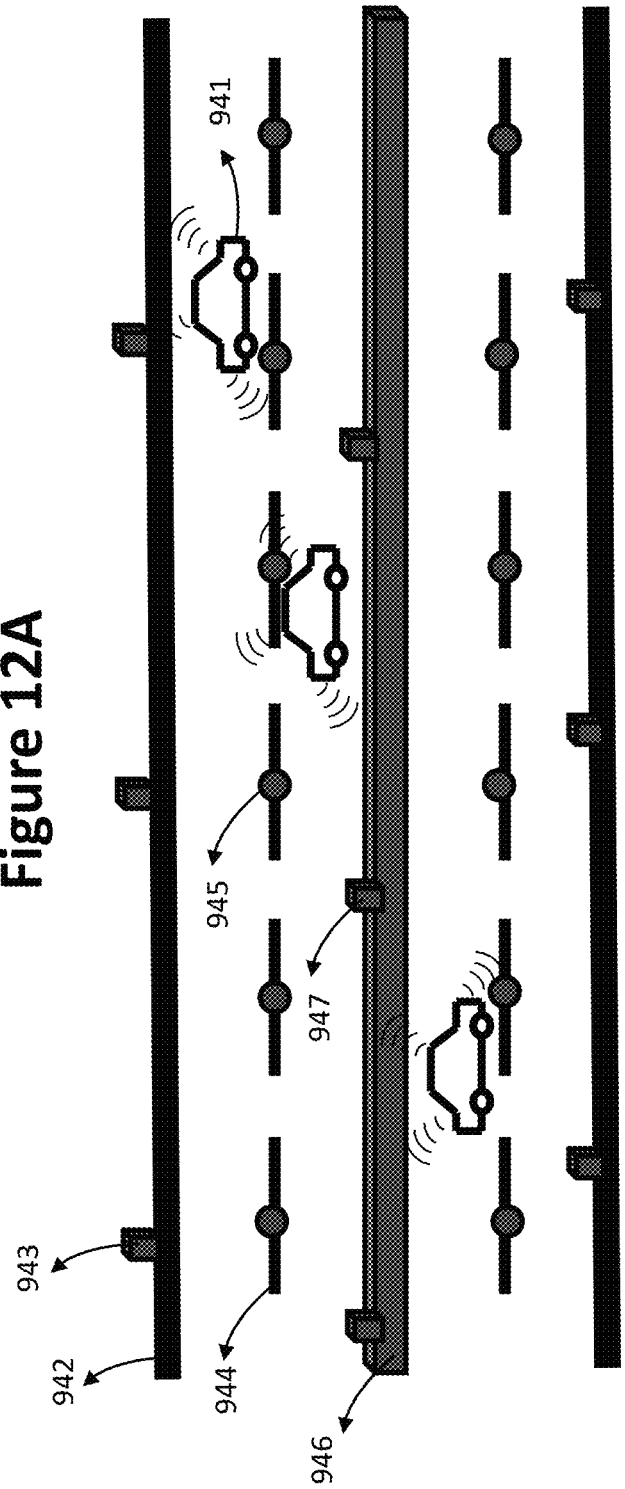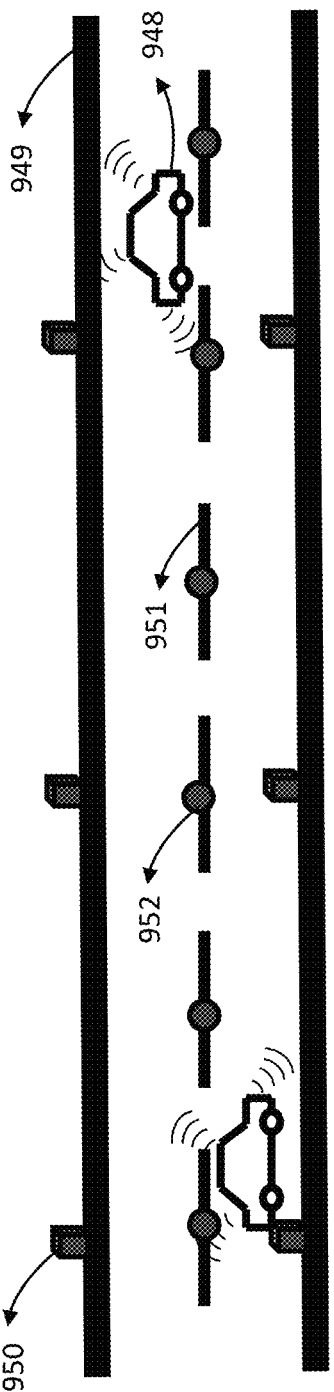

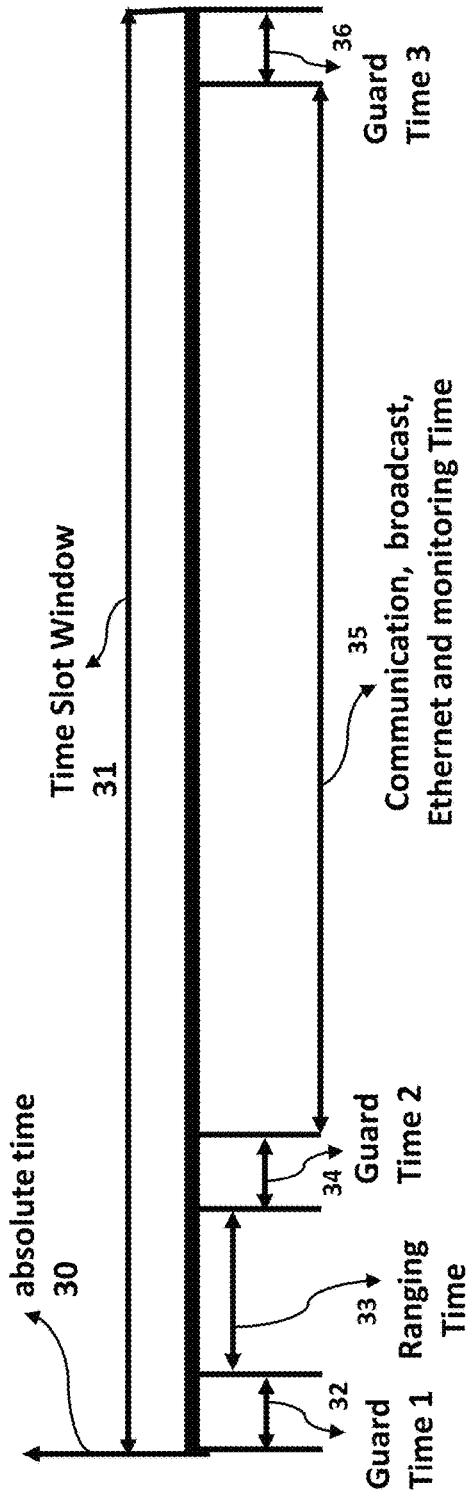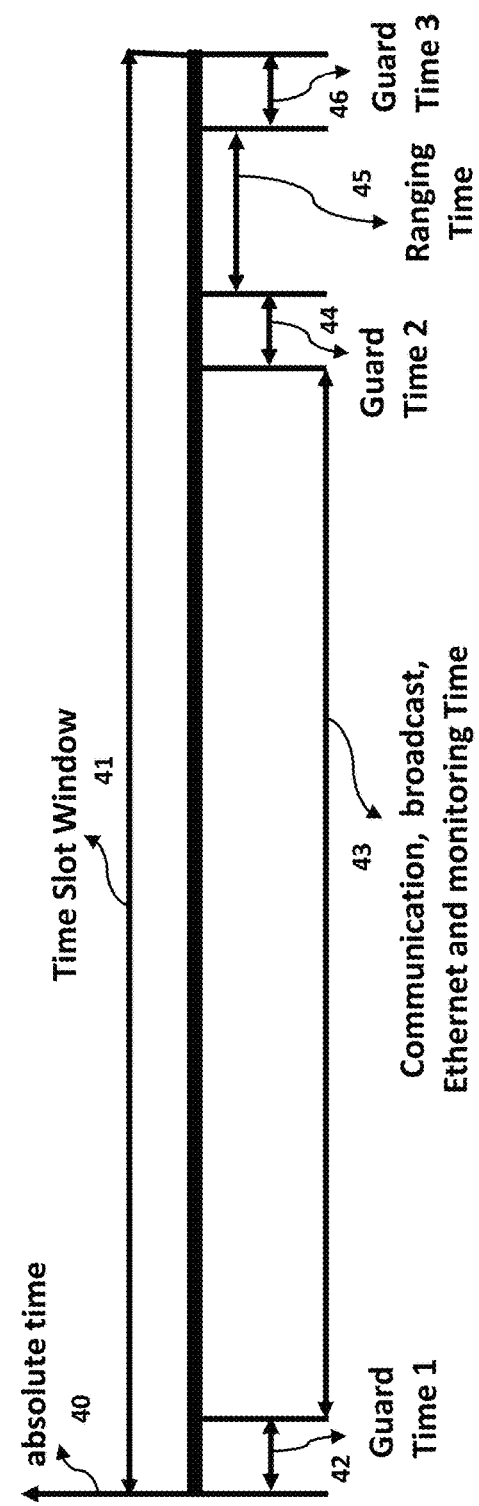

USE OF IOT NETWORK AND IOT RANGING DEVICE FOR AN OBJECT CONTROL SYSTEM

The application claims priority to the following related applications and included here are as a reference.
Application: U.S. patent application Ser. No. 17/145,151 filed Jan. 8, 2021 and entitled "USE OF IOT NETWORK AND IOT RANGING DEVICE FOR A NAVIGATION AND PROTECTION SYSTEM".
Application: U.S. patent application Ser. No. 17/106,137 filed Nov. 29, 2020 and entitled "USE OF 5G IOT NETWORK TO NAVIGATE AND PROTECT MOVING OBJECTS IN A SMART ENVIRONMENT".
Application: U.S. patent application Ser. No. 16/828,013 filed Mar. 24, 2020 and entitled "USE OF 5G IOT NETWORK FOR A VIRTUAL MEDICAL SYSTEM".
Application: U.S. patent application Ser. No. 16/984,995 filed Aug. 4, 2020 and entitled "USE OF 5G IOT NETWORK TO CONTROL MOVING OBJECTS IN A SMART ENVIRONMENT".

BACKGROUND

Developing intelligent systems which take into consideration the economical, environmental, and safety factors of the modern society, is one of the main challenges of this century. Progress in the fields of mobile robots, control architectures, artificial intelligence, advanced technologies, and computer vision allows us to now envisage a smart environment future.

It is safe to say that we are at the start of another industrial revolution. The rise of the connected objects known as the "Internet of Things" (IoT) will rival past technological marvels, such as the printing press, the steam engine, and electricity. From the developed world to developing world, every corner of the planet will experience profound economic resurgence. Even more remarkable is the speed with which this change will happen. A decade ago, there were about one billion devices connected to internet. Today, there are close to 20 billion. In five year, it could be close to 50 billion.

The rise of IoT also means we are at the start of a new age of data. Two chief components of an "IoT object" are its ability to capture data via sensors and transmit data via the Internet. The declining cost of sensors since the start of the new millennium has been a main driver in the rise of IoT. In short, sensors are dirt cheap today. This has profound implications on the ability to capture data.

The Internet of Things (IoT) describes a worldwide network of intercommunicating devices. Internet of Things (IoT) has reached many different players and gained further recognition. Out of the potential Internet of Things application areas, Smart Cities (and regions), Smart Car and mobility, Smart Home and assisted living, Smart Industries, Public safety, Energy & environmental protection, Agriculture and Tourism as part of a future IoT Ecosystem have acquired high attention.

The Internet of Everything (IoE) is a concept that aims to look at the bigger picture in which the Internet of Things fits. Yet, when you look deeper at IoE, you'll notice it really is also about the vision of a distributed network with a growing focus on the edge in times of ongoing decentralization, some digital transformation enablers and a focus on IoT business outcomes.

While the Internet of Things today mainly is approached from the perspective of connected devices, their sensing capabilities, communication possibilities and, in the end, the device-generated data which are analyzed and leveraged to steer processes and power numerous potential IoT use cases, the Internet of Everything concept wants to offer a broader view.

The IoT based smart environments represent the next evolutionary development step in industries such as construction, manufacturing, transportation systems and even in sporting goods equipment. Like any functioning organism, the smart environment relies first and foremost on IoT sensor data from the real world. Sensory data comes from multiple sensors of different modalities in distributed locations. The smart environment needs information about all of its surroundings as well as about its internal workings.

The challenge is determining the prioritized hierarchy of: (1) detecting the relevant quantities, (2) monitoring and collecting the data, (3) assessing and evaluating the information, and (4) performing decision-making actions. The information needed by smart environments is provided by Distributed Sensor Systems, which are responsible for sensing as well as for the first stages of the processing hierarchy.

New types of applications can involve the electric vehicle and the smart house, in which appliances and services that provide notifications, security, energy-saving, automation, telecommunication, computers and entertainment are integrated into a single ecosystem with a shared user interface. Obviously, not everything will be in place straight away. Developing the technology, demonstrating, testing, and deploying products, it will be much nearer to implementing smart environments by 2020. In the future computation, storage and communication services will be highly pervasive and distributed: people, smart objects, machines, platforms, and the surrounding space (e.g., with wireless/wired sensors, M2M devices, etc.). The "communication language" will be based on interoperable protocols, operating in heterogeneous environments and platforms. IoT in this context is a generic term and all objects can play an active role thanks to their connection to the Internet by creating smart environments, where the role of the Internet has changed.

$5^{th}$ generation wireless systems (5G) are on the horizon and IoT is taking the center stage as devices are expected to form a major portion of this 5G network paradigm. IoT technologies such as machine to machine communication complemented with intelligent data analytics are expected to drastically change landscape of various industries. The emergence of cloud computing and its extension to fog paradigm with proliferation of intelligent 'smart' devices is expected to lead further innovation in IoT.

The existing 4G (fourth generation wireless) networks have been widely used in the Internet of Things (IoT) and are continuously evolving to match the needs of the future Internet of Things (IoT) applications. The 5G (fifth generation) networks are expected to massive expand today's IoT that can boost cellular operations, IoT security, and network challenges and driving the Internet future to the edge. The existing IoT solutions are facing a number of challenges such as large number of connection of nodes, security, and new standards.

The drive to minimize human interaction in transportation vehicles is stronger than ever, especially in public transportation, automobiles, and etc. For instant, just a few years ago, automobiles seldom had very sophisticated safety systems. Now, it is rare to find an automobile without various safety and protection systems. And now new technology is evolving to the point of being able to offer preventive methods to better manage and dissipate sudden impact energy to the vehicle.

Today internet of things is a new revolution of the internet. A world where the real, digital and the virtual are converging to create smart environments that make energy, transport, cities and many other areas more intelligent. Different types of application like water monitoring, water pollution, air pollution, forest fire detection, smart homes, smart cities where each thing can connect from anywhere to anyplace to make our life easier.

In order to understand what the constituents of IoE are we will need to dive into the core parts of IoE. IoE is an umbrella term combining the following 4 properties in one place:

1. People:

People are the humans using connected devices to deliver insights about their personal and professional self. This data can include interests, preferences, work, personal health etc. Connecting this data to enterprise needs can provide insights relating the needs and desires of prospects for businesses. Additionally, this can be used to track performance and pain points of human resources.

2. Process:

The process is the way to ensure deliverability of right data at the right time to the right person or machine. Here data is more about insightful information or an action than just random chunk. Figuring out a way to decipher the right flow of information is a key to making the best use of big data.

3. Data:

With the increase in sources and types of data, we will also need to classify the information and analyze it to bring useful insights. Data alone is nothing but once combined with analytics and analysis this new data can help businesses in decision making and managing the organization.

4. Things:

This is where we come across the term Internet of Things (IoT). Internet of things is the interconnectivity of devices that send and receive information across networks like the internet. With every signal injected into the network, data is generated which needs to be collected, summarized, and analyzed efficiently.

This application discloses an object control system (OCS) to control movement of an object in a smart environment. The object control system uses a virtualized shared database and a shared object management center to control the navigation and protection of moving and flying objects through an IoT network utilizing IoT devices. It also uses time of day to schedule activities of the moving, flying, stationary and fixed objects in the smart environment to allow all objects within object control system operate freely with no interference and collision.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, an IoT network uses distributed IoT devices which are sensor/monitoring devices to monitor its surrounding environment and detect and collect data to be processed by the IoT network or a navigation and protection system.

In another aspect, an object is a flying object, a moving object, and a stationary object, a robot, equipment, and a tool.

In one aspect, an object control system that includes IoT network, IoT devices, virtualized shared database (SD), virtualized shared operation management center (SOMC), and a navigation and protection system that resides in an object controls the movement of objects in a smart environment.

In one aspect, the IoT device is used for a navigation and protection system (NPS).

In one aspect, the NPS is used by various moving objects, flying vehicles/objects and stationary objects in to protect them from any collision.

In another aspect, all communication links in the IoT network are asynchronous and use Ethernet packet protocols.

In one aspect, an IoT device uses Ethernet packet protocol for over the air link between IoT network and IoT device.

In another aspect, an IoT device uses Internet Protocol (IP) packet for over the air link between IoT network and IoT device.

In another aspect, the IoT device uses IEEE1588 (institute of electrical and electronic engineering 1588) precision time protocol (PTP) to obtain time of day from the IoT network (4G, 5G, 6G, and WiFi wireless networks).

In one aspect, an IoT device uses IEEE1588 PTP to obtain time of day from another IoT device.

In another aspect, the IoT device uses GPS (Global Positioning System) receiver to obtain location coordinates and time of day.

In one aspect, the IoT device frequency and phase synchronizes to IoT network using 4G, 5G, 6G, or WiFi (wireless fidelity) air protocol.

In another aspect, the IoT (IoE) network is $5^{th}$ generation (5G), $6^{th}$ generation (6G) fix and mobile wireless data communication network.

In one aspect, IoT network is any fix and mobile wireless data communication network beyond 5G such as $6^{th}$ generation (6G), $7^{th}$ generation (7G), etc.

In another aspect, IoT network is a proprietary network.

In one aspect, IoT network is WiFi (wireless fidelity) network.

In another aspect, IoT is part of a satellite network supporting one of data communication standards like 5G, 6G, 7G or a proprietary data communication standard.

In another aspect, certain data collecting applications use multiple of sensors/monitoring devices but only one of them is a master and acts as IoT device that communicates with IoT network. All sensors/monitoring devices used in the data collecting application communicate among themselves using wired and/or wireless link.

In another aspect, in cases that a data collecting application uses multiple sensors/monitoring devices (IoT devices) each individual sensor/monitoring device (IoT device) used within the data collecting application has an IP (internet protocol) address or media access control (MAC) address and uses a proprietary or any standard protocol (such as IP protocol, Ethernet protocol) to communicate with other sensors used in the data collecting application like an IP communication network.

In one aspect, the IoT network uses the time of day to assign the IoT device an absolute time for data collection or its operation.

In one embodiment, SOMC shares an operation frame with IoT devices through IoT network that includes a guard time, and time slots.

In another aspect, SOMC assigns an absolute time to each IoT device that is registered with IoT network to perform its activities.

In one aspect, the absolute time assigned by SOMC to various IoT devices is constant or dynamically changes depending on the time of day or load on the IoT network.

In one aspect, the absolute time assigned by SOMC is start of a time window (time slot) assigned to an IoT device to communicate and exchange information data to the IoT network and other IoT devices.

In another aspect, SOMC shares the absolute times assigned to IoT devices with all IoT devices registered with IoT network.

In one aspect, SOMC shares all absolute times with all registered IoT devices without identifying which absolute time is assigned and which IoT device it is assigned to.

In another aspect, SOMC assigns an absolute time and a time window (time slot) for broadcasting and communication to each IoT device registered with the IoT network.

In one aspect, the time window or time slot assigned to each IoT device by SOMC is constant and identical for all registered IoT devices with IoT network, different for each IoT device, dynamically changes by SOMC, or requested by IoT device.

In one aspect, an IoT device registered with an IoT network can transmit and receive information data to and from other IoT devices without collision, and interference.

In another aspect, the SOMC uses the time of day to program the IoT devices an active time to collect data (or do other functions) and a sleep time or idle time to save power.

In one aspect, the absolute time is defined by the hour, the minute, the second, the millisecond, the microsecond, the nanosecond and the picoseconds.

In another aspect, the absolute time includes the hour.

In one aspect, the absolute time includes the hour and the minutes.

In one aspect, the absolute time includes the hour, the minutes, and the seconds.

In one aspect, the absolute time includes the hour, the minutes, the seconds, and the milliseconds.

In one aspect, the absolute time includes the hour, the minutes, the seconds, the milliseconds, and the microseconds.

In one aspect, the absolute time includes the hour, the minutes, the seconds, the milliseconds, the microseconds, and the nanoseconds.

In another aspect, the absolute time is only defined by minutes, by seconds, by milliseconds, by microseconds, by nanoseconds, or by picoseconds.

In another aspect, the absolute time hour is 0 to 24, minute is 0 to 60, second is 0 to 60, millisecond is 0 to 1000, microsecond in 0 to 1000, and nanosecond is 0 to 1000.

In one aspect, the absolute time is only defined by hour (0 to 24), by minutes (0 to 1440), by seconds (0 to 86400), by milliseconds (0 to 86400000) and so on.

In one aspect, the IoT network defines the date and time of day for data collection (or other functions).

In another aspect, the date is defined by the year, month, and day.

In another aspect, the SOMC or NPS demands the IoT device to send its information data real time to SOMC or NPS's controller.

In one aspect, an IoT device comprises of a sensor/monitoring device and a wireless transceiver to communicate with IoT network as well as other IoT devices.

In another aspect, an IoT device is only a wireless transceiver that communicates with IoT network and obtains its data from one or more data collecting sensors that are externally attached to it.

In another aspect, a master IoT device collects data from other slave IoT devices and communicates them to the SOMC or NPS's controller.

In one aspect, the master IoT devices or slave IoT devices broadcast certain information data to other master IoT devices or slave IoT devices that are linked or belong to a specific smart environment.

In another aspect, the broadcast information data exchanged among IoT devices is used for any general or specific application.

In one aspect, the broadcast information data sent by IoT devices depends on the sensors/monitoring device used in the application.

In another aspect, the broadcast data is defined by SOMC or NPS.

In one aspect, the broadcast data is transmitted or received by an IoT device at an absolute time and during a time slot defined by SOMC.

In another aspect, the IoT devices exchange Ethernet packets.

In one aspect, IoT devices are identified by their IP addresses or media access control (MAC) address when communicating among themselves in a smart environment.

In another aspect, the IoT devices use Ethernet packet protocol to communicate among themselves.

In another aspect, the IoT devices use IP packet to communicate among themselves.

In one aspect, the IoT devices use a proprietary packet protocol to communicate among themselves.

In one aspect, the IoT devices use a WiFi protocol to communicate among themselves.

In another aspect, IoT devices support at least one of a Bluethooth transceiver, a ZIGBEE transceiver, a WiFI transceiver, and an Infrared transceiver.

In one aspect, the IoT devices use a 5G, 6G, 7G protocols to communicate among themselves.

In one aspect, a specific frequency band and channel is assigned to the IoT devices to communicate among each other or perform other functions.

In another aspect, the IoT device is a biometric device.

In one aspect, an IoT device is any object used in a factory.

In another aspect, an IoT device is any object used in a house.

In one aspect, an IoT device is any object used in a hospital.

In another aspect, an IoT device is any wearable device.

In one aspect, an IoT device is any object on a road, street, or highway inside and outside a city.

In another aspect, an IoT device is in general any equipment, object, tool, and device in an environment.

In one aspect, the IoT device has at least one sensor/monitoring device to collect data.

In another aspect, the type of IoT device is identified by its model, or serial number.

In one aspect, IoT device sends a time stamp in its broadcast data that shows the time of day at the antenna port of the transmitter of the IoT device's transceiver.

In another aspect, the IoT device's transceiver at the detector of its receiver detects the time of day the time stamp of the broadcast packet from another IoT device arrives at its own transceiver antenna port.

In one aspect, an IoT device uses its wireless transceiver to broadcast its type, identity code, location, mass, the time of day, function, status (for traffic light, green, yellow, and red), specification (includes dimension), and propagation time through its transceiver's transmitter up to antenna port.

In another aspect, if IoT device is used for a traffic light the broadcast information data includes the color of traffic light and the time left for the color to change.

In one aspect, the time of day that is broadcasted by an IoT device is in form of a time stamp which can be used to calculate distance.

In another aspect, the stationary object is a lamp post, a building, a tree, a stationary vehicle/object, a traffic light post, a statue, and any other stationary object in an environment.

In one aspect, an IoT device changes its carrier frequency and modulation for better, faster transmission and reception of information.

In one aspect, two IoT devices or objects use a protocol which is based on exchange of broadcast packets and Ethernet packets to obtain the distance and approaching speed between them.

In another aspect, IoT device is a wireless sensor, Radar, Lidar, an image sensor (camera), and an ultrasonic sensor to perform ranging to measure a distance from an object in smart environment.

BRIEF DESCRIPTION OF THE DRAWINGS

FIG. 9A depicts OFDM transmit symbol signal before adding cyclic prefix.

FIG. 9B shows transmit signal with cyclic prefix added at the beginning of transmit symbol.

FIG. 9C depicts a typical coverage for RRU/RU.

FIG. 10A depicts an Ethernet frame and a broadcast frame.

FIG. 10D shows implementation of the protocol used by two IoT devices.

FIG. 12A illustrates a typical road with center barrier.

FIG. 12B illustrates a typical road with no center barrier.

FIG. 14D depicts a first structure of a time slot used for ranging.

FIG. 14E depicts a second structure of a time slot used for ranging.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
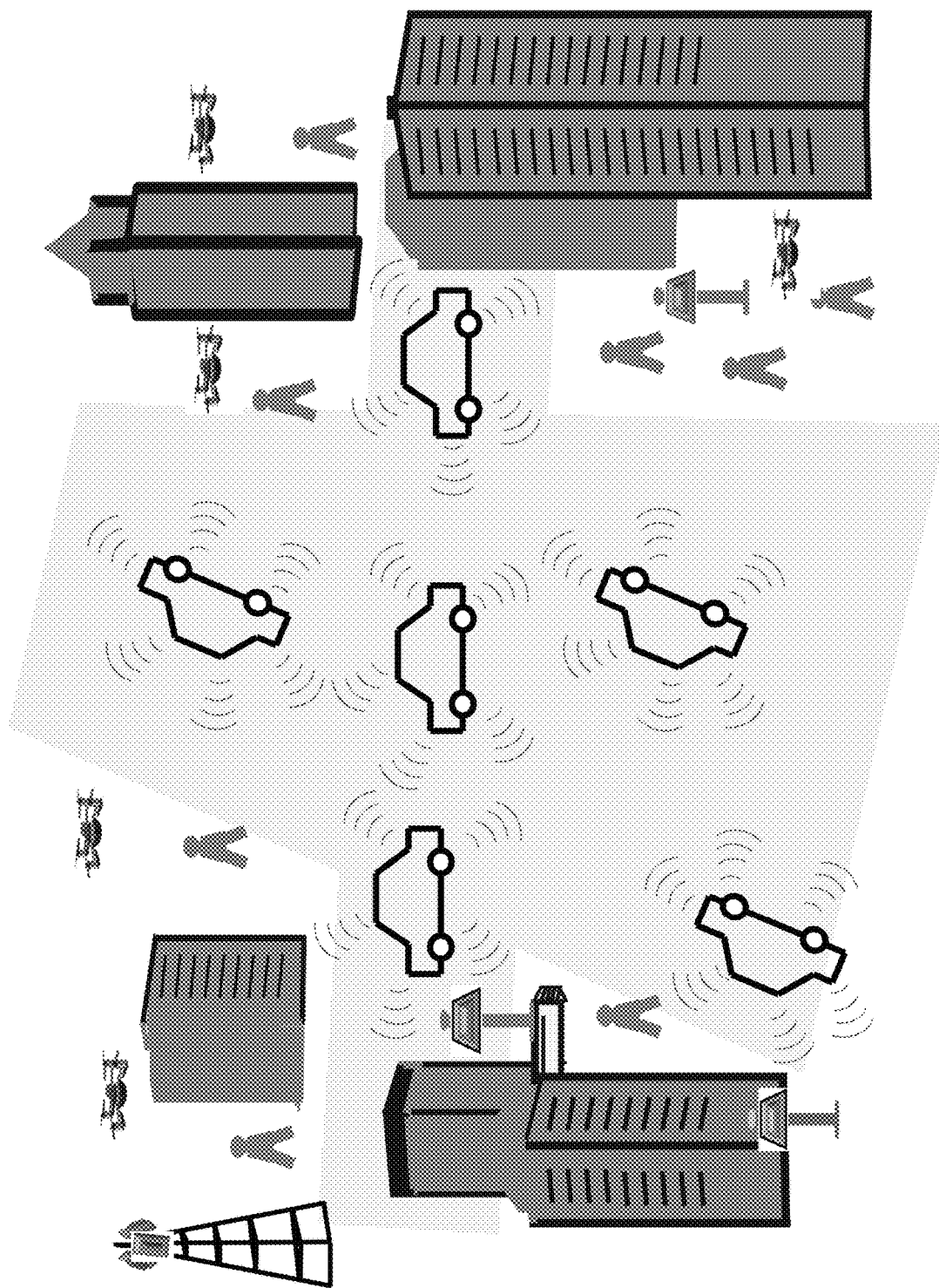
FIG. 1 illustrate a typical surrounding environment scenario for moving, flying vehicles/objects and stationary objects as IoT devices.

FIG. 1 illustrates a typical environment with moving, stationary and fixed objects. The stationary objects are trees, lamp posts, small cells, buildings, street floors, walking payments, parked vehicles, statues, houses, hospitals, gas stations, schools, sport fields, shopping malls, small shops, department stores, parking lots, and any other stationary objects. Stationary objects are identified by their types, an IP address, shapes, masses, status (for traffic light green, yellow, or red), function, specification (includes dimension), and locations. Stationary objects act as an IoT device or IoT devices with a single IP address or independent IP addresses. Large building at different sides requires different IoT devices representing different locations and sides. The IoT devices used by stationary objects are fixed object that communicate with either IoT network or other IoT devices in their surrounding environment.

The moving vehicles are robots, humans with body armor, humans, animals, automobiles, trucks, boats, ships, bicycles, motorcycles, moving objects in a factory, moving objects in a hospital, moving objects used in buildings, and any other moving objects.

The flying vehicles are helicopters, small planes, large planes, flying humans, flying robots, gliders, flying cars, drones, missiles, birds, and any other flying objects.

Figure 2:
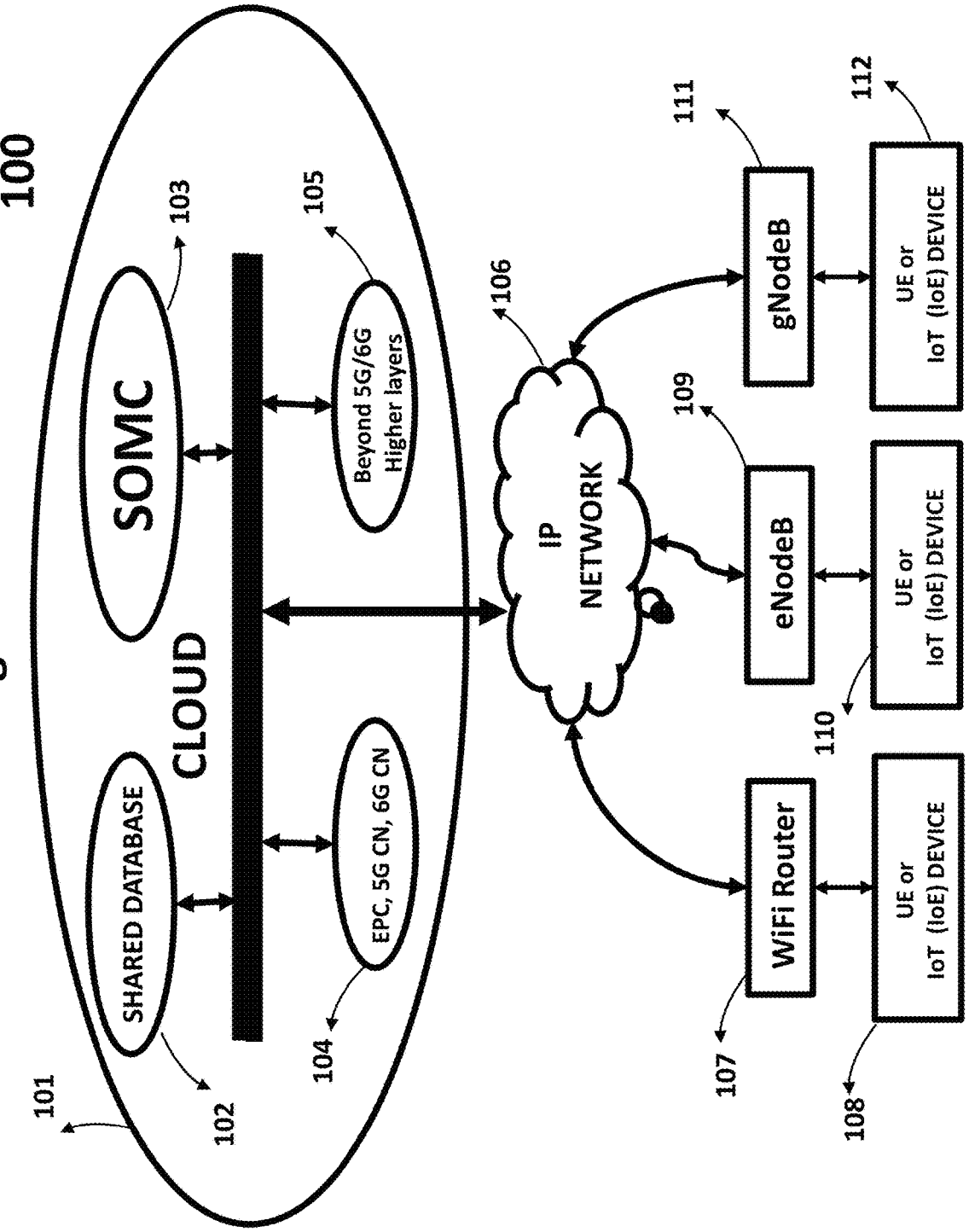
FIG. 2 illustrates an end-to-end cloud IoT (IoE) Network with control system.

FIG. 2 depicts wireless 4G, 5G, 6G (beyond 5G and 6G) and WiFi (wireless fidelity) end to end IoT networks 100 used by an object's navigation and protection system (NPS). 4G network facilitates communication between user equipment (UE) or IoT device 110 and evolved packet core (EPC) 104 through evolved node B (eNodeB) 109 and IP (Internet protocol) network 106. 5G and 6G networks facilitate communication between user equipment (UE) or IoT device 112 and core network (CN) 104 as well as beyond 5G/6G higher layers 105 through next generation Node B (gNodeB) 111 (or new NodeB) and IP network 106. WiFi network facilitates communication between user equipment (UE) or IoT device 108 and the cloud 101 through WiFi router 107, and IP network 106. Cloud 101 accommodates EPC/CN 104 and higher layers of beyond 5G/6G 105 as well as shared database (SD) 102 and shared operation management center (SOMC) 103 and allows UEs or IoT devices 108, 110 and 112 have access to shared database 102 and SOMC 103. SD and SOMC are used by all 5G (beyond 5G), 6G (beyond 6G), 7G, and WiFi networks that belong to various service providers. SD stores all information data related to IoT devices that directly communicate (master IoTs) with IoT network. SOMC controls and manages the objects that use a master IoT device.

In wireless 4G, 5G, 6G, (beyond 5G/6G), 7G, and WiFi networks there is a need for synchronization. There are several synchronization techniques used in data communication networks and the most common one depending on requirements of network components or ports are syncE, Institute of Electrical and Electronic Engineering IEEE1588 Precision Time Protocol PTP, NTP, and GPS. The Network Time Protocol (NTP) is a networking protocol for clock synchronization between computer systems over packet-switched, variable-latency data networks. In operation since before 1985, NTP is one of the oldest Internet protocols in current use. Synchronous Ethernet, also referred to as SyncE, is an ITU-T standard for computer networking that facilitates the transference of clock signals over the Ethernet physical layer. This signal can then be made traceable to an external clock. IEEE 1588 Precision Time Protocol (PTP) is a packet-based two-way communications protocol specifically designed to precisely synchronize distributed clocks to sub-microsecond resolution, typically on an Ethernet or IP-based network. Global Satellite Positioning System (GPS) signal is received, processed by a local master clock, time server, or primary reference, and passed on to "slaves" and other devices, systems, or networks so their "local clocks" are likewise synchronized to coordinated universal time (UTC).

In wireless 4G, 5G, 6G, (beyond 5G/6G), 7G, and WiFi network 100 when the link between two network component ports is Ethernet then there is a need to synchronize the two network components using SyncE, IEEE1588 (PTP) or NTP depending on requirements and specification of two network components.

Mobile user equipments (UE) or IoT devices 108, 110, and 112 may use GPS to obtain time of day (TOD), location coordinate and over the air protocol to achieve frequency and phase synchronization. However, for UEs or IoT devices that either cannot see the GPS satellites, GPS signal is very weak, or GPS receiver increases cost, size, and power consumption another technique to acquire time of day is required. UEs and IoT devices can use their received 4G, 5G, 6G, (beyond 5G/6G), 7G, and WiFi signal to achieve frequency and phase synchronization. UEs and IoT devices that do not have access to GPS signal can either obtain time of day from UEs and IoT devices in surrounding environment that have access to GPS signal and are accessible or obtain it from eNodeB, gNodeB and WiFi router that they communicate with.

There are three techniques that UEs and IoT devices can use to obtain time of day from eNodeB, gNodeB and WiFi router. The precision of time of day will be different using these three techniques. Time of day with different accuracies is used for different applications. The less accurate (within fraction of microsecond, approximately 200 nanosecond or less) time of day uses one way communication between eNodeB, gNodeB and WiFi router and UEs or IoT devices 108, 110, and 112. The more accurate (within 100 nanosecond) time of day uses two way communications between eNodeB, gNodeB and WiFi router and UEs or IoT devices 108, 110, and 112. In all methods eNodeB, gNodeB and WiFi router should have time of day. When eNodeB, gNodeB and WiFi router do not have time of day or cannot support exchange of time of day with UEs and IoT devices then the network component prior to eNodeB, gNodeB and WiFi router can be used to propagate time of day to UEs and IoT devices 108, 110, and 112 with less accuracy.

In one embodiment, 4G, 5G, 6G, (beyond 5G/6G), 7G, and WiFi network 100 provide time of day to UEs and IoT devices, using institute of electrical and electronic engineering (IEEE1588) precision time protocol (PTP). IEEE1588 PTP exchanges the timing messages to and from UEs or IoT devices 108, 110, and 112 and one component of 4G, 5G, 6G, (beyond 5G/6G), 7G, and WiFi wireless networks 100.

The 4G, 5G, 6G, (beyond 5G/6G), 7G, and WiFi wireless networks 100 sends time of day to UEs and IoT devices 108, 110, and 112 by cyclic prefix of OFDM (orthogonal frequency division multiplexing) symbols from eNodeB, gNodeB and WiFi router where IFFT (inverse fast Fourier Transform) is performed. In another technique the 4G, 5G, 6G, (beyond 5G/6G), 7G, and WiFi network 100 utilizes unused downlink sub-carriers or unused bits or messages in various downlink channels to send time of day to UEs or IoT devices 108, 110, and 112. All components of 4G, 5G, 6G, (beyond 5G/6G), 7G, and WiFi network 100 are time synchronized and have the same time of day. The 4G, 5G, 6G, (beyond 5G/6G), and 7G networks may transmit Ethernet packets over the air to UEs or IoT devices 108, 110, and 112 in order to have an end-to-end network using a single packet protocol. By doing this both hardware and software is significantly simplified.

Some UEs and IoT devices 108, 110, and 112 obtain time of day from other UEs or IoT devices in surrounding environment that are in their communication range and have time of day. They use another frequency to communicate with other UEs and IoT devices in surrounding environment and exchange broadcast and Ethernet packets. The UEs and IoT devices 108, 110, and 112 may communicate with other UEs and IoT devices by exchanging Ethernet packets or any other proprietary packets.

The UEs and IoT devices 108, 110, and 112 may use similar physical layer as 4G, 5G, 6G, (beyond 5G/6G), 7G, or WiFi to communicate with or broadcast their information data to other UEs and IoT devices in their surrounding environment without introducing any unwanted interference. They also may use a physical layer different from 4G, 5G, 6G, (beyond 5G/6G), 7G, and WiFi to communicate with or broadcast their information data to other UEs and IoT devices in their surrounding environment without introducing any unwanted interference.

The UEs and IoT devices 108, 110, and 112 may support Bluetooth, Zigbee, infrared, WiFi, and any other wireless communication systems to communicate with other UEs and IoT devices in their surrounding environment and exchange information data and transmit and receive broadcast data. The communication between UEs and IoTs devices is encrypted and highly secured.

The UEs and IoT devices transmit and receive broadcast data that includes the type of UE and IoT device, their IP address, their location coordinate, their mass, time of day, method of obtaining time of day (IEEE1588, cyclic prefix, GPS, or other methods).

Figure 3:
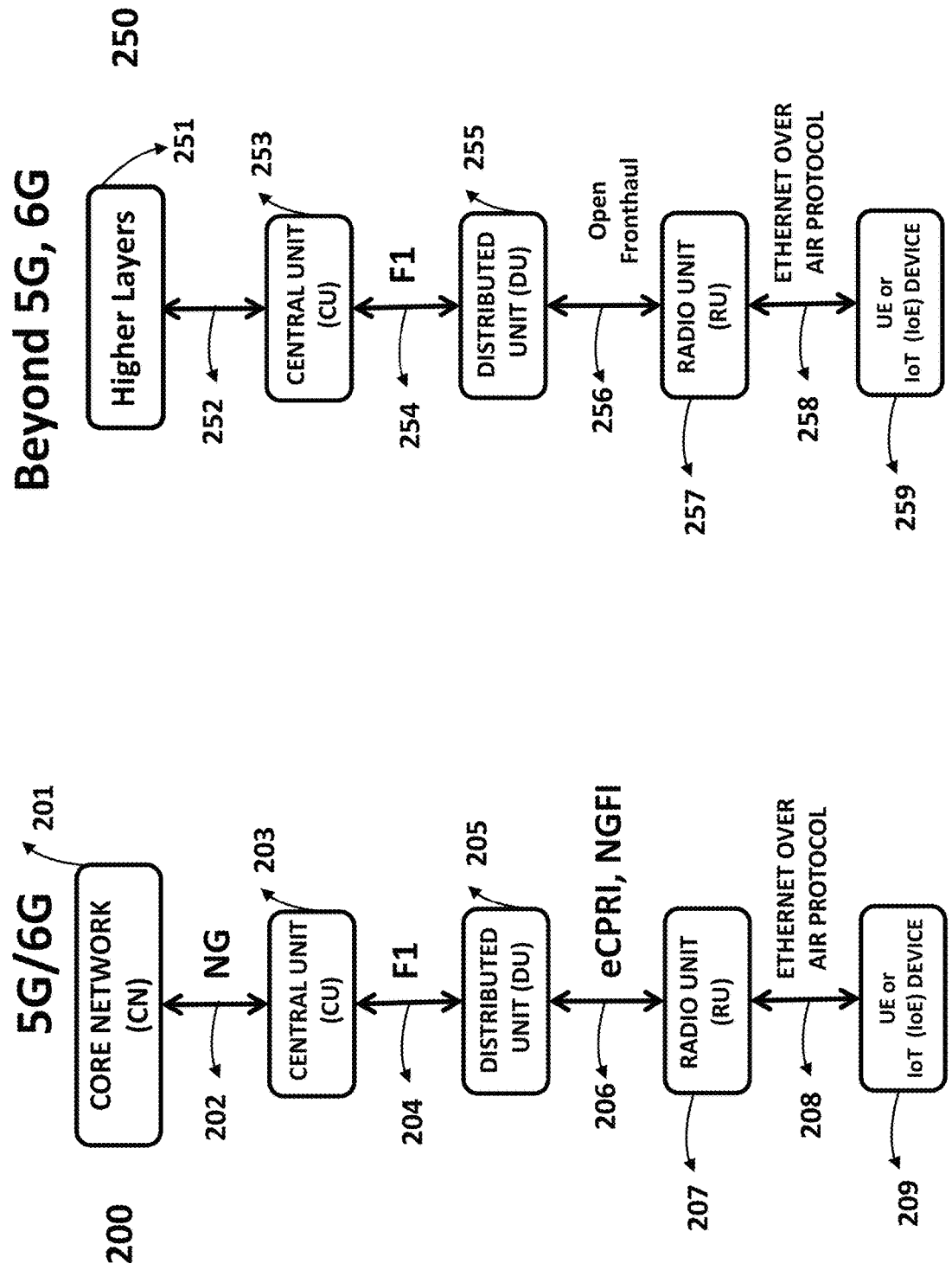
FIG. 3A illustrates an end-to-end 5G/6G IoT network.
FIG. 3B illustrates an end-to-end beyond 5G/6G IoT network.

FIG. 3A depicts 5G/6G (core, gNodeB, and UE or IoT device) end to end IoT network 200 and FIG. 2B illustrates beyond 5G/6G (higher layers, gNodeB, UE or IoT device) end to end IoT network 250 supporting cloud radio access network C-RAN, virtual radio access network vRAN, and open radio access network (O-RAN). The 5G/6G network 200 facilitate communication between user equipment (UE) or IoT device 209 and core network (CN) 201 through remote radio unit (RU) 207, distributed unit (DU) 205, and central unit (CU) 203 using over the air protocol interface 208, evolved common public radio interface (eCPRI) or next generation fronthaul interface (NGFI) 206, F1 interface 204 and "NG" interface 202. The RU 207, DU 205, and CU 203 are components of 5G/6G new radio (NR) which is also called gNodeB. UEs 209 also act as an IoT (IoE) device.

The 5G/6G network 200 uses different architectures depending on applications that the network is used for. In certain architectures one or more network components are collocated. When one or more network components are collocated the components use the interfaces defined in the standard. However, there are cases such as a small cell when two or more components of network are collocated, and the interfaces may be eliminated.

Cloud radio access network or C-RAN architectures shown in FIG. 2 enables cost saving on expensive baseband resources, in which the baseband units are shared in a centralized baseband pool. Therefore, the computing resources can be utilized optimally based on the demand. C-RAN architecture has also opened an opportunity for RAN virtualization (vRAN) in order to further reduce cost. Therefore, virtual RAN or vRAN has been developed to simplify the deployment and management of the RAN nodes and make the platform readily available for multitude of dynamically changing service requirements. The main issue with C-RAN and vRAN is that these architectures still utilize propriety software, hardware and interfaces which lack openness as a major bottleneck in efficiently utilizing virtualization. In order to overcome the limitations of C-RAN and vRAN, O-RAN is emerging as a new RAN architecture that uses open interfaces between the elements implemented on general-purpose hardware. This allows operators select RU and DU hardware and software from different vendors. In addition, open interfaces between decoupled RAN components provide efficient multi-vendor interoperability. O-RAN architecture also allows enhanced RAN virtualization that supports more efficient splits over the protocol stack for network slicing purpose. O-RAN further reduces RAN expenditure by utilizing self-organizing networks that reduce conventional labor-intensive means of network deployment, operation and optimization. In addition to cost reduction, intelligent RAN can handle the growing network complexity and improve the efficiency and accuracy by reducing the human-machine interaction.

FIG. 3B shows the O-RAN end to end architecture (UE, gNodeB) 250 for beyond 5G and 6G. Higher layers 251 communicate with open interface 252 to central unit 253. The interface between central unit (CU) 253 and distributed unit (DU) 255 is open interface 254 "F1" and the interface between distributed unit 255 and radio unit (RU) 257 is open fronthaul 256. UE or IoT device 259 use over the air interface 258 to communicate with RU 257. Therefore, the only difference between 5G/6G, beyond 5G and 6G ORAN architecture is open interface 252, open "F1" interface 254 and open fronthaul 256.

All embodiments related to 5G/6G explain above apply to beyond 5G and 6G (7G) ORAN.

Figure 4:
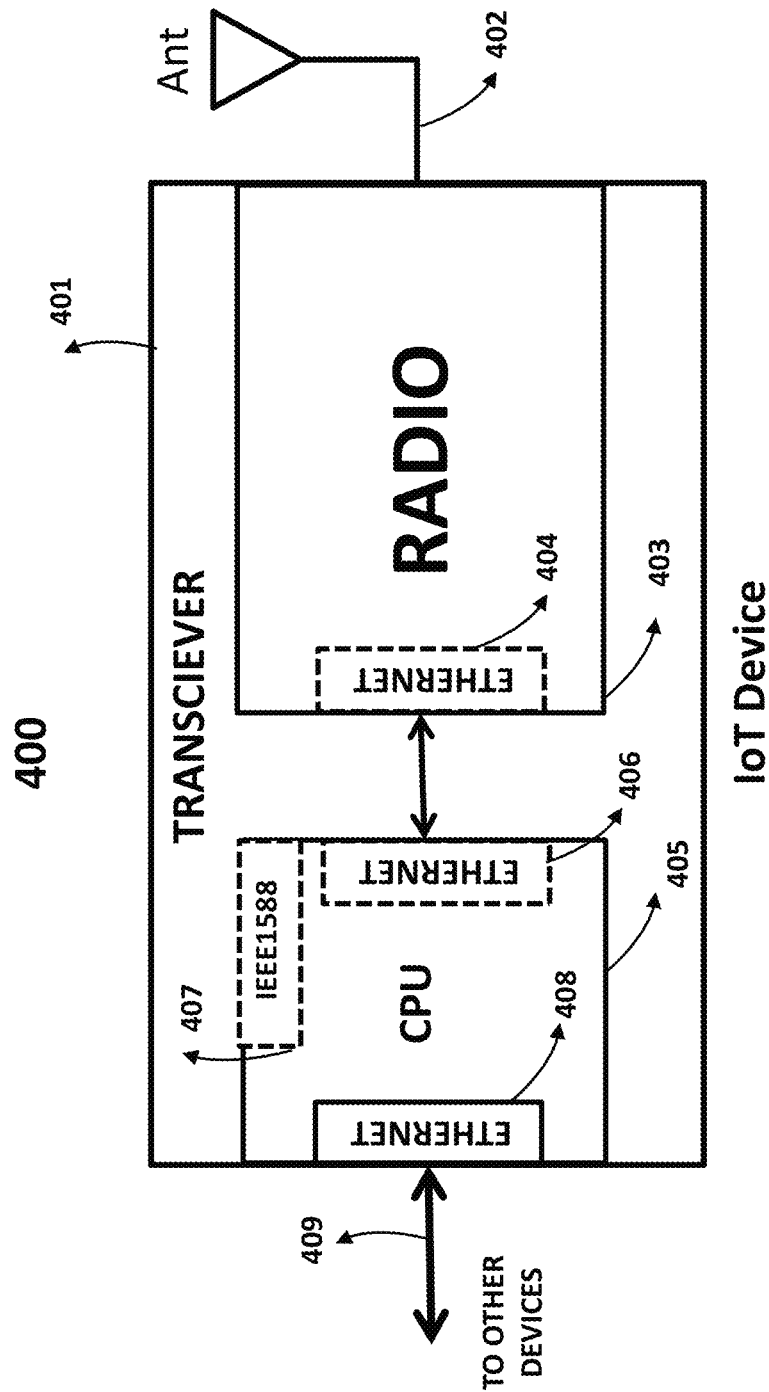
FIG. 4 illustrates a typical IoT device that can be found in a smart environment communicating with IoT network.

FIG. 4 illustrate the architecture of an IoT device 400. In general, IoT device communicates with 5G, 6G, beyond 5G/6G (or 7G) and WiFi networks to exchange information data. IoT device 400 through radio 403 attaches itself to a 5G, 6G, beyond 5G/6G (or 7G) or WiFi network in its surrounding environment and listens to commands to perform certain functions. Radio 403 when receives a command sends it to CPU (controller processing unit) 405 to be evaluated and performed by CPU 405 or uses other devices that are connected to CPU 405 to perform the command or commands. Then the results obtained from performing the commands through CPU 405 and radio 403 is transmitted to 5G, 6G, beyond 5G/6G (or 7G) or WiFi network for analysis.

In one embodiment, IoT device 400 includes among other things transceiver 401 which consists of antenna 402, radio 403, possible radio Ethernet port 404, CPU 405, possible Ethernet port 406 towards radio, possible IEEE1588 PTP 407, and Ethernet port 408 towards other devices.

In one embodiment, IoT device 400 through antenna 402 and radio 403 attaches to 5G, 6G, beyond 5G/6G (or 7G) or WiFi IoT network and obtains the time of day.

In another embodiment, IoT device transceiver 401 obtains the time of day through IEEE1588 PTP, downlink transmit cyclic prefix, downlink transmit unused sub-carriers, or unused bits or messages in one of downlink channels from 5G, 6G, beyond 5G/6G (or 7G) or WiFi IoT network.

In one embodiment, IoT device 400 communicates via its transceiver's CPU 405 with another device using an Ethernet port 408.

In another embodiment, IoT device 400 propagates the time of day to an external device or equipment via its transceiver's Ethernet port 408 and link 409 using IEEE1588 PTP 407.

In one embodiment, IoT device 400 receives commands or operation information data from 5G, 6G, beyond 5G/6G (or 7G) or WiFi IoT network and communicates them to an external device through its transceiver's Ethernet port 408.

In one embodiment, IoT device 400 receives detected information data from an external device through its Ethernet port 408 and transmits it to 5G, 6G, beyond 5G/6G (or 7G) or WiFi IoT network using its transceiver's radio 403 and antenna 402.

In another embodiment, IoT device 400 communicates to an external device via its transceiver's CPU 405 using a serial interface or a parallel interface instead of Ethernet interface 408.

In one embodiment, IoT device 400 communicates with other IoT devices and exchange broadcast data. The IoT device 400 uses a different frequency or channel to communicate with another IoT device in order to avoid interruption and interference.

In another embodiment, IoT device 400 communicates with other IoT devices in its surrounding environment that are in its communication range using a proprietary physical layer or 5G, 6G, beyond 5G/6G (or 7G) or WiFi network physical layer.

In one embodiment, IoT device 400 exchanges Ethernet packets or any other proprietary packets with other IoT devices in its surrounding environment.

In another embodiment, IoT device 400 communicates with a WiFi network in its surrounding environment.

In one embodiment, IoT device 400 through its transceiver 401 supports WiFi, Bluetooth, Zigbee, laser, and Infrared physical layer and over the air wireless protocols.

In one embodiment, IoT device exchange IEEE1588 PTP or proprietary messages with another IoT device or a WiFi router in surrounding environment to obtain or propagate the time of day.

In another embodiment of IoT device 400, the device that is connected to transceiver 401 through link 409 is any device or objects that is remotely controlled to perform certain function and collect certain detected information data.

Figure 5:
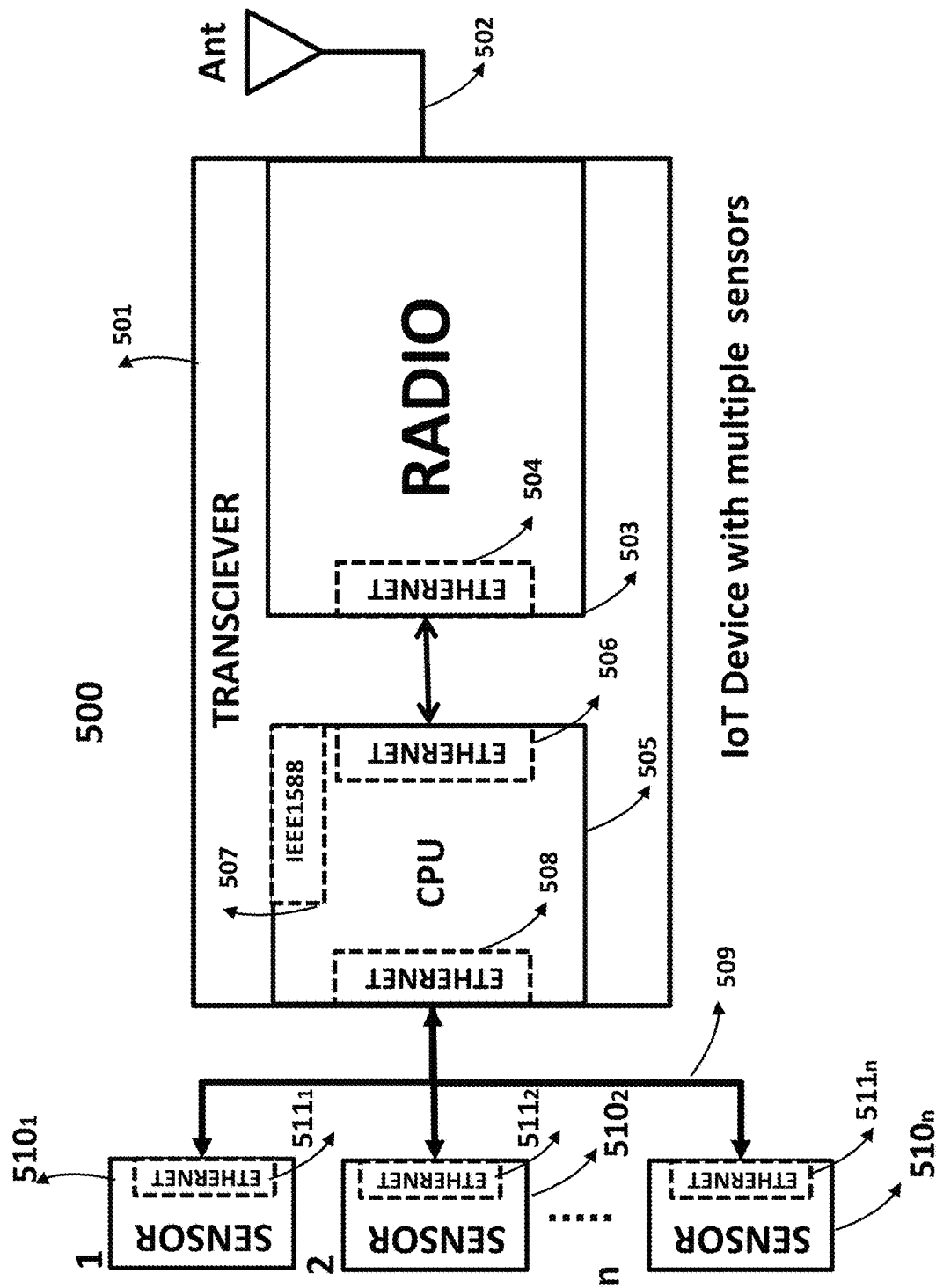
FIG. 5 depicts a typical IoT device that can be found in an environment communicating with IoT network with multiple sensors.

FIG. 5 shows the architecture of an IoT sensor network 500. In general, IoT sensor network 500 communicates with 5G, 6G, beyond 5G/6G (or 7G) and WiFi networks to exchange information data. IoT sensor network 500 through radio 503 attaches itself to a 5G, 6G, beyond 5G/6G (or 7G) or WiFi network in its surrounding environment that supports Internet of Things and listens to commands to activate sensor network $510_1$ to $510_n$. Radio 503 when receives a command, sends it to CPU 505 to be evaluated and performed by CPU 505 or sensor network $510_1$ to $510_n$ that is connected to CPU 505. Then the results obtained from performing the commands through CPU 505 and radio 503 is transmitted to 5G, 6G, beyond 5G/6G (or 7G), WiFi network or a navigation and protection system (NPS) of an object for analysis.

In one embodiment, IoT sensor network 500 includes among other things transceiver 501 which consists of antenna 502, radio 503, possible radio Ethernet port 504, CPU 505, possible Ethernet port 506 towards radio, possible IEEE1588 PTP 507, possible Ethernet port 508 and sensor network $510_1$ to $510_n$.

In another embodiment, IoT sensor network 500 uses an external monitoring sensor network $510_1$ to $510_n$ that can perform various functions autonomously or through commands that sent to it remotely.

In one embodiment, IoT sensor network 500 uses an external sensor network $510_1$ to $510_n$ that communicates with transceiver 501 through Ethernet ports 5111 to 511n.

In another embodiment, the sensor network $510_1$ to $510_n$ can be a monitoring network $510_1$ to $510_n$ or a mix of sensors, monitoring devices, ranging IoT devices, autonomous devices, IoT devices and remotely controlled devices or equipments $510_1$ to $510_n$.

In one embodiment, each device within network of devices $510_1$ to $510_n$ has an IP (internet protocol) address that identifies the device.

In another embodiment, each device within network of devices $510_1$ to $510_n$ uses its serial number for its identity.

In one embodiment of IoT sensor network 500, at least one of an Ethernet packets and a proprietary packets is used for communication between transceiver 501 and devices/equipment $510_1$ to $510_n$.

In another embodiment, the link 509 between Ethernet port 508 or port 508 of transceiver 501 and Ethernet ports 5111 to 511n or ports 5111 to 511n of devices $510_1$ to $510_n$ is a wired link, a wireless link or a mix of wired and wireless.

In another embodiment of IoT sensor network 500, the wired link 509 is a standard serial interface, a proprietary serial interface, or a parallel interface.

In one embodiment of IoT sensor network 500, the wireless link 509 between transceiver 501 and devices $510_1$ to $510_n$ is at least one of Bluetooth, Zigbee, WiFi, Infrared, laser, or any proprietary wireless link.

In one embodiment, IoT sensor network 500 receives an absolute time TOD, and a time slot from 5G, 6G, beyond 5G/6G (or 7G) or WiFi network for its various activities as well as scheduling activities of the external devices connected to IoT sensor network 500. Sensor network $510_1$ to $510_n$ is slave IoT device network $510_1$ to $510_n$.

In one embodiment of the IoT sensor network 500, the sensor network $510_1$ to $510_n$ is slave IoT network $510_1$ to $510_n$.

Figure 6:
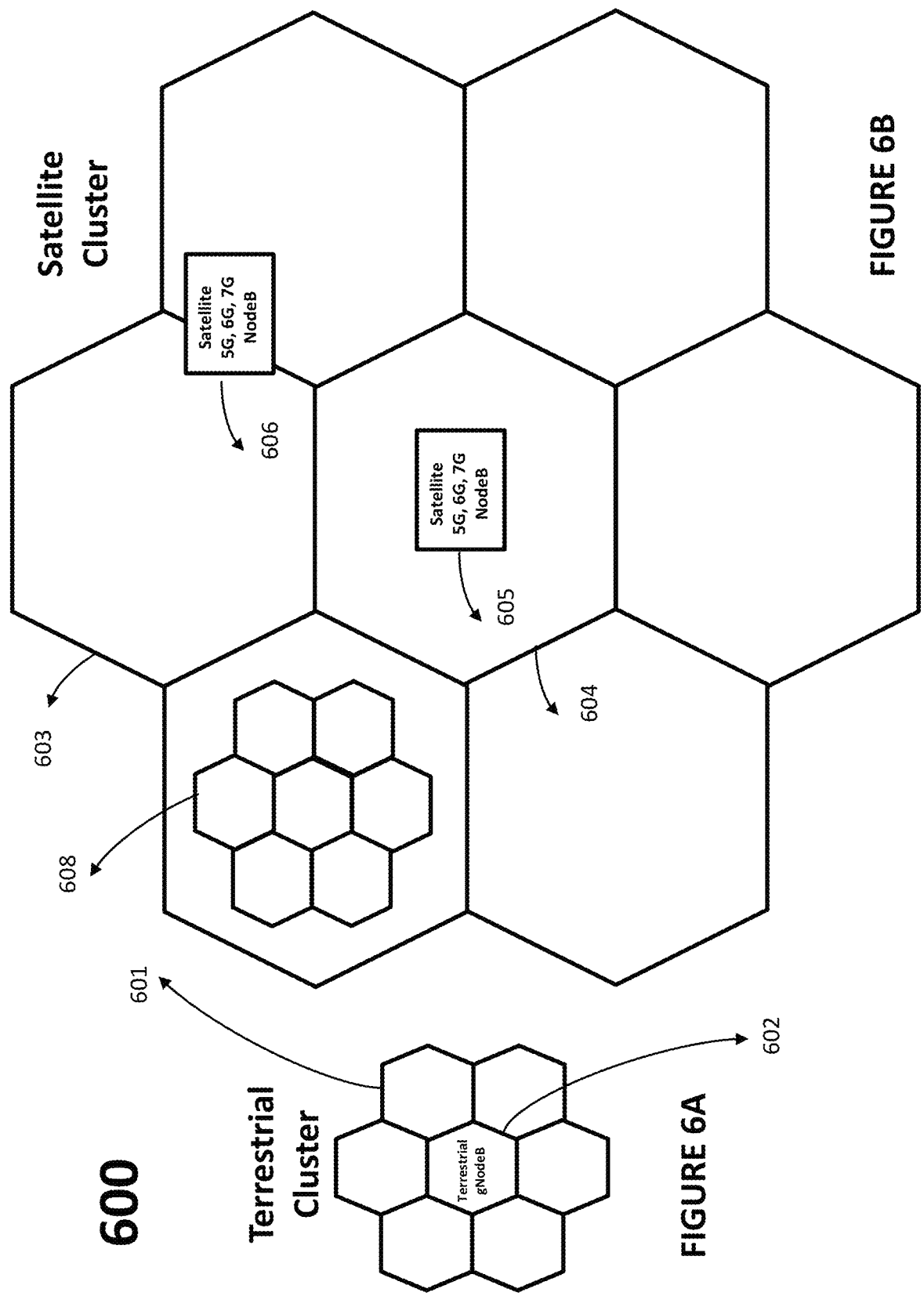
FIG. 6A illustrates a terrestrial cluster.
FIG. 6B illustrates a satellite cluster.

FIGS. 6A and 6B depict hexagon geometry 600 for terrestrial and satellite application. The design objective of early mobile radio systems was to achieve a large coverage area using a single, high powered transmitter with an antenna mounted on a tall tower. A cellular concept is a system-level idea which calls for replacing a single, high power transmitter (large cell) with many low power transmitters (small cell) each providing a coverage to only a small portion of the service area.

When considering geometric shapes which cover an entire region without overlap and with equal area, there are three sensible choices—a square, an equilateral triangle, and a hexagon. For a given distance between the center of a polygon and its farthest perimeter points, the hexagon has the largest area of the three. Thus, by using hexagon geometry, the fewest number of cells can cover a geographic region, and hexagon closely approximates a circular radiation pattern which would occur for an Omni-directional base station antenna and free space. When using hexagon, base station transmitter (RU) is in the center of the cell (Omnidirectional antenna) or on the three of the six cell vertices (directional antenna).

Each cellular base station (RU, RRU, gNodeB, eNodeB) is allocated a group of radio channels to be used within a small geographic area called cell. Base stations (RU, RRU, eNodeB, gNodeB) in adjacent cells are assigned channel groups which contain completely different channels than neighboring cells. By limiting the coverage area to within the boundaries of a cell, the same groups of channels may be used to cover different cells that are separated from one another by distances large enough to keep the interference levels within tolerable limits. The design process of selecting and allocating channel groups for all the cellular base stations (RU, RRU, eNodeB, gNodeB) is called frequency reuse or frequency planning.

Advances in interference cancellation techniques today allow a receiver to operate with higher levels of co-channel interference. The motivation of improving a receiver's performance in co-channel interference is to increase the spectrum efficiency of a system usually by allowing a greater geographical re-use of frequencies. It is a general principle that a communication system should be designed to avoid interference in the first place, either through network planning or with effective radio resource management and medium access control.

Terrestrial base stations (RU, RRU, eNodeB, gNodeB) are stationary and located in the center (or vertices) of a hexagon cell as shown in FIG. 6A. The terrestrial cluster 601 has a center cell 602 and 6 cells attached to its peripheral. This cluster grows by adding new cells to expand the coverage area. Cells in the architecture of FIG. 6A and the moving objects within the cells are all controlled by SOMC. The shared database SD stores location coordinate of the base stations (RU, RRU, eNodeB, gNodeB), type of base stations (sectors, transmit power, height of antenna, type of tower, service providers using the tower, type of power supply), the terrain map of the cells, street and road map of the cells, one way or two way roads, allowed or not allowed right turn at red light, location coordinates of junctions and traffic lights, type of junctions, type of street and road (one lane, two lanes, multiple lanes, road and street curbs and center barriers), type of stationary objects in the cells, type of buildings (height, type of body structure), specific information for moving object's navigation and protection system (NPS), and service providers using the cells. Some of the data in SD are fixed and some dynamically change.

For flying objects, it is also possible to use hexagon cell architecture as shown in FIG. 6B. They can be called satellite clusters 603 because each cell 604 needs to cover a much wider area compared with terrestrial cells. In other words, a satellite cell can cover an area that multiple of terrestrial cells cover. The base stations (RU, RRU, eNodeB, gNodeB) serving satellite cells are either fix or mobile.

Fix base stations are the same as base stations for terrestrial cells. The only difference is elevation of the antenna and antenna radiation pattern. For satellite base station a very tall tower or a very tall building can be used to provide coverage for a wide area. The radiation pattern of the antenna is also important. The pattern needs to minimize any radiation towards the ground. Due to high elevation of antenna and the specific radiation pattern the waves travel in free space with minimum multipath fading.

Moving base stations 606 are either flying balloons or low orbit satellites. These base stations provide RU and RRU and possibly more functions of eNodeB and gNodeB. Satellite and balloon base station (RU, RRU, eNodeB, gNodeB) can also serve the moving objects on the ground due to less multipath fading. The main issue with moving satellite base stations is their latency. However, if low orbit satellite is used the latency can be reduced to around 20 milliseconds. Like terrestrial cells satellite cells also use SD and SOMC and store all their information, specification, and capabilities in the SD to be used by SOMC to control navigation and protection system (NPS) of both moving objects and flying objects.

Figure 7:
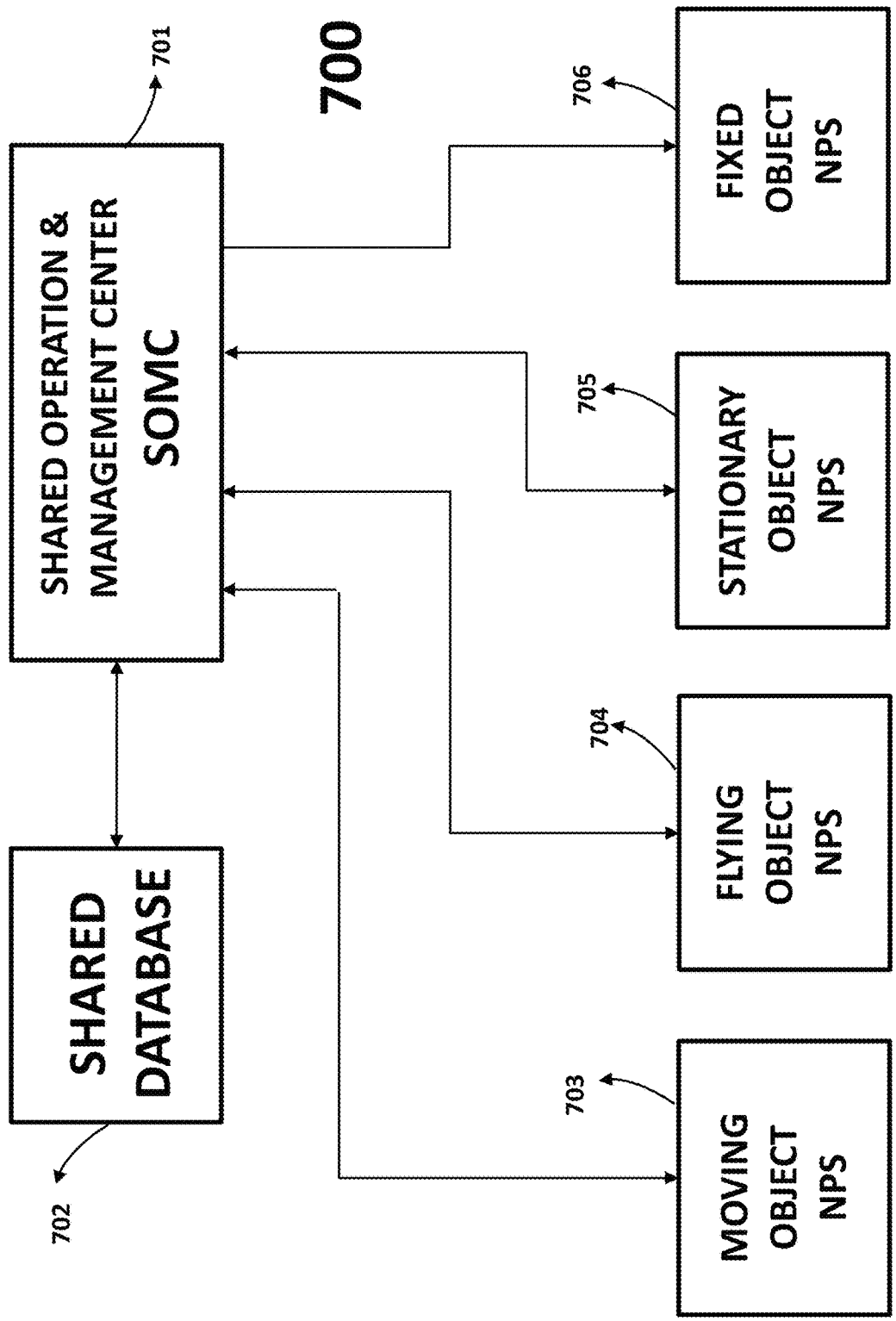
FIG. 7 shows an object control system OCS.

FIG. 7 shows moving and flying objects control system (OCS) 700. The object control system 700 uses SOMC (702) and SD (701) to control the navigation and protection of moving and flying objects that support IoT network and IoT devices in a smart environment. Object control system 700 uses time of day (TOD) to schedule activities of the moving (703), flying (704), stationary (705), and fixed (706) objects in the smart environment to allow all objects within object control system 700 operate freely with no interference and collision.

Fixed objects (IoT devices) 706 are those that do not communicate with the IoT network. They only used by stationary objects and communicate with a master IoT device used by the stationary object 705. The master IoT device of a stationary object 705 communicates with SOMC 702 and SD 701 through IoT network. Fixed objects 706 are slave IoT devices that use IEEE1588 protocol to achieve clock synchronization and obtain time of day from the master IoT device of a stationary object 705. The master IoT device through IoT network exchange necessary information data with SOMC 702 and SD 701 and communicates with slave IoT devices to share operation information data (OID). Fixed objects 706 may also use method 930 shown in FIG. 10C to obtain TOD.

Figure 8:
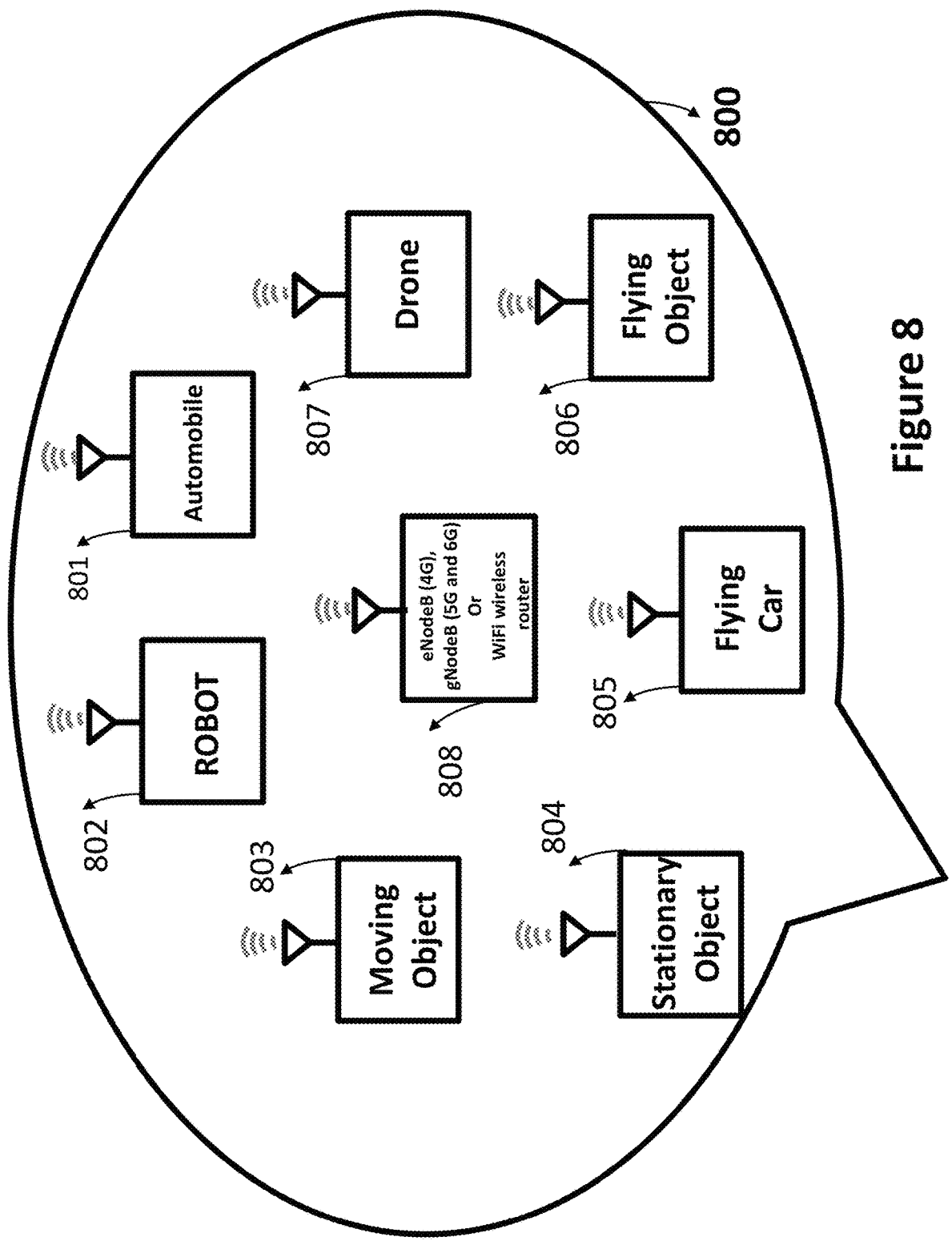
FIG. 8 illustrates moving vehicles, flying vehicles/objects, and stationary objects in a smart environment communicating with 4G, 5G and 6G Remote Radio Unit (RRU) and Radio Unit (RU) respectively.

FIG. 8 depicts a smart environment 800 with objects (IoT devices) that communicate with a public or private network. In general, the smart environment 800 in addition to open space consists of various fixed, stationary, moving and flying objects (IoT devices) that are capable of wirelessly communicate with other objects (IoT devices) as well as a public or private communication network. In the smart environment 800 all the objects (IoT devices) coexist synchronously in time (time of day) and operate freely without any interruption, interference, and collision. All the objects (IoT devices) in smart environment 800 are registered with 5G, 6G, beyond 5G/6G (or 7G) or WiFi networks through their eNodeB, gNodeB base station or wireless router 808. The 5G, 6G, beyond 5G/6G (or 7G) or WiFi networks broadcasts certain information data to all objects (IoT devices) in smart environment 800 that are registered with 5G, 6G, beyond 5G/6G (or 7G) or WiFi networks through their gNodeB, or wireless router. The broadcast information data is updated when an object (IoT device) exit (deregister with gNodeB of 5G, 6G, beyond 5G/6G networks or wireless router of WiFi network) or enter (register with gNodeB of 5G, 6G, beyond 5G/6G network or wireless router of WiFi network) the smart environment 800. The base station 808 can also support future 7G network and all objects (IoT devices) in smart environment 800 register with 7G network through wireless base station 808 and receive broadcast information data from 7G network.

In one embodiment, smart environment 800 includes, among other things, automobile 801, robot 802, moving object 803, stationary object 804, flying car 805, flying object 806, drone 807, and a wireless base station 808 that supports a public (eNodeB, or gNodeB of 4G, 5G, or 6G network, base station of 7G, and wireless router of a WIFi network) or private wireless communication network.

In one embodiment, the wireless base station 808 is a cellular (5G or 6G (7G), beyond 5G and 6G) small cell, macro-cell, micro-cell or picocell.

In another embodiment, the wireless base station 808 is a WiFi wireless router that is connected to the IP network as well as cellular network (5G, 6G (7G), or beyond 5G and 6G).

In one embodiment, the wireless base station 808 is part of a private network that is connected to IP network as well as cellular network (5G, 6G (7G), and beyond 5G and 6G).

In one embodiment, wireless base station 808 is a 5G RU, a 6G RU or beyond 5G/6G RU.

In another embodiment, the wireless base station (5G, 6G (7G), or beyond 5G and 6G) communicates with the stationary, moving and flying objects in the smart environment 800 and obtains type, function, status (for traffic light color, green, yellow, or red), specification (includes dimension, and slave IoT devices specification), location (obtained from GPS receiver), identity number, signal propagation time through transmitter of the IoT device's (master or slave) wireless transceiver up to the input of transmit antenna, and estimated mass from objects 801, 802, 803, 804, 805, 806 and 807.

In one embodiment, wireless base station (5G, 6G (7G), or beyond 5G and 6G) 808 in the smart environment 800 broadcast some of the information obtained from each object 801, 802, 803, 804, 805, 806 and 807 to all objects (IoT devices) in smart environment 800.

In one embodiment, all moving and stationary objects 801, 802, 803, 804, 805, 806 and 807 continuously update the information data they obtain from wireless base station 808 related to other objects in their surrounding smart environment 800.

In another embodiment, the identity number of each object in the smart environment 800 is the object's serial number, a MAC address or an IP address that is an IP4 or IP6.

In one embodiment, the wireless base station 808 uses GPS to obtain clock synchronization and time of day.

In another embodiment, all objects (IoT devices) in the smart environment 800 receive time of day and their location coordinates from GPS receiver.

In another embodiment, a stationary object (IoT device) in the smart environment has its location coordinates manually program to it or obtains from base station 808.

In one embodiment, the wireless base station (5G, 6G (7G), or beyond 5G and 6G) or WiFi router 808 in smart environment 800 supports IEEE1588 (Institute of electrical and electronic engineering synchronization standard 1588) PTP which provides clock synchronization and time of day for wireless base station 808 through any port in data communication network as well as 5G, 6G (7G), beyond 5G and 6G or WiFi network.

In another embodiment, all moving and stationary objects (IoT devices) 801, 802, 803, 804, 805, 806 and 807 also supports IEEE1588 to obtain time of day.

In one embodiment, wireless base station (5G, 6G (7G), beyond 5G and 6G or WiFi) 808 broadcasts to each moving and stationary object (IoT device) 801, 802, 803, 804, 805, 806 and 807 an absolute time and a time slot when they can broadcast their information or communicate with other IoT devices.

In one embodiment, the absolute times and time slots assigned by IoT network (5G, 6G (7G), beyond 5G and 6G or WiFi) to various IoT devices is constant or dynamically changes depending on the time of day or load on the IoT network.

In another embodiment, IoT network (5G, 6G (7G), beyond 5G and 6G or WiFi) assigns an absolute time and a time slot for broadcasting and communication to each IoT device registered with the IoT network.

In one embodiment, the time window (slot) assigned to each IoT device by IoT network (5G, 6G (7G), beyond 5G and 6G or WiFi) is constant and identical for all registered IoT devices with the IoT network, different for each IoT device, dynamically changes by the IoT network, or requested by IoT device.

In one embodiment, wireless base station (5G, 6G (7G), beyond 5G and 6G or WiFi) 808 broadcasts to each moving and stationary object (IoT device) 801, 802, 803, 804, 805, 806 and 807 the absolute time and time slot when their sensors can collect data.

In one embodiment, wireless base station (5G, 6G (7G), beyond 5G and 6G or WiFi) 808 broadcasts to each moving and stationary object (IoT device) 801, 802, 803, 804, 805, 806 and 807 the absolute time and time slot when their wireless sensors can perform ranging to measure a distance and an approaching speed of an object in their surrounding smart environment.

In one embodiment, wireless base station (5G, 6G (7G), beyond 5G and 6G or WiFi) 808 broadcasts to each moving and stationary object (IoT device) 801, 802, 803, 804, 805, 806 and 807 the carrier frequency, channel, bandwidth, and modulation for their wireless sensor.

In one embodiment, wireless base station (5G, 6G (7G), beyond 5G and 6G or WiFi) 808 broadcasts to each moving and stationary object (IoT device) 801, 802, 803, 804, 805, 806 and 807 the carrier frequency, channel, modulation, data rate, range of output power, and over the air protocol (type of transceiver which is one of 5G, 6G (7G), beyond 5G and 6G, WiFi, Bluetooth, Zigbee, laser, proprietary, or infrared) for ranging as well as broadcasting and communicating with other IoT devices.

In one embodiment, each moving and stationary object (IoT device) 801, 802, 803, 804, 805, 806 and 807 exchange Ethernet packets with wireless base station 808.

In one embodiment, each moving and stationary object (IoT device) 801, 802, 803, 804, 805, 806 and 807 exchange Ethernet packets among each other based on the absolute time and time slot assigned to them by the base station 808.

In one embodiment, the link between each moving and stationary object (IoT device) 801, 802, 803, 804, 805, 806 and 807 and wireless base station (5G, 6G (7G), beyond 5G and 6G or WiFi) 808 is an over the air Ethernet link.

In one embodiment, communication link between each moving and stationary object (IoT device) 801, 802, 803, 804, 805, 806 and 807 and the cloud network, data network, and core network through wireless base station (5G, 6G (7G), beyond 5G and 6G or WiFi) 808 supports a single end-to-end Ethernet packet protocol.

In another embodiment, moving and stationary object (IoT device) 801, 802, 803, 804, 805, 806 and 807 use their wireless sensor to broadcast their broadcast data.

In one embodiment, moving and stationary objects (IoT devices) 801, 802, 803, 804, 805, 806 and 807 support WiFi, Bluetooth, Zigbee, Infrared, laser and proprietary wireless transceivers and use them for ranging and to broadcast their broadcast data or transmit and receive Ethernet packets or frames.

FIG. 9A depicts OFDM transmit symbol signal 810 before adding cyclic prefix. 5G, 6G (7G), beyond 5G and 6G use OFDM (orthogonal frequency division multiplexing) in their transmit path. The duration of transmit signal is one OFDM symbol 811 for 4G eNodeB and 5G (6G) gNodeB. The transmit signal 850 consists of "n" samples $x_1$ to $x_n$ 812. To eliminate inter-symbol interference "n-m" samples 813 from end of OFDM symbol are copied at the beginning of symbol or some samples from the beginning of OFDM symbol are copied at the end of symbol. The "m to n" samples are called cyclic prefix and the duration of it depends on radius of coverage of RRU and RU transmitters. These "m to n" samples at the receiver of user equipment UE (IoT device) are removed by using correlation before performing the receiver functions.

FIG. 9B shows transmit signal with cyclic prefix 814 that is added at the beginning of transmit symbol which consists of "n" samples $x_1$ to $x_n$ 812. Samples $x_m$ to $x_n$ from end of transmit symbol are copied at the beginning of "n" samples $x_1$ to $x_n$ as cyclic prefix 814. In the UE (IoT device) receiver cyclic prefix 814 is removed from received signal before the receive process starts. The process of removal of cyclic prefix is a circular correlation. The highest correlation is achieved when all samples in cyclic prefix are matched. There is always possible one or more samples in cyclic prefix are not matched due to various impairment and results in lower amount of correlation but still removal of cyclic prefix is possible. Therefore, it is possible to use one or more samples in cyclic prefix to transmit time of day to user equipment UE (IoT device).

In one embodiment of transmit signal 810 one or more samples of cyclic prefix 814 samples $x_m$ to $x_n$ is used to send the time of day to user equipment UEs or IoT devices.

In another embodiment the samples used from cyclic prefix 814 for transmitting time of day are at the start, middle, or end of cyclic prefix 814.

In another embodiment the samples used from cyclic prefix 814 for transmitting time of day are at any location in cyclic prefix 814 and the location do not change until TOD data is transmitted.

In one embodiment the time of day is sent to user equipment UEs, or IoT devices over several transmit OFDM symbols.

In one embodiment the time of day includes date and time of day and date include year, month and day.

In one embodiment the bits in samples from cyclic prefix 814 are used for transmission of time of day to UEs or IoT devices.

In another embodiment the top bits in sample $(x_m)$ 815 of cyclic prefix are used to send time of day in order to mitigate effect of any noise, interference or fading.

In one embodiment only one sample of cyclic prefix 854 is used for transmitting the time of day and the first sample that is used for time of day has a detectable bit pattern to indicate that next samples at the same location in next cyclic prefixes contain the time of day.

In one embodiment, more than one sample of cyclic prefix 814 is used for transmitting the time of day and the first samples that are used for time of day have a detectable bit pattern to indicate that next samples whether in present cyclic prefix or next cyclic prefixes contain the time of day.

In another embodiment the first sample of first cyclic prefix carries the hour, the first sample of second cyclic prefix carries the seconds, the first sample of third cyclic prefix carries the milliseconds, the first sample of forth cyclic prefix caries the microseconds, the first sample of fifth cyclic prefix caries nanoseconds, and if more accuracies are available the first sample of sixth cyclic prefix carries the picoseconds.

In one embodiment the bits used to represent the time of day are compressed (using one of compression algorithms) in order to use less cyclic prefix samples for transmission of time of day.

There is a time difference between transmissions of two cyclic prefixes. During this time difference the date, hour $(T_h)$, second $(T_s)$, millisecond $(T_m)$, microsecond $(T_\mu)$, or nanosecond $(T_n)$ of time of day can be incremented and this creates a significant time error between RU/RRU and UEs or IoT devices. Therefore, before sending time of day there is a need to find out if one of $(T_h)$, $(T_s)$, $(T_m)$, $(T_\mu)$, or nanosecond $(T_n)$ will be incremented during the transmission of complete time of day.

In one embodiment the date, hour $(T_h)$, second $(T_s)$, millisecond $(T_m)$, microsecond $(T_\mu)$, or nanosecond $(T_n)$ of time of day if needed is incremented before being sent to UE or IoT device.

In another embodiment, the time of day before being sent to UE or IoT device is adjusted for propagation time of IFFT through transmitter path of RU/RRU or BBU/DU up to antenna in order to reduce the time error between time of day at RU/RRU (or BBU/DU) and UEs or IoT devices.

In one embodiment the date and time of day that is sent to UE or IoT device is repeated or updated with a configurable time interval.

FIG. 9C depicts a typical coverage of RRU/RU in a 4G, 5G, 6G, or (7G) wireless network. UEs or IoT devices A, B, and C are at different distance from RU/RRU. Therefore, UEs or IoT devices A, B, and C receive time of day at different time which results in time error between UEs or IoT devices. These UEs or IoT devices when transmit to RU/RRU need to adjust their transmission time based on their time alignment or time advance which compensate for their difference in distance from RRU/RU. The time alignment or time advance is used to eliminate the error in time of day at UEs or IoT devices A, B, and C and make all UEs or IoT devices have the same time of day.

In one embodiment UEs or IoT devices that are at different distance from their common RRU/RU use their time alignment or time advance to adjust the time of day received from RRU/RU in order to have the same time of day.

In 4G, 5G, and 6G (or 7G) it is possible to use downlink methods like cyclic prefix to transmit time of day to UEs or IoT devices. These methods can utilize unused subcarriers or unused bits or messages in various downlink channels. For instance, in 4G (as well as 5G and 6G) LTE there are two cell search procedures: one for initial synchronization and another for detecting neighbor cells in preparation for handover. In both cases the UE or IoT device uses two special signals broadcast on each RRU: Primary Synchronization Sequence (PSS) and Secondary Synchronization Sequence (SSS). The detection of these signals allows the UE or IoT device to complete time and frequency synchronization and to acquire useful system parameters such as cell identity, cyclic prefix length, and access mode (FDD/TDD).

In the frequency domain, the PSS and SSS occupy the central six resource blocks (RBs, 72 subcarriers), irrespective of the system channel bandwidth, which allows the UE or IoT device to synchronize to the network without a priori knowledge of the allocated bandwidth. The synchronization sequences use 62 sub-carriers in total, with 31 sub-carriers mapped on each side of the DC sub-carrier which is not used. This leaves 5 sub-carriers at each extremity of the 6 central RBs unused. These 10 unused sub-carriers can be used to transmit time of day to UEs or IoT devices. Like cyclic prefix the time of day should be adjusted for propagation time through transmitter path up to transmit antenna port in order to minimize time difference between gNodeB/eNodeB (RU/RRU) and UEs or IoT devices. During transmission of the time of day it is possible one of $(T_h)$, $(T_s)$, $(T_m)$, $(T_\mu)$, and $(T_n)$ has to be incremented before being sent to UEs or IoT devices due to the time it takes to transmit the time of day.

In one embodiment unused downlink sub-carriers is used to transmit time of day to UEs or IoT devices.

It is also possible to utilize unused bits or messages in various downlink channels of 4G, 5G, or 6G (7G) to transmit the time of day like unused sub-carriers.

In another embodiment unused bits or messages of various downlink channels is used to transmit time of day to UEs or IoT devices.

In one embodiment when unused downlink sub-carriers, bits, or messages are used, due to the time takes to send all the data, the day, hour $(T_h)$, second $(T_s)$, millisecond $(T_m)$, microsecond $(T_\mu)$, or nanoseconds $(T_n)$, of time of day if needed is incremented before being sent to UE or IoT device.

Figure 9D:
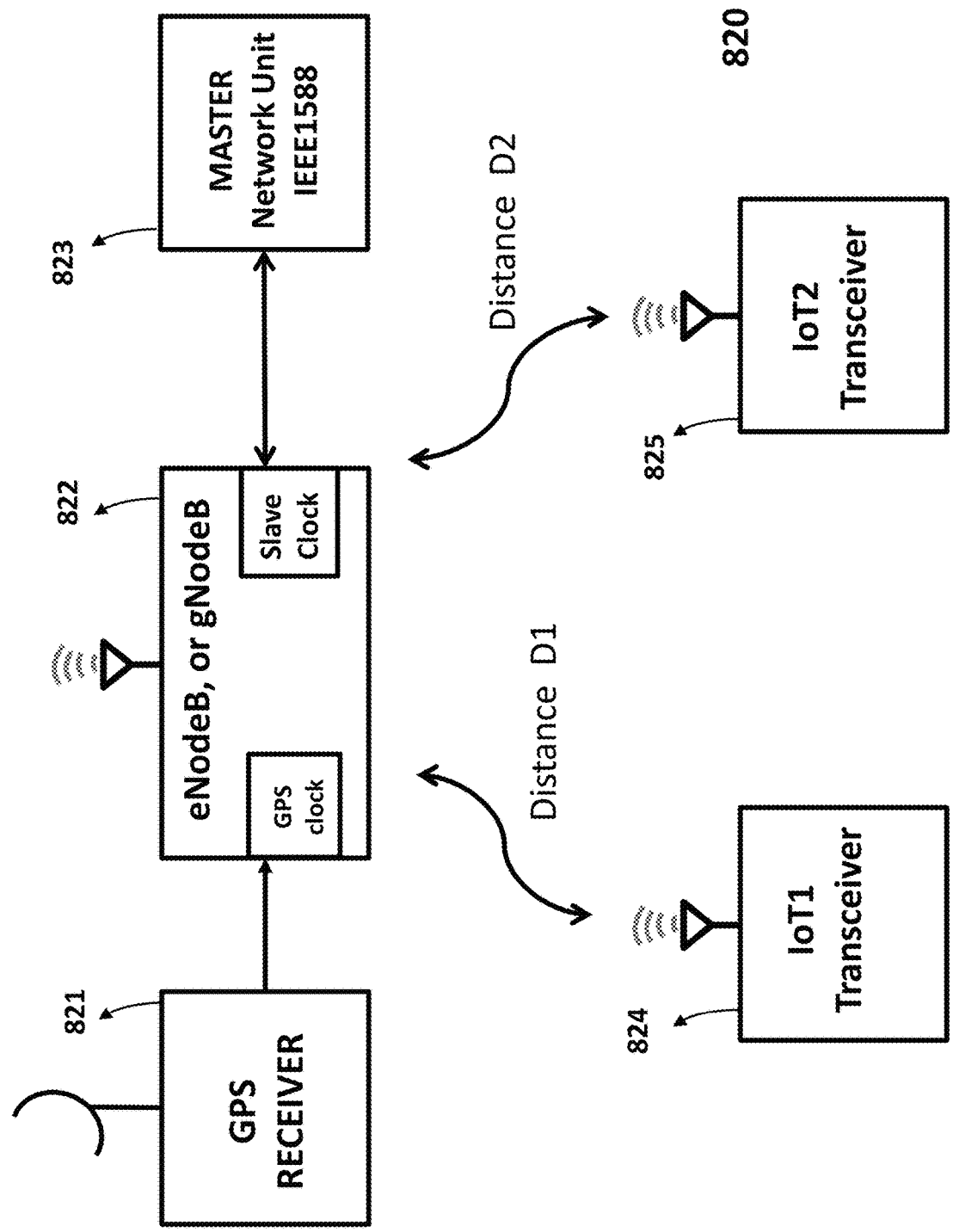
FIG. 9D shows methods of achieving clock synchronization and obtaining time of day for eNodeB or gNodeB.

FIG. 9D shows method 820 of achieving clock synchronization and obtaining time of day for eNodeB or gNodeB. The eNodeB or gNodeB 822 uses two methods for clock synchronization and time of day. One method is to use GPS receiver 821 and another method is to act as a slave network and exchanges IEEE1588 PTP messages with a master network 823.

IoT1 device 824 and IoT2 device 825 with distance D1 and D2 from eNodeB or gNodeB 822 both frequency and phase synchronize with the eNodeB or gNodeB 822 using over the air protocol.

Figure 9E:
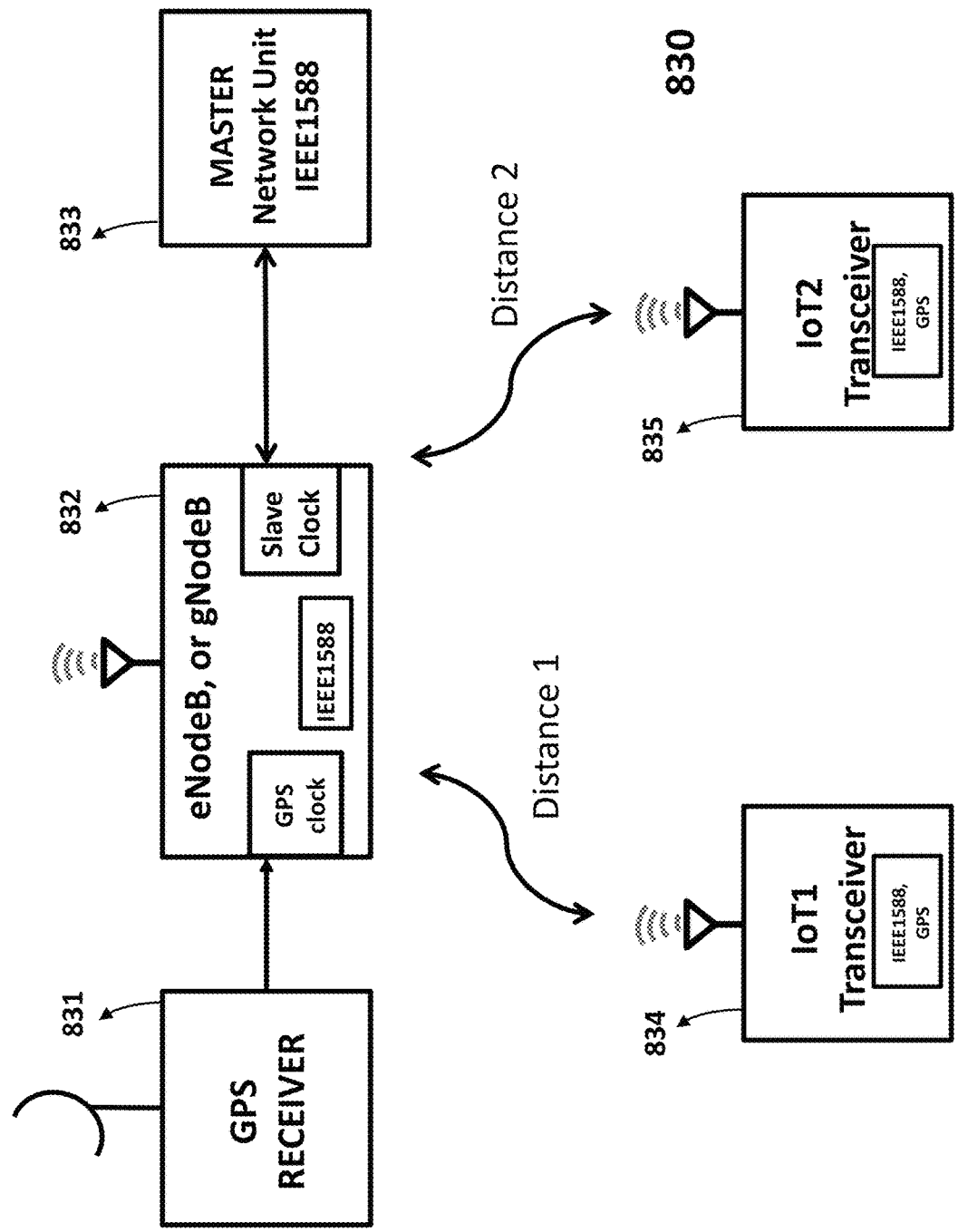
FIG. 9E shows an IoT device using IEEE1588 to obtain time of day.

FIG. 9E shows method 830 where an IoT device uses IEEE1588 to obtain time of day. The eNodeB or gNodeB 832 uses either GPS receiver 831 or IEEE1588 PTP from a master network unit 833 to achieve clock synchronization and obtain time of day. IoT1 device 834 and IoT2 device 835 with distance D1 and D2 from RRU or RU 832 both frequency and phase synchronize with the eNodeB or gNodeB 832 using over the air protocol. To obtain time of day IoT1 device 834 and IoT2 device 835 exchange IEEE1588 PTP messages with eNodeB or gNodeB 832 or use GPS.

Figure 9F:
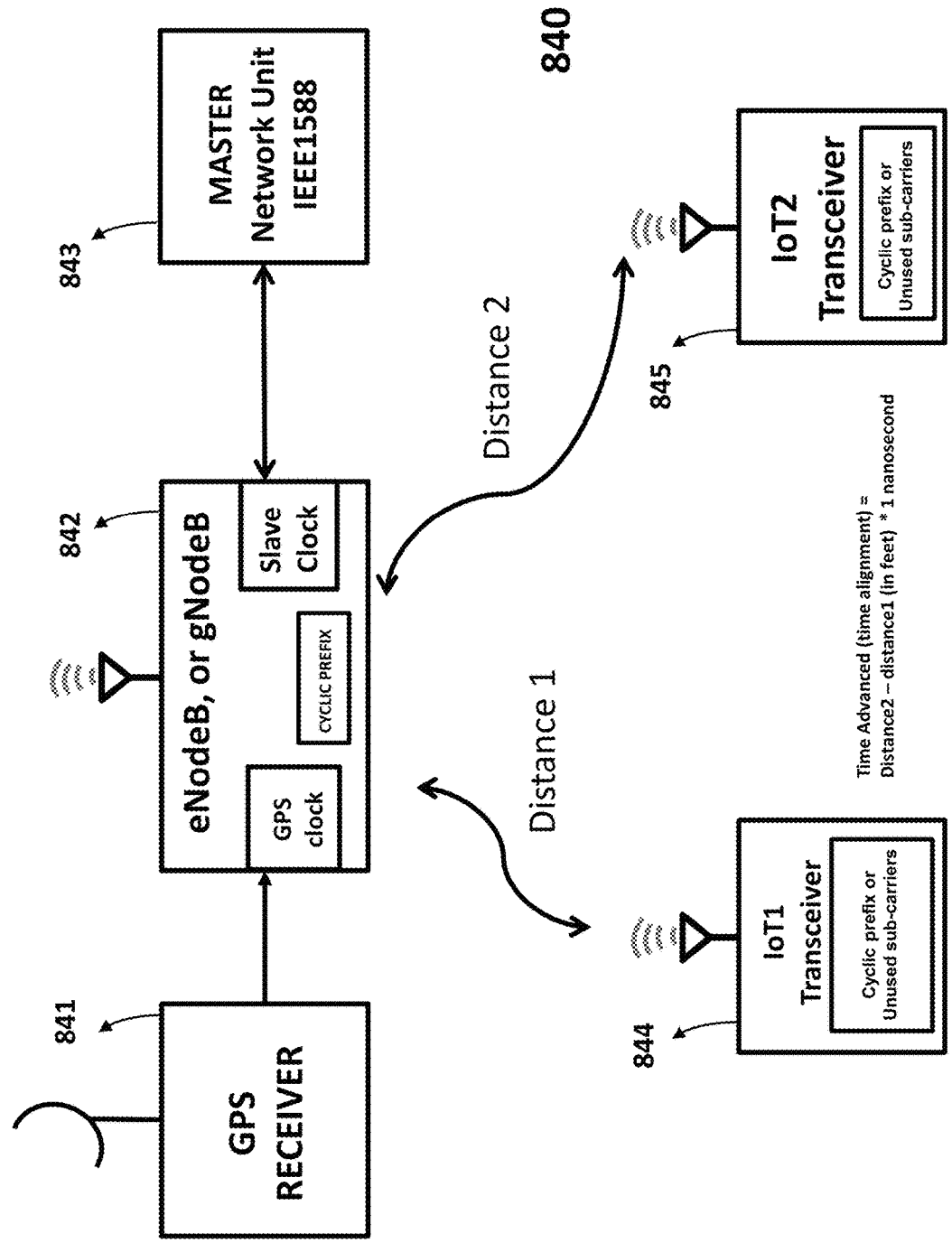
FIG. 9F illustrates an IoT device using cyclic prefix or unused subcarriers to obtain time of day (TOD).

FIG. 9F illustrates method 840 where IoT device uses cyclic prefix or unused subcarriers to obtain time of day (TOD). The eNodeB or gNodeB 842 uses either GPS receiver 841 or IEEE1588 PTP from master network unit 843 to achieve clock synchronization and obtain time of day. IoT1 device 844 and IoT2 device 845 with distance D1 and D2 from eNodeB or gNodeB 842 both frequency and phase synchronize with the eNodeB or gNodeB 842 using over the air protocol. IoT1 device 844 and IoT2 device 845 receive TOD information through cyclic prefix, unused sub-carriers, unused bits, or messages from eNodeB or gNodeB 842. Since IoT1 device and IoT2 device are at difference distances D1 and D2 from eNodeB or gNodeB 842 then time alignment or time advance is used to adjust time of day that IoT1 device and IoT2 device received from eNodeB or gNodeB 842. Time alignment or time advance for adjusting TOD may also consider the received signal propagation time between antenna port and decoder of IoT1 device or/and IoT2 device. IoT1 and IoT2 devices includes the transmit signal propagation time between modulator and antenna port and the propagation time from their antenna port to their detector.

Figure 9G:
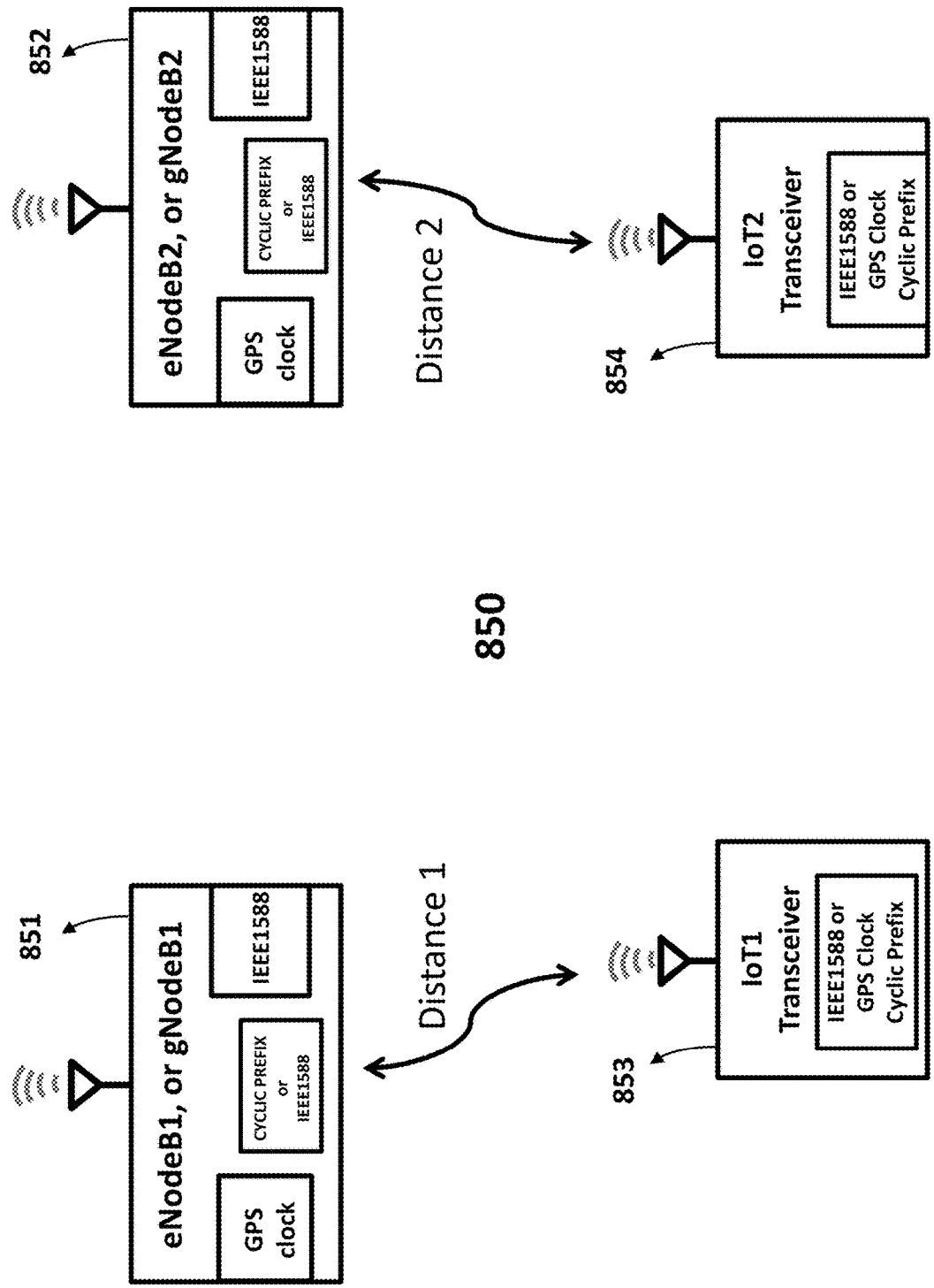
FIG. 9G shows a scenario where there are eNodeB1/gNodeB1 and eNodeB2/gNodeB2 used by two IoT devices to obtain time of day.

FIG. 9G shows a scenario 850. In scenario 850 there are eNodeB1 or gNodeB1 851 and eNodeB2 or gNodeB2 852 and both use either GPS or IEEE1588 to achieve clock synchronization and obtain time of day. They both use cyclic prefix, unused sub-carriers, unused bits, unused messages or IEEE1588 PTP to propagate time of day to IoT devices that are registered with them. In the scenario 850 as shown in FIG. 9G IoT device 853 is attached to eNodeB1 or gNodeB1 851 and IoT2 device 854 is attached to eNodeB2 or gNodeB2 852. Since eNodeB1 or gNodeB1 851 and eNodeB2 or gNodeB2 852 obtain their time of day either from GPS or IEEE1588 PTP then both IoT1 device 853 and IoT2 device 854 should have the same time of day (TOD). If there is any difference between IoT1 device and IoT2 device TOD that will be in order of several nanosecond (even if they use GPS to obtain TOD).

FIG. 10A depicts Ethernet frame 870 and broadcast frame 880.

In one embodiment the broadcast frame 880 uses similar structure as Ethernet frame 870.

In one embodiment the broadcast frame 880 sends the time of day in the payload.

In one embodiment the broadcast frame 880 instead of sending destination address sends the time of day.

In another embodiment the source address (which is a media access control MAC address) of the broadcast frame 880 or an IP address is the identity code of a transceiver (IoT device, sensor, WiFi router, RRU, RU, private base station, or any other wireless device).

In one embodiment, two wireless devices (IoT devices, sensors, and others) use Ethernet packets or frame to exchange information between them when both source and destination addresses are used to identify the two wireless devices. One wireless device retrieves the address of another wireless device from its broadcast packet and then using Ethernet packets establishes direct communication between them to exchange information data.

Figure 10B:
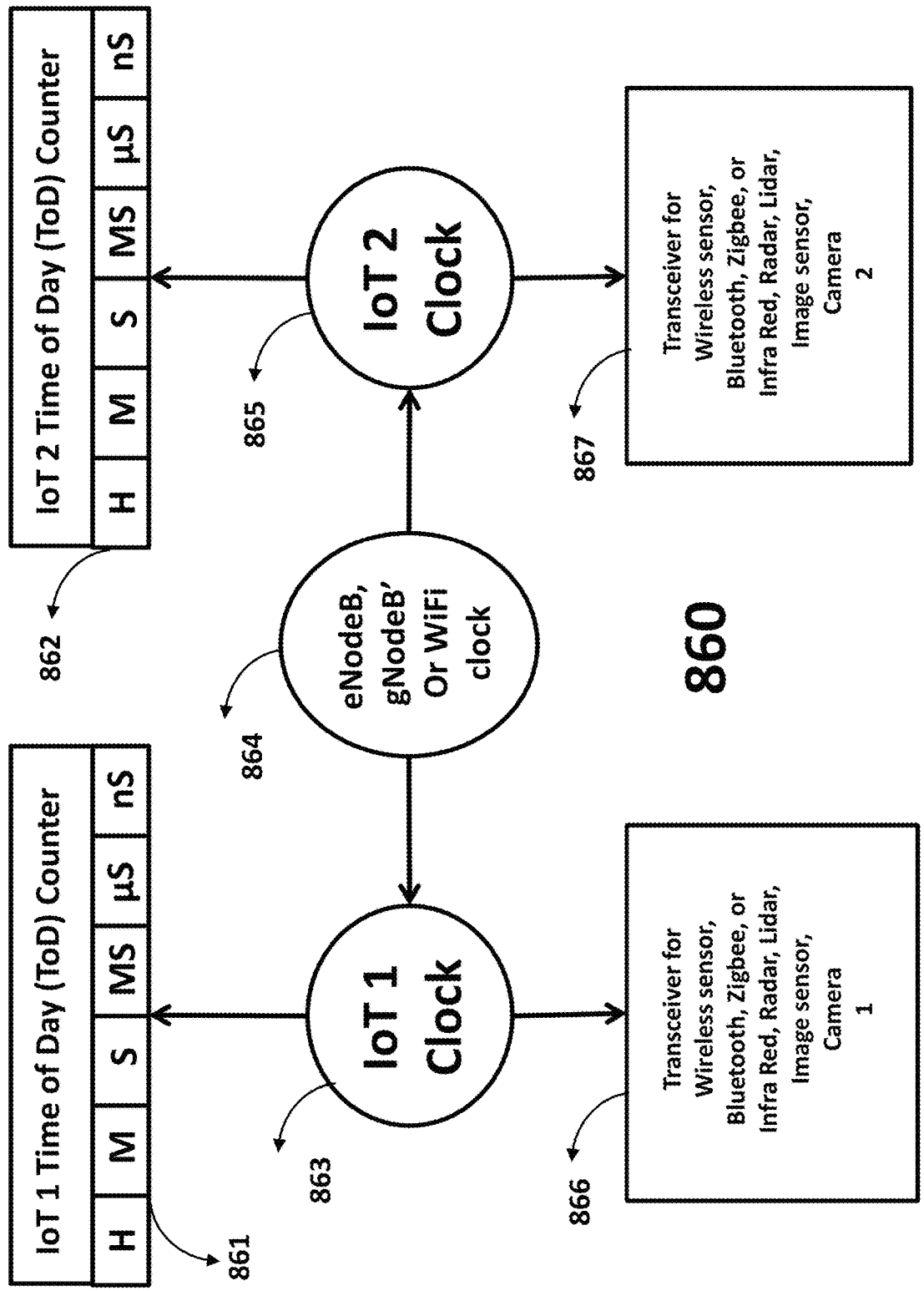
FIG. 10B shows two IoT devices having their clock's frequency and phase synchronized with eNodeB, or gNodeB.

FIG. 10B shows two IoT devices 860. Both IoT1 device and IoT2 device have their clocks 863 and 865 frequency and phase synchronized with eNodeB, gNodeB or WiFi clock 864. IoT1 and IoT2 devices 866 and 867 can support a wireless sensor transceiver, a Bluetooth transceiver, a Zigbee transceiver, an Infrared transceiver, a Radar transceiver, a Lidar transceiver, an ultrasonic transceiver, a WiFi transceiver, and a 4G, 5G, 6G, or 7G transceiver. IoT1 and IoT2 devices 866 and 867 use 4G, 5G, 6G, or 7G transceiver to obtain clock frequency and phase synchronization from 4G, 5G, 6G, or 7G eNodeB, gNodeB or WiFi 864. Both IoT devices support Radar, Lidar, ultrasonic, and Camera.

IoT1 clock 863 increments time of day 861 for IoT1 device 866 and IoT2 clock 865 increments time of day 862 for IoT2 device 867. Both IoT devices 866 and 867 use eNodeB, gNodeB 864, or WiFi to achieve clock frequency and phase synchronization as well as obtaining time of day 861 and 862. IoT1 device 866 and IoT2 device 867 can also use GPS to obtain time of day and the clock. IoT1 device 866 and IoT2 device 867 should have their transmit frequency +/−0.1 part per million (PPM) accurate compared with the frequency they receive from eNodeB or gNodeB 864. Worst case scenario is when IoT1 device 866 transmit frequency is +0.1 PPM compared with received frequency and IoT2 device 867 transmit frequency is −0.1 PPM compared with received frequency from eNodeB or gNodeB 864. A difference of 0.2 PPM between IoT1 clock 863 and IoT2 clock 865 produce very negligible error when used for incrementing IoT1 time of day 861 and IoT2 time of day 862. In addition, IoT1 clock 863 and IoT2 clock 865 as well as IoT1 TOD 861 and IoT2 TOD 862 are continuously updated to prevent error accumulation and maintain any error negligible.

Figure 10C:
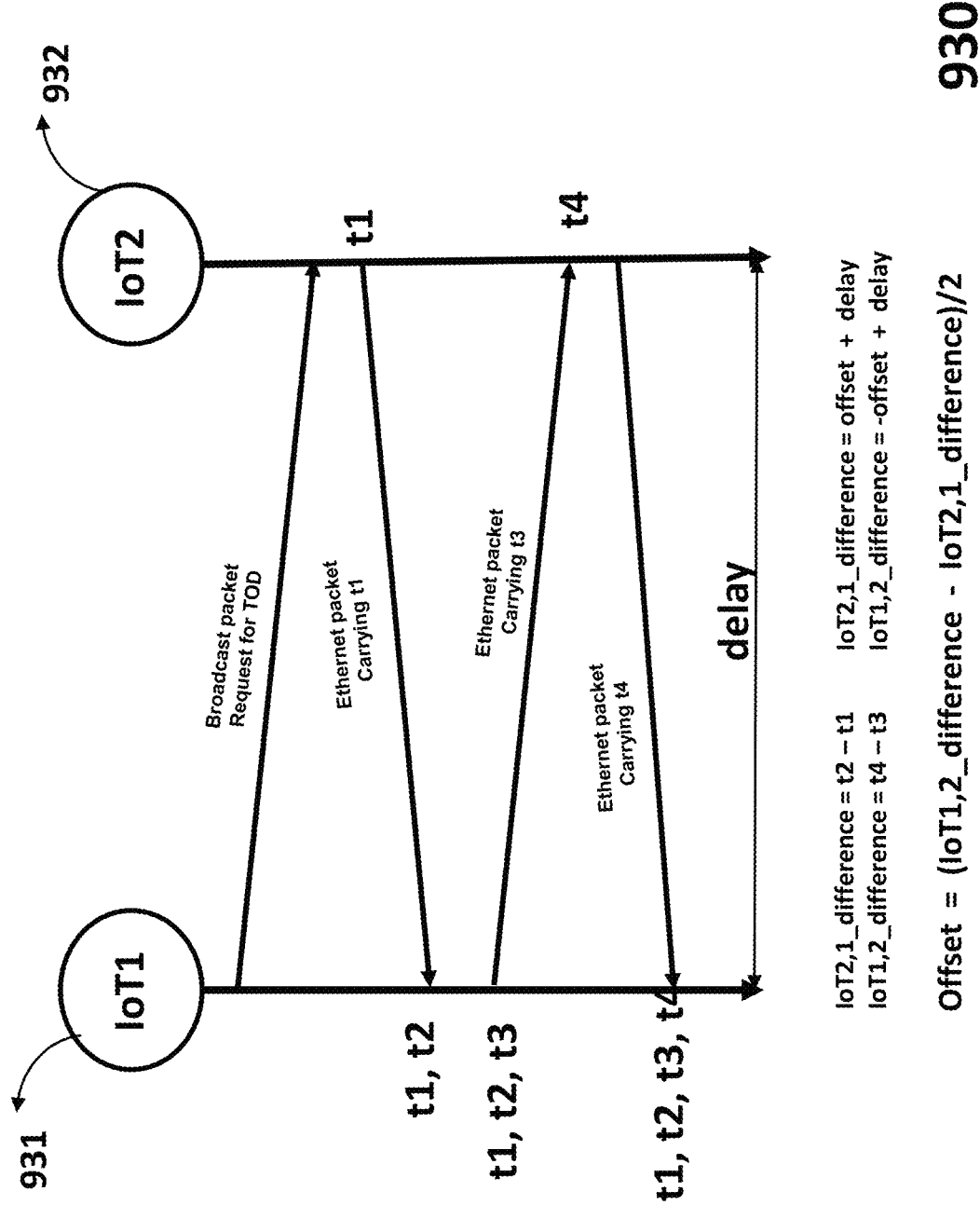
FIG. 10C shows a protocol to obtain time of day (TOD) using two IoT devices.

FIG. 10C shows protocol 930 to achieve clock synchronization and obtain time of day (TOD) by IoT1 device (object) 931 from IoT2 device (an object in the smart environment) 932. IoT1 device 931 sends a broadcast packet and request for clock synchronization and TOD. IoT2 device 932 receives the broadcast packet from IoT1 device 931, retrieves the packet address and then sends an Ethernet packet that contains time of day t1 at the antenna port of IoT2 device 932 to IoT1 device 931. IoT1 device 931 receives the Ethernet packet from IoT2 device 932, retrieves t1 from payload and records time of day t2 when t1 arrived at the antenna port of IoT1 device 931. IoT1 device 931 also retrieves the address of the IoT2 device from Ethernet packet (frame).

Next IoT1 device 931 sends an Ethernet packet (frame) that contains in its payload time of day t3 at the antenna port of IoT1 device 931, t1, and t2 to IoT2 device 932 using its address. IoT2 device 932 receives the Ethernet packet (frame) from IoT1 device 931, retrieves t3 (t2, t1 may be included) and records time of day t4 when t3 arrived at the antenna port of IoT2 device 932. Then IoT2 device uses IoT1 device address and sends an Ethernet packet that contains in its payload t4 (t3, t2, and t1 may be included) to IoT1 device. IoT1 device receives the Ethernet packet and retrieves t4. At this point IoT1 device 931 has 4 times t1, t2, t3 and t4 to calculate the time offset between IoT1 device 931 and IoT2 device 932.

The distance or propagation delay between IoT1 device 931 and IoT2 device 932 do not change during this process (even if both IoT devices move because this process happens in a short period of time). Therefore, t1, t2, t3 and t4 are used to estimate or calculate the time offset between IoT1 device 931 and IoT2 device 932.

Time offset=$(t2-t1-t4+t3)/2$

Then time offset is used by IoT1 device 931 to adjust its time of day and its clock frequency to match IoT2 device 932.

FIG. 10D shows implementation of protocol 930. IoT1 device 913 sends a broadcast packet to request for TOD and clock synchronization. IoT2 device 911 receives the broadcast packet and retrieve the address of IoT1 device and sends a broadcast TOD ($T_{bt}$) in an Ethernet packet. It is called broadcast TOD to indicate it is in response to IoT1 broadcast request. Broadcast TOD ($T_{bt}$) can be either adjusted for delays T1 from TOD insertion into the framer to the output of the radio 917 and T2 from output of radio 917 to the input of antenna 918 by record and insert block 922 or T1 and T2 are included in Ethernet packet payload. IoT1 device 913 receives the Ethernet packet from IoT2 device 911 through antenna 919, radio 920 and framer/de-framer 921 and retrieves $T_{bt}$ and record time of day $R_{bt}$ when $T_{bt}$ is arrived and retrieved. $R_{bt}$ can be adjusted for T3 and T4 delays from output of antenna 919 to input of radio 920 and from input of radio 920 to the time it is extracted from de-framer 921 by record and insert block 923.

In next step IoT1 device 913 sends an Ethernet packet to IoT2 device 911 using IoT2 device address retrieved from its Ethernet packet and includes an Ethernet time of day $T_{Et}$ in its payload. Ethernet time of day $T_{Et}$ can be adjusted for delays (T1 and T2 of IoT1 device) from radio 920 and antenna 919 by record and insert block 923 or delays (T1 and T2 of IoT1 device) are included in Ethernet packet payload. IoT2 device 911 receives the Ethernet packet from IoT1 device 913 through antenna 918, radio 917 and framer/de-framer 916 and retrieves $T_{Et}$ and record time of day $R_{Et}$ when $T_{Et}$ is arrived and retrieved. $R_{Et}$ can be adjusted for delays (T3 and T4 of IoT2 device) through antenna 918 and radio 917 by record and insert block 922.

Next IoT2 device 911 sends time of day $T_{REt}$ when it received $T_{Et}$ from IoT1 device 913 by an Ethernet packet to IoT1 device 913 using its address. IoT1 device 913 receives $R_{REt}$ and then uses $T_{bt}$, $R_{bt}$, $T_{Et}$ and $R_{Et}$ to calculate the offset time between IoT1 device and IoT2 device by following equation.

Offset time between IoT1 and IoT2=$(R_{bt}-T_{bt}-R_{Et}+T_{Et})/2$

When all times are adjusted for transmitter and receiver delays explained above. When T1, T2, T3, and T4 are not included then following equation is used.

Offset time between IoT1 and IoT2=$(R_{bt}-T_{bt}-R_{Et}+T_{Et})/2+(T1+T2$ of IoT1$)/2-(T1+T2$ of IoT2$)/2+(T3+T4$ of IoT2$)/2-(T3+T4$ of IoT1$)/2$ Offset time between IoT1 device and IoT2 device is used to adjust IoT1 device TOD and clock.

Figure 10E:
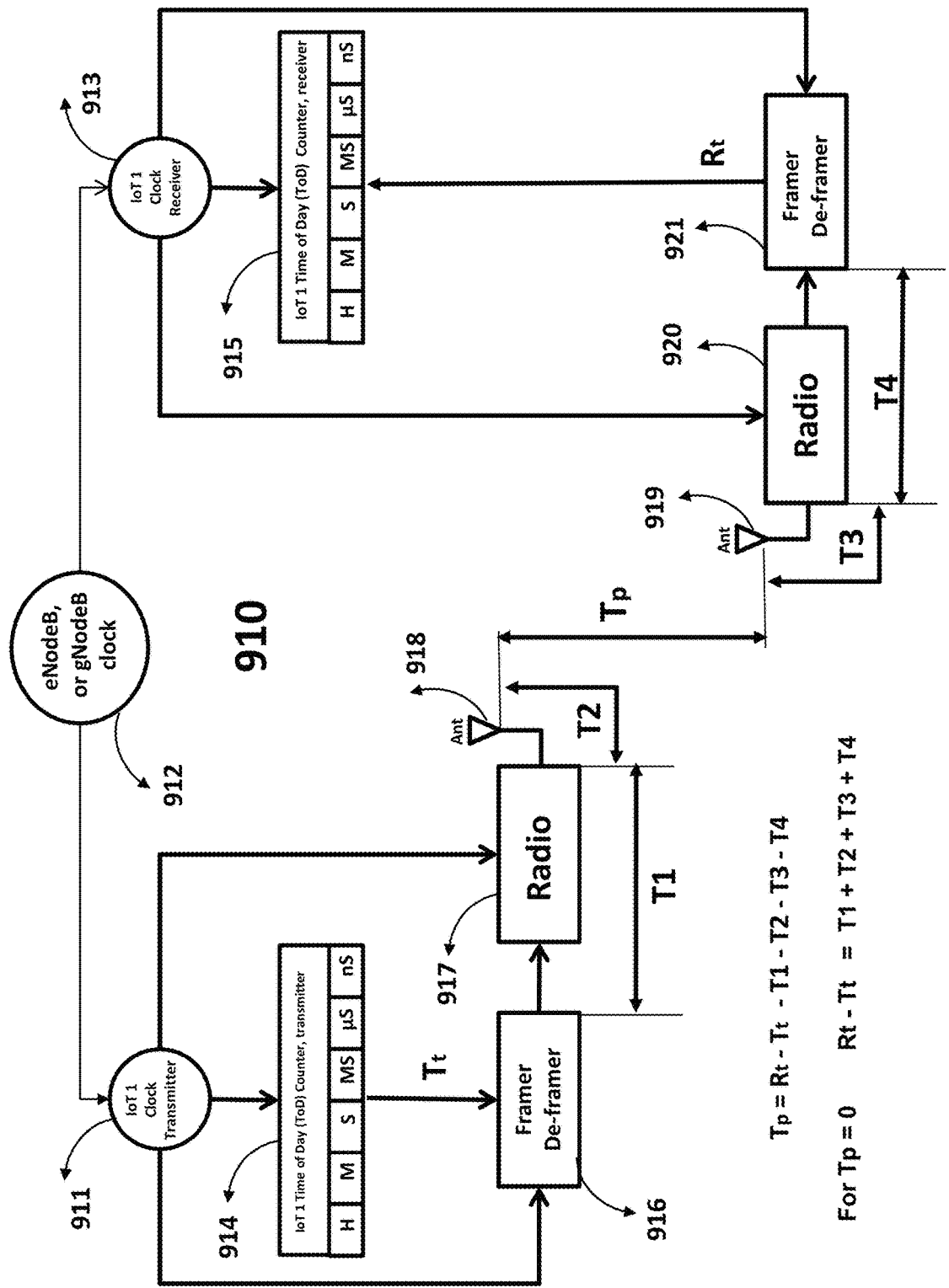
FIG. 10E shows a solution to estimate the round-trip delay in the transmitter and receiver of an IoT device.

FIG. 10E shows solution 910 to estimate the round-trip delay in the transmitter and receiver of IoT1 device. Once the round-trip delay is known test equipment can be used to calculate the delay through transmitter from insertion of TOD to framer up to input of the antenna and the delay through receiver from antenna port to extraction of TOD from de-framer. These two delays (transmitter and receiver) can be used by IoT devices in those tasks that require the knowledge of these two delays. IoT1 device transmitter comprises of IoT1 clock 911, IoT1 time of day (TOD) counter 914, IoT1 framer 916, radio 917, and antenna 918 and the receiver comprises of IoT1 clock 913, IoT1 time of day (TOD) counter 915, IoT1 de-framer 921, radio 920, and antenna 919. Both IoT1 clock 911 and IoT1 clock 913 achieve frequency and phase synchronization through eNodeB or gNodeB 912 and obtain their time of day from eNodeB or gNodeB 912. Clock 911 and 913 are the same and are separated here for clarity. The same applies to TOD counter 914 and 915. The IoT1 device also can obtain their time of day using GPS receiver. IoT1 device uses time of day (TOD) counter 914/915 to maintain TOD and is incremented by IoT1 clock 911/913. Receiver and transmitter clock have the same clock source.

IoT1 device's transmitter uses framer 916 to frame transmit broadcast packet signal or transmit Ethernet packet signal with Tt to transmit to IoT1 device's receiver port through radio 917 and transmitter antenna port. IoT1 device's receiver receives the broadcast or Ethernet packet signal from IoT1 device transmitter port through antenna port, radio 920 and de-framer 921. IoT1 device de-framer retrieves Tt and record Tr when Tt retrieved. The difference between Tt and Tr is the round-trip delay from IoT1 device transmit framer to receive de-framer. Since transmit antenna port is directly connected to receiver antenna port the round-trip delay is the delay through transmitter and receiver. This delay is used to measure the transmit delay and receive delay using a test equipment.

Figure 11:
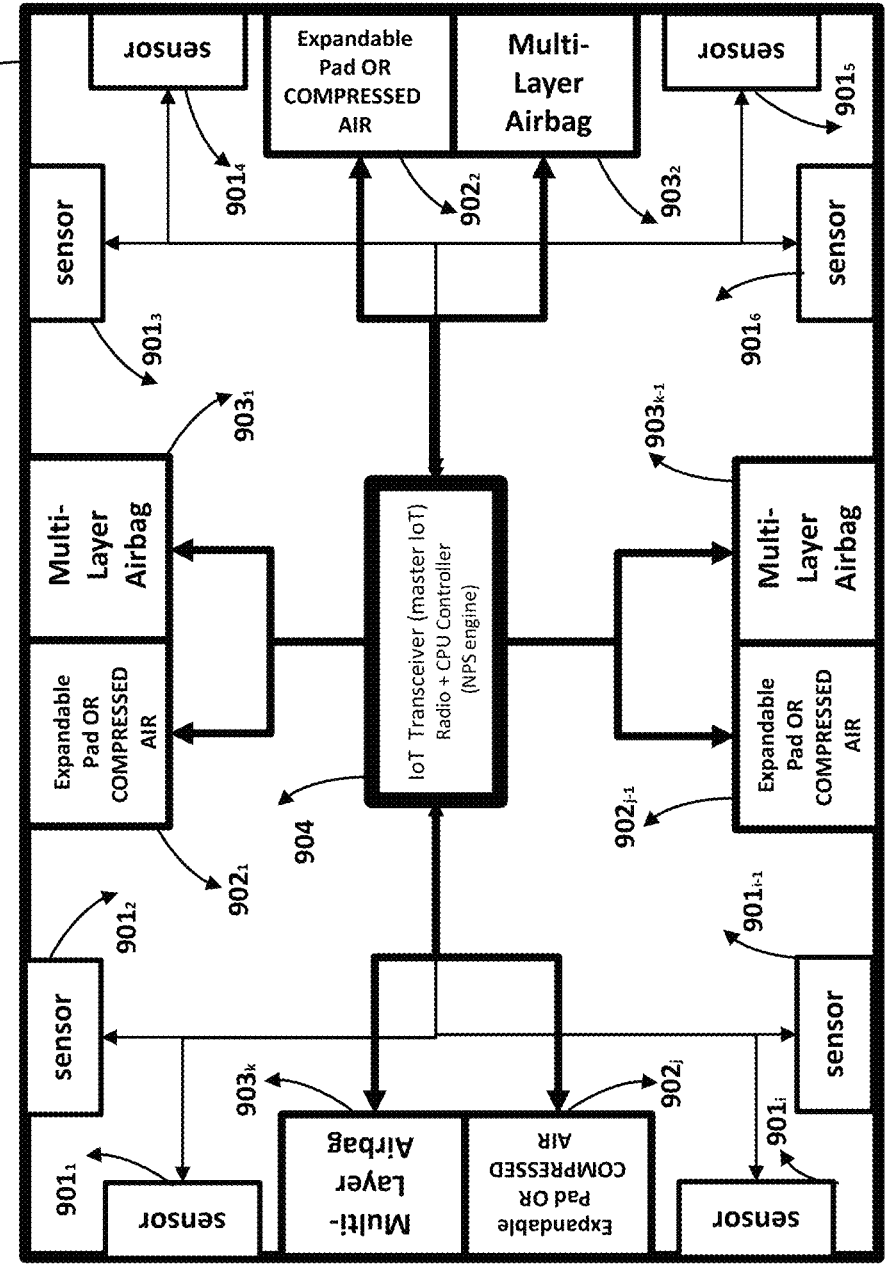
FIG. 11 depicts an IoT navigation and protection system for moving and stationary objects.

FIG. 11 illustrates an embodiment of a navigation and protection system (NPS) for vehicle/object (IoT device) 900. In general, the NPS for vehicle/object (IoT device) 900 performs navigation and provides external body protection by applying voltage to two ends of an expandable pad, and/or inflating a multilayer airbag, and/or releasing compressed air. The NPS through its IoT transceiver (master IoT device) 904 registers with an IoT network and receives an operation information data (OID) related to NPS's operation. NPS for vehicle/object (IoT device) 900 uses the OID from IoT network and detected information data (DID) from various sensors (including slave IoT devices) $901_1$ to $901_i$ to detect any malfunction of the vehicle/object (IoT device) 900 or approaching of any external objects that results in an impact. When NPS detects a potential impact based on its artificial intelligence algorithm analyses of the DID received from sensors (wireless sensor, internal sensors, internal devices, and slave IoT devices) $901_1$ to $901_i$, broadcasts its problem to the IoT network and activates one or more of the expandable pads/compressed air $902_1$ to $902_j$ or/and one or more of the multilayer airbags $903_1$ to $903_k$ to minimize the damage to the vehicle/object (IoT device) 900 due to impact. NPS also uses the received DID to navigate the vehicle/object (IoT device) 900 when no imminent impact is detected.

NPS for vehicle/object (IoT device) 900 includes, among other things, sensors $901_1$ to $901_i$ (including wireless sensors and slave IoT devices), IoT transceiver (master IoT device) 904, expandable pads/compressed air $902_1$ to $902_j$ and multilayer airbags $903_1$ to $903_k$.

In one embodiment the NPS acts as a standalone IoT device used by various objects.

In one embodiment the NPS obtains time of day (TOD) and calendar date directly or through the vehicle/object (IoT device) 900 that uses the NPS.

In another embodiment the NPS uses time of day to define a time for the operation of various sensors (including wireless sensors, and slave IoT devices) $901_1$ to $901_i$.

In one embodiment the sensors $901_1$ to $901_i$ are slave IoT devices to master IoT device 904 or wireless sensors.

In one embodiment, the vehicle/object (IoT device) 900 is a moving object, stationary object, or flying object.

In one embodiment of the NPS for vehicle/object (IoT device) 900, multiple expandable pads/compressed air $902_1$ to $902_j$ and multiple multilayer airbags $903_1$ to $903_k$ are mounted on all external sides of vehicle/object (IoT device) 900 to provide protection for impacts due to external objects at any external side of vehicle/object (IoT device) 900.

In one embodiment of the NPS for vehicle/object (IoT device) 900, the expandable pads/compressed air $902_1$ to $902_j$ and multilayer airbags $903_1$ to $903_k$ are mounted on the main body frame of the vehicle/object (IoT device) 900 to provide a firm and strong support.

In another embodiment of the NPS for vehicle/object (IoT device) 900, by activating expandable pads/compressed air $902_1$ to $902_j$ and/or multilayer airbags $903_1$ to $903_k$ the impact force to vehicle/object (IoT device) 900 will be lowered due to absorption or diffraction and provides more protection to the passengers of vehicle/object (IoT device) 900.

In one embodiment of the NPS for vehicle/object (IoT device) 900, one or more of the multilayer airbags $903_1$ to $903_k$ at one or multiple sides of the vehicle/object (IoT device) 900 is inflated to protect the external of vehicle/object (IoT device) 900 from fall, crash, or impact with an external object.

In one embodiment of the NPS for vehicle/object (IoT device) 900, one or more of the expandable pads/compressed air $902_1$ to $902_j$ at one or multiple sides of the vehicle/object (IoT device) 900 is activated by releasing compressed air or/and applying voltage to two ends of expandable pad to protect the external of vehicle/object (IoT device) 900 from fall, crash, or impact with an external object.

In one embodiment of the NPS for vehicle/object (IoT device) 900, IoT transceiver (master IoT device) 904 resets, and configures itself based on configuration data stored in its memory and then starts to execute artificial intelligence executable software which controls all aspects of navigation and protection of the vehicle/object (IoT device) 900 using the DID provided by all monitoring devices or/and sensors (including wireless sensors or slave IoT devices) $901_1$ to $901_i$.

In one embodiment of the NPS for vehicle/object (IoT device) 900, multiple monitoring devices or sensors (wireless sensors, or slave IoT devices) $901_1$ to $901_i$ are distributed at various locations internal and external to vehicle/object (IoT device) 900 and each has a unique IP address (or MAC address) which is used to communicate with the IoT transceiver (master IoT device) 904 to avoid collision or confusion of the detected information data received by the controller CPU (NPS engine controller processing unit) of the IoT transceiver (master IoT device) 904 from the sensors internal or external to the vehicle/object (IoT device) 900.

In one embodiment of the NPS for vehicle/object (IoT device) 900, the monitoring devices or sensors (wireless sensors, or slave IoT devices) $901_1$ to $901_i$ can be at least one of an image sensor, a wireless sensor, a Radar, a Camera, a heat sensor, a speed sensor, an acceleration sensor, a proximity sensor, a pressure sensor, a G (gravity) sensor, an IR (infrared), Lidar sensor, ultrasonic sensor, laser and others.

In one embodiment of the NPS for vehicle/object (IoT device) 900, a wireless sensor (slave IoT device) transmits (records completion of transmission at input of transmit antenna port) a coded signal similar to a unique identity code signal or a unique IP address signal and receives (record the completion of reception at receive antenna port) a reflected signal of the unique identity code signal, or the unique IP address signal from objects in surrounding environment of the vehicle/object (IoT device) 900 to avoid collision.

In another embodiment of the NPS for vehicle/object (IoT device) 900, the wireless sensor (salve IoT device) uses the time of completion of transmission of the unique identity code signal or the unique IP address signal at its transmit antenna port and the time of completion of the reception of the reflected signal of the unique identity code signal or the unique IP address signal at its receive antenna port to estimate free space traveling time of the unique identity code signal or the unique IP address signal to calculate a distance and an approaching speed of an object in the surrounding environment of the vehicle/object (IoT device) 900.

In one embodiment of the NPS for vehicle/object (IoT device) 900, the wireless sensor (slave IoT device) uses a time stamp (time of day) received from wireless sensor (slave IoT device) of a NPS that belongs to another vehicle/object (IoT device) to estimate the distance between the two vehicles/objects (IoT devices).

In one embodiment of the NPS for vehicle/object (IoT device) 900, the wireless sensor (slave IoT device) uses time of day (time stamp) of a broadcast packet at the antenna port of transmitter of the wireless sensor (slave IoT device) of a NPS that belongs to another vehicle/object (IoT device) and the time of day its own receiver receives the broadcast packet (time stamp) at its receiver antenna port to estimate the free space traveling time of the time stamp in the broadcast data. Then the free space traveling time is used to calculate the distance between the two vehicles/objects (IoT devices).

In another embodiment, the wireless sensor (slave IoT device) uses one IP (MAC) address to communicate with IoT transceiver (master IoT device) 904 and a second IP address for transmitting a unique IP address signal over the air to monitor objects in surrounding environment.

In another embodiment, the wireless sensor (slave IoT device) uses a single IP4 or IP6 address for both communicating with IoT transceiver (master IoT device) 904 and transmitting a signal over the air.

In one embodiment of the NPS for vehicle/object (IoT device) 900, IoT transceiver (master IoT device) 904 communicates with at least one of a cellular network or ioT network (4G, 5G and beyond, 6G, 7G), a WiFi network, and a private network to provide its own information data to the network and obtain an information data about other objects in its surrounding environment.

In one embodiment of the NPS for vehicle/object (IoT device) 900, the IoT transceiver (master IoT device) 904 supports IEEE1588 to obtain time of day (TOD) from at least one of a cellular base station or IoT network (4G, 5G and beyond, 6G, 7G), a WiFi network, and a private network.

In one embodiment of the NPS for vehicle/object (IoT device) 900, in order to avoid collision, at least one of a cellular base station or IoT network (4G, 5G and beyond, 6G, 7G), a WiFi router, and a private network broadcasts to vehicle/object (IoT device) 900 a channel, a frequency, a modulation, and an absolute time with a time slot duration when its wireless sensors (slave IoT devices) can transmit the unique IP address signal (or FMCW Radar/Lidar signal, ToF Lidar) and receive the reflected unique IP address signal (or FMCW Radar/Lidar signal, ToF lidar) from various objects in the surrounding environment in order to measure a distance and an approaching speed of various objects.

In one embodiment of the NPS for vehicle/object (IoT device) 900, to avoid collision, at least one of a cellular base station or IoT network (4G, 5G and beyond, 6G, 7G), a WiFi router, and a private network broadcasts to vehicle/object (IoT device) 900 a channel, a frequency, a modulation, and an absolute time with a time slot duration when its wireless sensor (slave IoT device) can broadcast its information data.

In another embodiment of the NPS for vehicle/object (IoT device) 900, the wireless sensor (slave IoT device), over the air, broadcasts information data that includes a time stamp indicating time of day, a method the time of day was obtained (IEEE1588, cyclic prefix, downlink unused sub-carriers, downlink channels unused bits/messages or GPS), type of the vehicle/object (IoT device) 900, location coordinates (obtained from GPS receiver), function of the object, status of the object, specification of object, the identity number or IP (media access control MAC) address of wireless sensor (slave IoT device), signal propagation time through transmitter of the wireless sensor (slave IoT device) up to the input of transmit antenna, and estimated mass of the vehicle/object (IoT device) 900. If the object is a traffic light then its color (green, yellow, red) indicates the status of the object.

In one embodiment of the NPS for vehicle/object (IoT device) 900, two or more type of sensors (Radar, Lidar, Camera, ultrasonic sensor, laser, and Image sensor) can be used to better monitor the surrounding environment of the vehicle/object (IoT device) 900 and calculate and estimate parameters of the surrounding environment. All wireless sensing devices operate during the time slot assigned to NPS for vehicle/object (IoT device) 900 by SOMC through IoT network.

In one embodiment of the NPS for vehicle/object (IoT device) 900, an image sensor or Lidar (FMCW or Time-of-Flight) is used to monitor the vehicle/object (IoT device) 900 surrounding environment, and independently calculate and estimate a distance and an approaching speed of an object in the surrounding environment.

In one embodiment of the NPS for vehicle/object (IoT device) 900, using typical objects in an environment an image verification database and a distance calibration database that relates the size of the image to distance of the object from the image sensor is created and stored in memory of the image sensor.

In one embodiment of the NPS for vehicle/object (IoT device) 900, a wireless sensor (slave IoT device) and an image sensor, and/or Lidar are used to monitor the vehicle/object (IoT device) 900 surrounding environment, and each independently calculate and estimate a distance and an approaching speed of the objects in its surrounding environment and use the information data to make a better decision (by the artificial intelligence algorithm) to activate one or more multilayer air bags and/or expandable pads/compressed air.

In another embodiment, the vehicle/object (IoT device) 900 can be an automobile, a robot, a flying car, a small plane, a drone, a glider, a human or any flying and moving vehicle/device/object/equipment.

FIGS. 12A and 12B illustrate two typical street or roads 940. FIG. 12A shows a road with center barrier 946 and curb 942 at both side of the road. The road shows two lanes at each direction, but it can have one lane or more than two lanes at each direction. FIG. 12B shows a road or street that has no center barrier. In each direction it can have one or more lanes. In both FIGS. 12A and 12B the lanes are separated with lines 944 and 951. Lane lines in FIGS. 12A and 12B also can come with stud reflectors 945 and 952. Both roads shown in FIGS. 12A and 12B may also use stud reflectors 943, 950, and 947 along the side curbs 943, 949 and middle barrier 946. The spacing between studs can be equal or different and depends on terrain topography.

The above type of roads is also used outside the cities or used to link states, towns, cities, and villages. When they are used for linking, the roads may not have the side curbs. When the roads 940 do not have side curbs it is still possible to have studs 943 and 950 along the roadside with some distance from the side lanes.

The studs in addition of being used as reflectors they can also act as fixed objects in the object control system (OCS). In OCS, studs are IoT devices that assist moving objects navigation and protection system. The stud IoT devices need to be exceptionally low in cost. Therefore, not all stud IoT devices communicate with IoT network and only limited stud IoT devices communicate with IoT network to obtain TOD and operation information data (OID). The stud IoT devices (masters) that communicate with IoT network are at locations that receive strong signal from IoT network and need lower transmit power to communicate with IoT network. Stud IoT devices that do not communicate with IoT network are slave to the master stud IoT devices. The slave stud IoT devices are daisy chained to the master stud IoT devices and receive their OID from master stud IoT devices. The studs IoT devices are powered with solar energy individually or from a larger solar panel that can power several studs IoT devices. They can also be powered by other means.

The radiation pattern of the stud IoT device that are located on side curbs 943 and 950 is towards the approaching moving objects 941 and 948. The same applies to stud IoT devices that located on lane lines in FIG. 12A with a center barrier 946. The stud IoT devices 947 used by center barrier can have an Omni-directional radiation pattern or a radiation pattern that supports moving objects approaching them from both directions. The barrier type of radiation pattern is also applied to stud IoT devices 952 used by lane lines in FIG. 12B.

Figure 13:
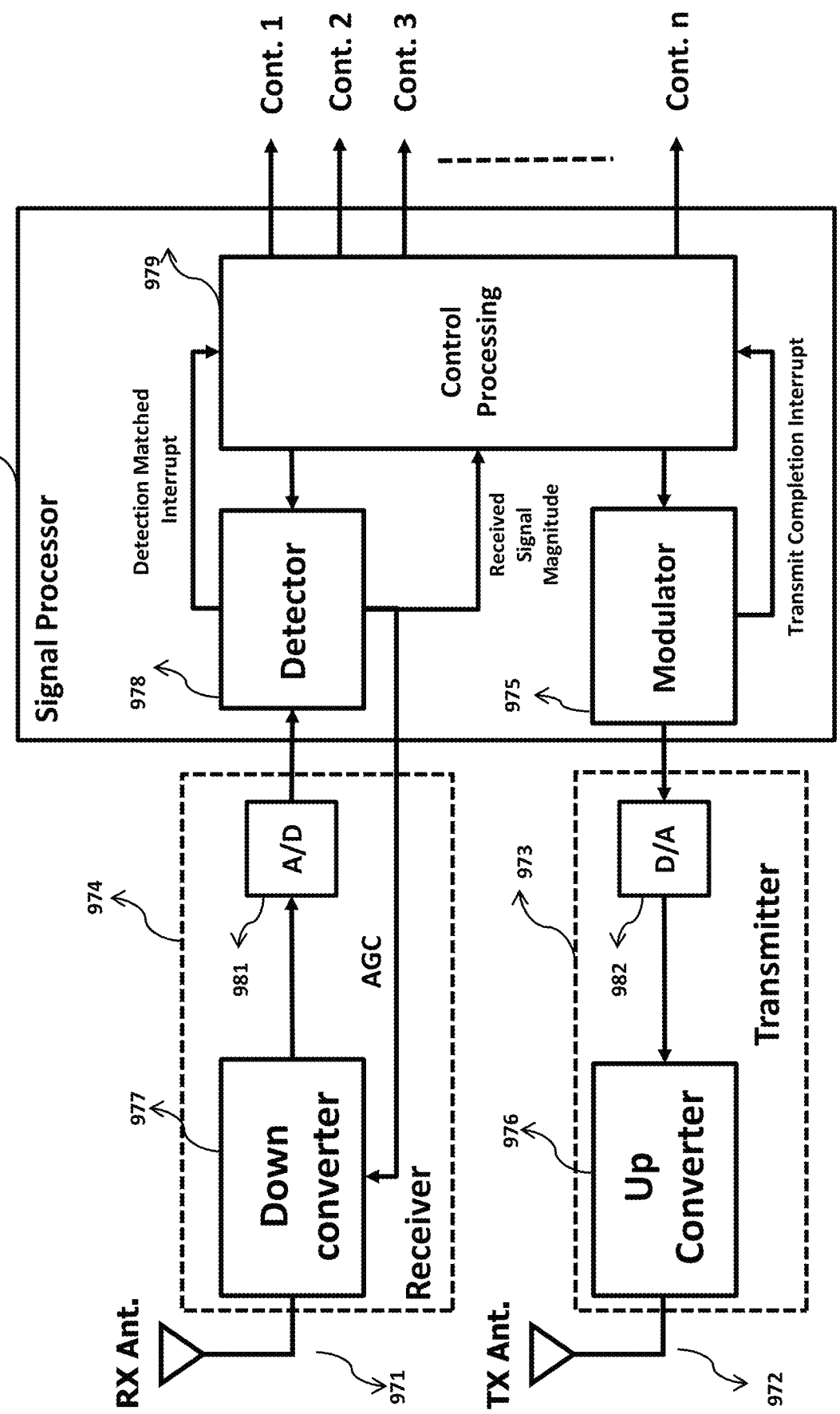
FIG. 13 depicts an embodiment of a wireless sensing system.

FIG. 13 depicts an embodiment of wireless sensor system 970 (or IoT device 400, and 500). In general, wireless sensor system 970 (or IoT device 400, and 500) facilitates estimation and calculation of certain environment's parameters by transmitting a coded signal like a unique IP address (or a broadcast, Ethernet frame or packet) signal generated or selected by a control processor 979 through a modulator 975, a transmitter 973 and antenna 972 and then receiving the attenuated version of reflected coded signal (or a broadcast and Ethernet frame or packet) by an antenna 971, receiver 974 and detector 978. For example, control processor 979 selects an IP address pattern from a pool of IP addresses (or a broadcast and Ethernet frame or packet), send it to modulator 975 for modulation then the modulated signal is sent to transmitter 973 to be converted to analog signal by digital-to-analog (D/A) converter 982 and up converted to carrier frequency by up convertor 976 for transmission through antenna 972. The modulator 975 also sends the time of completion of modulation to control processor 979. Then the reflected transmit (a broadcast or an Ethernet frame or packet) signal from an object in the environment is received by antenna 971 and receiver 974, where it is down converted by down convertor 977 and converted to digital signal by analog-to-digital (ND) converter 981. The digitized received signal is processed in signal processing unit 980, where it is detected by detector 978 and detection time is sent to control processor 979. The digitized down converted received signal also facilitates measurement of received signal strength intensity (RSSI) to provide to control processor 979.

Wireless sensor system 970 (or IoT device 400, and 500) includes, among other things, signal processor 980, transmitter 973, transmit antenna 972, receive antenna 971, and receiver 974.

In one embodiment, signal processor 980, transmit antenna 972, transmitter 973, receive antenna 971, and receiver 974 are components of wireless sensor system 970 (or IoT device 400, and 500) that could be used for various applications. For example, it can be used to communicate with a cellular network (4G, 5G, 6G and beyond), a private network, a WiFi network, transmit and receive a broadcast frame or packet, transmit and receive an Ethernet frame or packet, communicate with the cloud, etc.

In one embodiment, wireless sensor system 970 (or IoT device 400, and 500) receives information about its surrounding environment which includes various objects and their types from the cellular network (4G, 5G, 6G and beyond), the WiFi network or the private network. Wireless sensor system 970 (or IoT device 400, and 500) also receives an IP address to use for its operation or a pool of IP addresses it can store and use as needed.

In another embodiment, wireless sensor system 970 (or IoT device 400, and 500) uses GPS to obtain time of day, clock synchronization and location coordinates.

In one embodiment, wireless sensor system 970 (or IoT device 400, and 500) uses IEEE1588 and through the cellular network (4G, 5G, 6G and beyond), the WiFi network, the private network, or another wireless sensor system (or IoT device 400, and 500) obtains time of day and clock synchronization.

In another embodiment, wireless sensor system (or IoT device 400, and 500) 970 uses IEEE1588 PTP to obtain clock synchronization (syncE also can be used for clock synchronization) and time of day from a central CPU (controller processing unit) controller that it communicates with.

In another embodiment, wireless sensor system (or IoT device 400, and 500) 970 obtains its IP (MAC) address from a central CPU controller that it communicates with.

In another embodiment, wireless sensor system 970 (or IoT device 400, and 500) receives an absolute time for its activity such as transmission, reception, communication and broadcasting from the cellular network (4G, 5G, 6G and beyond), the WiFi network, the private network, or the central CPU (controller processing unit) controller that it communicates with.

In one embodiment, wireless sensor system 970 (or IoT device 400, and 500) communicates its information and parameters to the cellular network (4G, 5G, 6G and beyond), the WiFi network, the private network, or the central CPU controller that it communicates with.

In one embodiment, wireless sensor system 970 (or IoT device 400, and 500) receives an information data from its surrounding environment which is updated in real time from the cellular network (4G, 5G, 6G and beyond), the WiFi network, the private network, or the central CPU controller that it communicates with.

In one embodiment, wireless sensor system 970 (or IoT device 400, and 500) broadcasts its information data to other wireless sensors (or IoT devices) that belong to various moving or stationary objects in its surrounding environment.

In another embodiment, wireless sensor system 970 (or IoT device 400, and 500) fragments its transmit signal to two or more fragment signals, transmits each fragment signal and receives the reflection of each fragment signal from various objects in its surrounding environment before transmission and reception of next fragment signal.

In one embodiment, wireless sensor system 970 (or IoT device 400, and 500) supports WiFi, Bluetooth, Zigbee or any other over the air protocol as well as physical layer.

In another embodiment, wireless sensor system 970 (or IoT device 400, and 500) is used for other applications and transmits and receives Ethernet frames over the air.

In one embodiment, signal processor 980 that processes both transmit and receive signals comprises of control processor 979, modulator 975, and detector 978.

Signal processor 980 processes an information data transmitted from transmitter 973 through antenna 972 and an information data received from receiver 974 through receive antenna 971. The signal processor 980 also provides gain control for receiver and facilitates change of transceiver operating frequency, channel, and modulation. Signal processor 980 typically utilizes appropriate hardware and software algorithm to properly process the information data.

Wireless sensor system 970 (or IoT device 400, and 500) can be any wireless transceiver that is able to wirelessly transmit communication signals. Wireless sensor system 970 (or IoT device 400, and 500) is disposed on any physical platform that is conductive to effectively transmit the signals.

In one embodiment, communications through wireless system 970 (or IoT device 400, and 500) are by a transmit antenna 972 and a received antenna 971. Transmit and receive antennas are physically separated to provide sufficient isolation between transmit and receive antennas. The transmit antenna 972 and the received antenna 971 can also be common or one antenna.

In one embodiment, communication through wireless system 970 (or IoT device 400, and 500) is by a single antenna. In general, at any specified period the antenna is selected by a switch and/or a circulator.

Signal Processor 980 has a variety of functions. In general, signal processor 980 is utilized for signal processing, calculation, estimation, activities, methods, procedures, and tools that pertain to the operation, administration, maintenance, and provisioning of wireless sensor system 970 (or IoT device 400, and 500). In one embodiment, signal processor 980 includes a database that is used for various applications. The database can be utilized for analyzing statistics in real-time.

Signal processor 980 also has a variety of thresholds. In general, signal processor 980 provides controls to various components that are connected to it. Moreover, signal processor 980 is a high-capacity communication facility that connects primary nodes.

In one embodiment, the wireless sensors system 970 (or IoT device 400, and 500) uses microwave, or milli-metric (from 10 GHz to 80 GHz or higher frequencies) wave transceiver.

In one embodiment, wireless sensor system 970 (or IoT device 400, and 500) is controlled by control processor 979. The control processor 979 controls a transmit signal duration and number of times the transmit signal is transmitted. Control processor 979 also coordinates the transmit time and receive time period.

In one embodiment, the wireless sensor system 970 (or IoT device 400, and 500) can be used for body armors, automobile, robots, drone, and any other stationary, flying, and moving object/equipment.

Figure 14A:
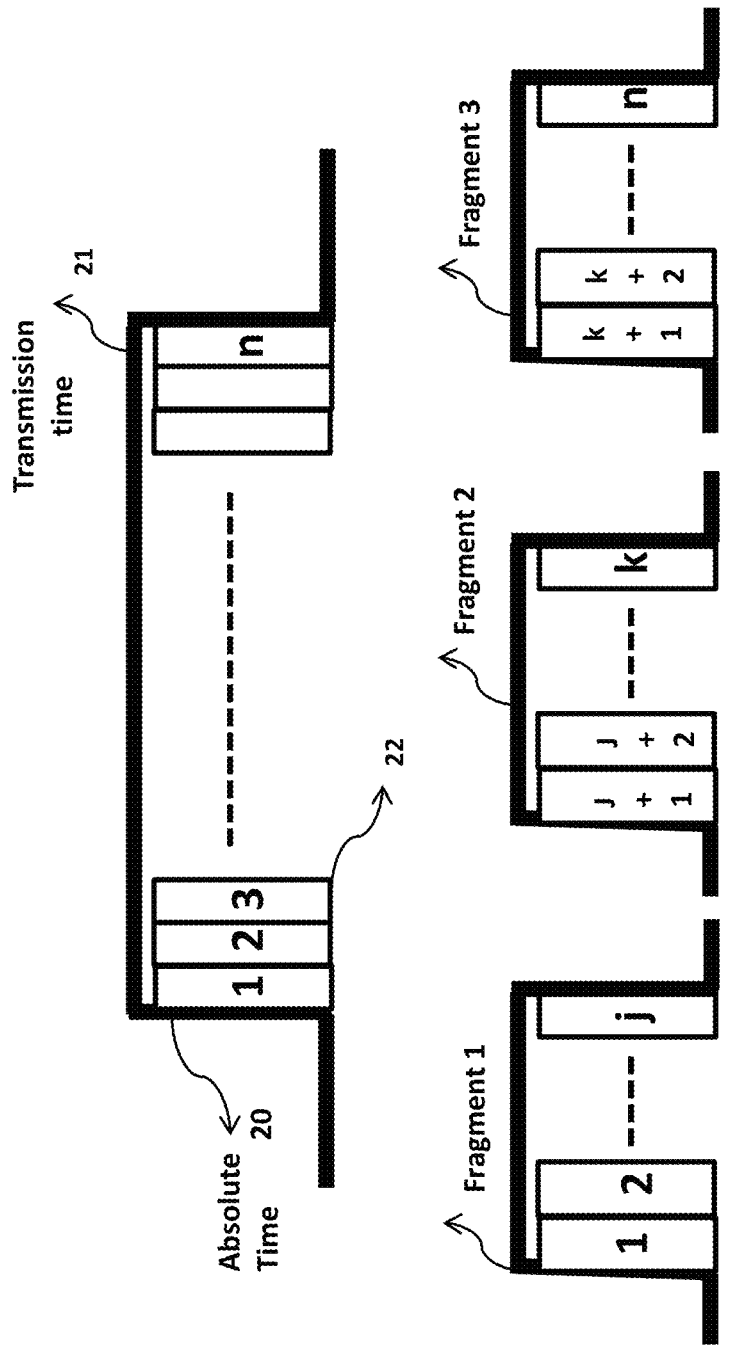
FIG. 14A depicts an embodiment of transmit signal for a wireless sensor system.

FIG. 14A depicts an embodiment of transmit signal for wireless sensor system 970 shown in FIG. 13 (or IoT device 400, and 500 shown in FIGS. 4, 5). The transmit signal has a transmission time (duration) 21 and a bit pattern 22. Pattern 22 can be a unique identity code, a unique IP address, a random pattern, an entire broadcast frame or packet, and an entire Ethernet frame or packet which is generated by control processor 979.

In one embodiment of wireless sensor system 970 used in a NPS of a moving or flying vehicle/object defined in FIG. 11, the pattern 22 is assigned to wireless sensor system 970 (or IoT device 400, and 500 shown in FIGS. 4, 5) at manufacturing when it is used for ranging.

In one embodiment of wireless sensor system 970 (or IoT device 400, and 500 shown in FIGS. 4, 5), the random pattern 22 (when it is used for ranging) may be changed after being used a few times based on the artificial intelligence algorithm in the controller 979. The change of transmit pattern 22 signal is for avoiding any collision or false detection from other signals in the surrounding environment.

In one embodiment of wireless sensor system 970 (or IoT device 400, and 500 shown in FIGS. 4, 5), the transmit signal 22 (when it is used for ranging) is an IP address (or identity code) unique to a NPS using the wireless sensor 970 (or IoT device 400, and 500 shown in FIGS. 4, 5). The IP address (or identity code) can be assigned to wireless sensor 970 at manufacturing, in the field by the user, each time the wireless sensor system 970 transmits and performs ranging. The IP address (or identity code) can also be taken from a pool of IP addresses (or identity codes) stored in the control processor 979 (or IoT device 400, and 500 shown in FIGS. 4, 5) memory or a removable memory card which can be like a subscriber identity module (SIM) card.

In one embodiment of wireless sensor 970 (or IoT device 400, and 500 shown in FIGS. 4, 5), the transmit pattern duration 21 depends on the number of bit pulses in the transmit signal pattern, carrier frequency, bandwidth, and modulation level. The higher the number of bits in transmits identity code, IP address, random pattern, or broadcast (Ethernet) frame or packet the longer the transmit signal duration.

In one embodiment of wireless sensor 970 (or IoT device 400, and 500 shown in FIGS. 4, 5), the number of bits in the pattern 22 defines the accuracy of the receiver detection (when it is used for ranging).

In another embodiment, the transmit bit pattern 22 is fragmented to smaller bit patterns, shown in FIG. 14A, to allow use of lower carrier frequency, less bandwidth, or lower-level modulation.

In one embodiment, wireless sensor system 970 (or IoT device 400, and 500 shown in FIGS. 4, 5) transmits the first fragment with "j" bits, receives the reflected transmit signal from objects in surrounding environment of wireless sensor system 970, then transmit the second fragment with "k j" bits, and finally transmits the last fragment with "n-k" bits and receives the reflected transmit signal from objects in surrounding environment of wireless sensor system 970 for detection of the transmit bit pattern.

In another embodiment, the fragment bit patterns can have equal number of bits, or different number of bits.

In one embodiment of wireless sensor system 970 (or IoT device 400, and 500 shown in FIGS. 4, 5), the start of transmission time 21 or start of first bit in bit pattern 22 is an absolute time 20 configured in the controller. This absolute time is derived from the TOD wireless sensor system 970 (or IoT device 400, and 500 shown in FIGS. 4, 5) obtains from GPS receiver, a cellular network (4G, 5G, 6G and beyond), a WiFi network, a private network, or a central controller that it communicates with. The absolute time can also be sent to wireless sensor 970 (or IoT device 400, and 500 shown in FIGS. 4, 5) by the cellular network (4G, 5G, 6G and beyond), the WiFi network or the private network. The absolute time can be first microsecond in a millisecond, or the nth microsecond after the start of a millisecond.

In addition to absolute time the cellular network (4G, 5G, 6G and beyond), the WiFi network or the private network assigns to the wireless sensor 970 (or IoT device 400, and 500 shown in FIGS. 4, 5) a time slot that starts from the absolute time and has a duration which is equal for all objects that use wireless sensor 970 in the environment. The time slot duration assigned to the objects using wireless sensor 970 can also be different.

In one embodiment, the absolute time can be any nanosecond within a microsecond period, such as $1^{st}$ nanosecond, kth nanosecond, nth nanosecond, etc.

In one embodiment of wireless sensor 970 (or IoT device 400, and 500 shown in FIGS. 4, 5), the time of day obtained from GPS receiver or from the 4G, 5G, 6G, the WiFi network or the private network using IEEE1588 has accuracy within a few nanosecond, fraction of microsecond, or fraction of nanosecond.

In one embodiment the time of day obtained from GPS receiver or from the 4G, 5G, 6G, the WiFi network or the private network using IEEE1588 is based on Coordinated Universal Time (UTC).

In another embodiment, an absolute time, and time slot used for broadcasting by wireless sensor 970 (or IoT device 400, and 500 shown in FIGS. 4, 5) in the smart environment 800 defined in FIG. 8 helps to avoid any collision when various objects broadcast their information.

Figure 14B:
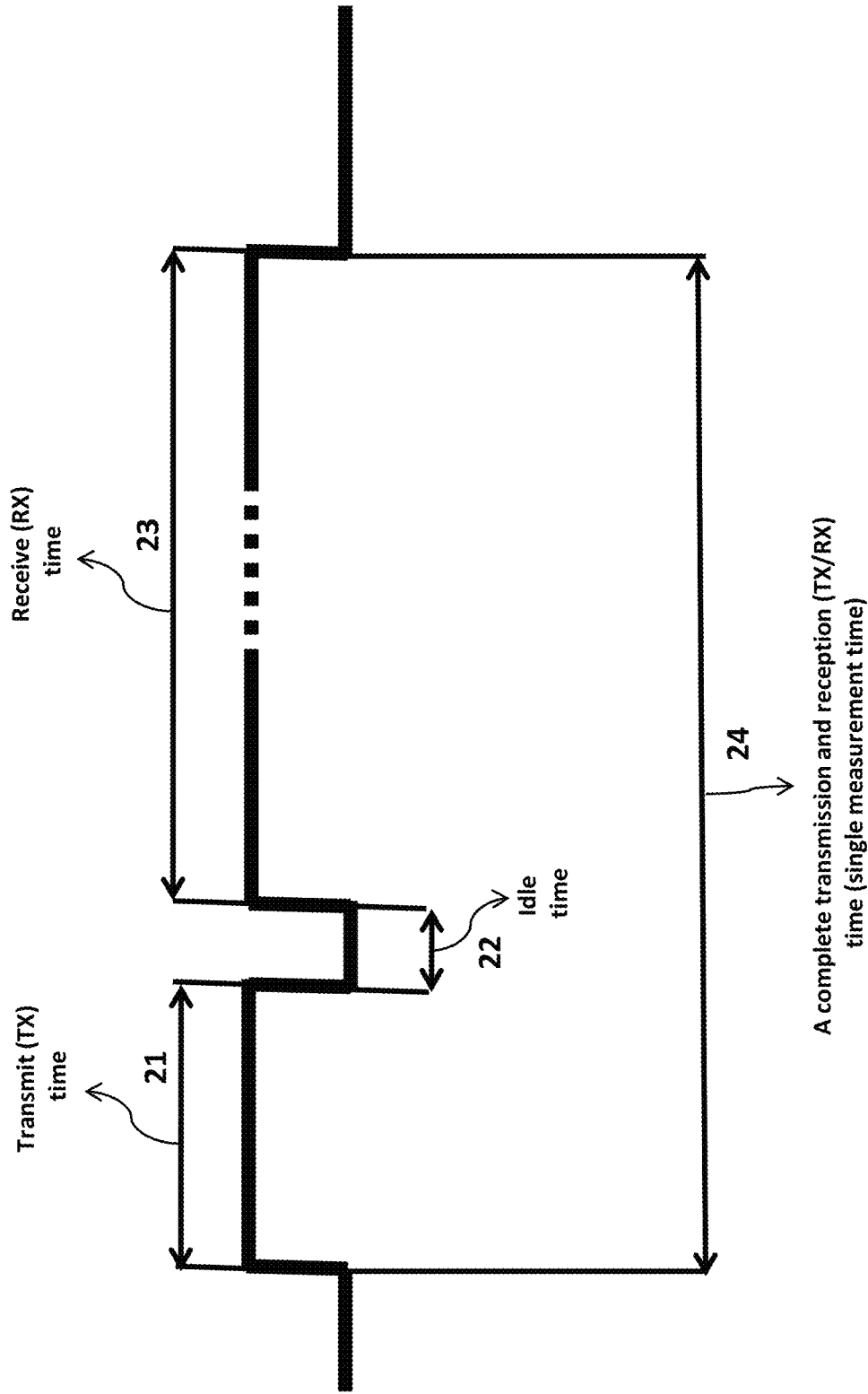
FIG. 14B shows the duration of a complete single transmission and reception.

FIG. 14B shows the duration of a complete single transmission and reception (single measurement time) 24 for wireless sensor system 970 (or IoT device 400, and 500 shown in FIGS. 4, 5) when it is used for ranging. The complete transmission and reception duration comprises of the transmit time (duration) 21, idle time (duration) 22 and receive time (duration) 23.

In one embodiment of wireless sensor system 970 (or IoT device 400, and 500 shown in FIGS. 4, 5), the idle time 22 is zero. The idle time can vary based on proximity of an object to wireless sensor system 970 in its surrounding environment. The closer the object the smaller the idle time 22 is. In most circumstances the idle time is zero and after completion of transmission the wireless sensor system 970 (or IoT device 400, and 500 shown in FIGS. 4, 5) starts its reception.

In one embodiment of the wireless sensor system 970 (or IoT device 400, and 500 shown in FIGS. 4, 5), the receive time 23 depends on the monitoring radius of surrounding environment of the wireless sensor system 970. The bigger the radius of monitoring the longer the reception time of wireless sensor system 970 is. Therefore, the assigned time window for a complete transmission and reception depends on the monitoring radius.

In another embodiment, when the wireless sensor system 970 (or IoT device 400, and 500 shown in FIGS. 4, 5) is used to transmit and receive broadcast or Ethernet packets the time slot duration depends on three parameters. One is maximum length of a packet allowed for both broadcast and Ethernet packet. Second is the monitoring radius, and the third is error in time of day that is used to derive absolute time. In real operation it is rare to have time of day error (jitter) more than 200 nanosecond and monitoring radius is usually less than 30 feet which is equivalent to 30 nanoseconds. The time of day (TOD) is also updated regularly which eliminates accumulation of TOD error (jitter). Therefore, time slot duration of 2 microseconds is sufficient for broadcast and Ethernet packets of an object in a smart environment when a 70 GHz to 80 GHz band is used. This allows to assign one thousand absolute times with a time slot duration of 2 microsecond within two milliseconds. Each object is assigned one or more time slot with its associated start time that is the absolute time.

Figure 14C:
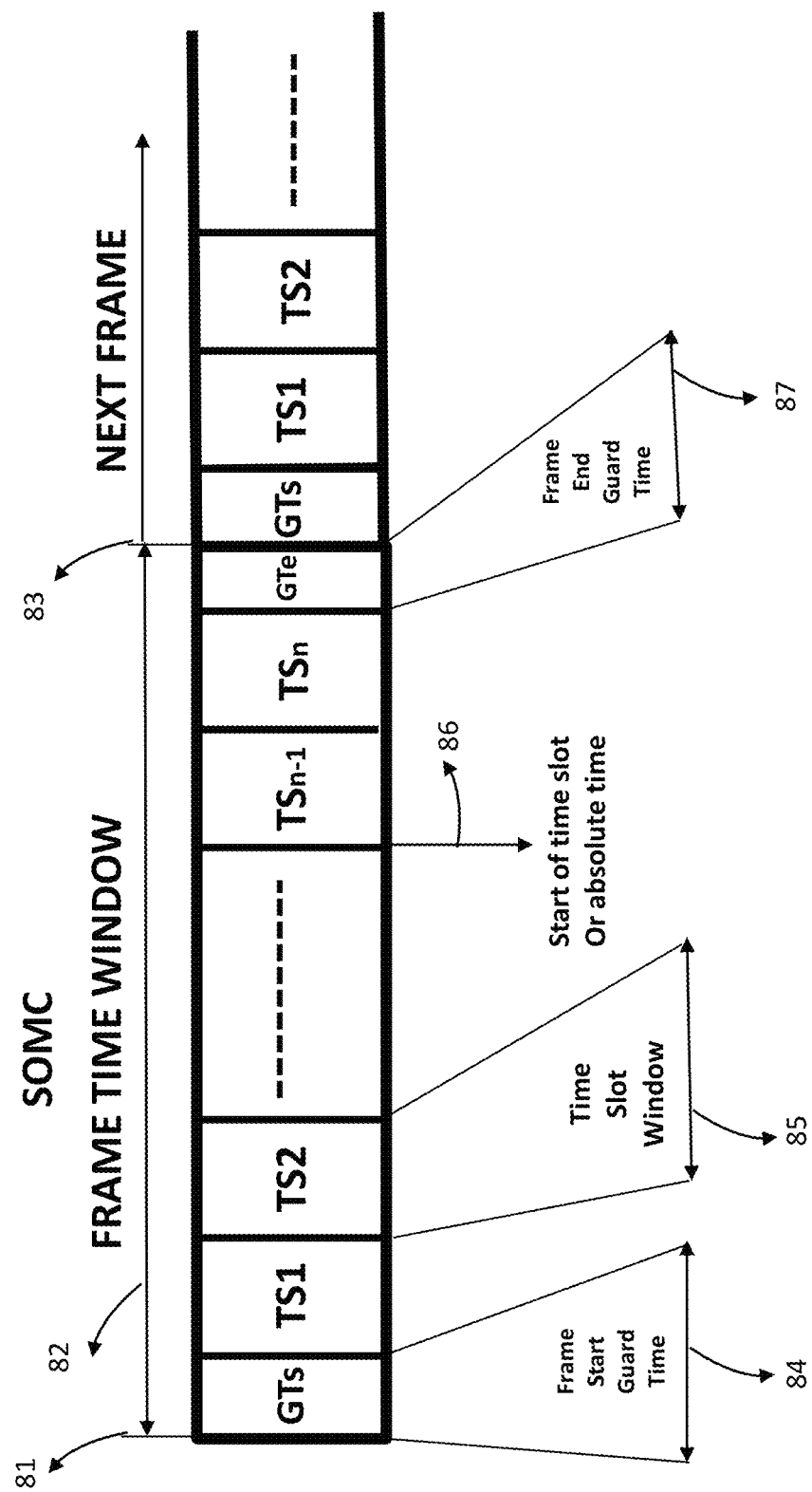
FIG. 14C depict the object control system frame structure.

FIG. 14C depict the object control system OCS frame structure 80 defined by SOMC. Frame structure 80 has a start TOD 81, duration 82, and end TOD 83, a start guard time 84, a time slot 85, a start of time slot or absolute time 86, and an end guard time 87. After the end of end guard time 87 the next frame starts. Frame 80 accommodates "n" time slots. All time slots in a frame can have the same duration or different durations. An IoT device is assigned a time slot (TS) with an absolute time that is the start of IoT device's first time slot (TS). The IoT device TS duration is defined by SOMC based on the object's specification. The IoT device is also aware of the frame duration and uses this duration, and its absolute time to calculate the TOD for the start of its next TS which is a calculated next absolute time by the IoT device.

Frame 80 uses the start guard time and end guard time to avoid any frame overlap due to slight error in the TOD of various components and IoT devices of OCS. It is always possible to use one guard time at the start or end of the frame. The TOD of the various IoT devices is regularly updated to eliminate any accumulation of TOD error (jitter). The guard time (start or end) can be used by SOMC to update operation information data (OID) for various components and IoT devices within object control system (OCS).

The frame 80 duration and structure are not the same for all smart environments. Moving and flying objects with high speed will have smaller frame duration whereas moving objects in metropolitan smart environment can use lengthier frame duration. Therefore, the duration and structure of frame depends on several parameters. These parameters are type of objects, frequency band that IoT devices operate, bandwidth of channel used for operation, speed of data transmitted and received, maybe size of the object, type of road or streets, type of smart environment (city, urban, suburban, towns, villages, country roads, desert, forest, coast), type of cell (terrestrial, satellite), and other parameters that are needed for a safe smart environment.

SOMC through IoT network communicates with a master IoT device used by an object (NPS). Master IoT device must conform to all requirements of the IoT network defined by standard committees. Master IoT device also communicate with NPS's controller of an object to exchange OID and detected information data (DID). Slave IoT devices communicate with NPS's controller to receive the OID and send their DID. NPS's controller is aware of features and capabilities of the slave IoT devices. NPS allows slave IoT devices to operate if the requirement defined by SOMC is fulfilled. These requirements are minimum requirement for an object's NPS to operate in different smart environments.

FIG. 14D depicts the duration of a time slot 31 used for ranging, communication (broadcast packets, Ethernet packets), and monitoring by the wireless system 970 (or IoT device 400, and 500 shown in FIGS. 4, 5). The time slot 31 comprises of guard time (1) 32, ranging time 33, guard time (2) 34, communication (broadcast packets, Ethernet packets) time 35, and guard time (3) 36. The start of time slot is the absolute time 30 assigned to a wireless sensor system 970 (or IoT device 400, and 500 shown in FIGS. 4, 5) or NPS of an object. Time slot 31 can be all assigned to monitoring task, communication task, transmission/reception of broadcast packet task, transmission/reception of Ethernet packets task, or ranging task. Time slot 31 can also be assigned to two tasks, three tasks, four tasks or all five tasks.

The guard times at the beginning and end of the time slot is to avoid any overlap between two adjacent time slots and tasks. Although IoT devices obtain their time of day (TOD) from eNodeB, or gNodeB of 5G (6G, 7G), WiFi router, or private IoT network but it is possible that their TOD are different with reasonable error (jitter). The error (jitter) does not accumulate because the TOD is updated on regular basis. The start and/or end guard time should be bigger than the highest error (jitter) in TODs. The guard time between ranging time and the time of other tasks is to avoid overlap and time for processing of data.

In another embodiment, the SOMC through IoT network (4G, 5G, 6G, 7G and beyond), the WiFi network or the private network shares with each wireless sensor system 970 (or IoT device 400, and 500 shown in FIGS. 4, 5) in a smart environment the absolute time and time slot of all the registered wireless sensor system 970 (or IoT device 400, and 500 shown in FIGS. 4, 5) in the smart environment. All absolute times and time slots are stored in a shared database (SD) and are managed by a shared operation and management center (SOMC) used by all service providers and operators.

During the time slot the IoT device's wireless channel (propagation channel) should not change. The maximum time that a channel is constant and does not change is "coherence time" and the maximum channel bandwidth that the fading is flat is "coherence bandwidth".

Coherence bandwidth is proportional to average channel delay spread. If average delay spread is larger than symbol time, then the channel experiences frequency selective fading which results in inter symbol interference (ISI). To avoid selective fading or ISI the symbol time should be larger than average delay spread. Therefore, if the symbol time is Ts and the average delay spread is $\mathcal{C}$ then we need to meet the following condition.

$$Ts > \mathcal{C} \text{ or}$$

$$1/Ts < 1/\mathcal{C} \text{ or}$$

$$Bs < Bc$$

Where Bs is symbol or channel bandwidth, and Bc is the coherence bandwidth.

Coherence time is proportional or related to Doppler frequency shift or change. When IoT ranging device is moving with respect to the object in the smart environment or both IoT ranging device and the object are moving then the frequency of reflected signal from the object changes due to motion. The change in frequency is proportional to the approaching speed of the object towards the IoT ranging device. If the carrier frequency is Fc and approaching speed of object towards the IoT ranging device is V, then the Doppler shift Fd is:

$$Fd = V \cdot Fc / Vl,$$

where Vl is velocity of light in free space. The coherence time Tc is the time that the channel is approximately constant. Tc is related to Doppler shift by following equation.

$$Tc = (1/4)(1/Fd)$$

The ranging pattern for wireless sensor 970 (or IoT device 400, and 500 shown in FIGS. 4, 5) shown in FIG. 14A can have two different structures. In one structure the pattern comprises of the ranging pattern only. In a second structure the ranging pattern comprises of a synchronization (preamble) pattern followed by ranging pattern. In first structure ranging pattern is used for both synchronization and ranging. Using a synchronization pattern reduces resolution of detection. If the length of pattern is reduced, then probability of false detection increases. To increase the resolution without reducing the length of the ranging pattern higher channel bandwidth needs to be used. However, higher channel bandwidth requires higher carrier frequency, smaller delay spread and lower relative speed or approaching speed to avoid violation of coherence bandwidth and coherence time. Lower delay spread limits the radius of ranging and lower approaching speed or relative speed limits the speed objects can move in a smart environment.

One way to overcome the above problem is to convert the ranging pattern into smaller segments. The IoT ranging device or wireless sensor transmit each segment of ranging pattern signal then receives the reflected segment followed by transmission of the second segment and remaining segments like first segment. Depending on application one can use zero or more segments as synchronization (preamble) segment of ranging pattern.

Let us assume the maximum speed of moving object is 100 miles/hour, then every millisecond the object moves 4.5 centimeter. If two objects in smart environment moving towards each other with 100 miles/hour, then every millisecond they get closer about 9 centimeter and every 3 milliseconds around one foot. Therefore, if the two objects are 3 meters apart and their approaching speed towards each other is 200 miles/hour then they collide after 33 milliseconds. This time is sufficient for a navigation and protection system (NPS) to obtain required information data, to decide and to activate appropriate devices and functions to avoid a collision.

Let us assume the radius for ranging and monitoring (sending broadcast and Ethernet packets and receiving broadcast and Ethernet packets) is 3 meters. In this scenario IoT device is used for ranging and monitoring by moving objects (automobile, robots, etc.) and stationary objects in smart environment. If the IoT device is connected to external body of moving object and stationary object, then for a radius of 3 meters average delay spread should not exceed 4 nanoseconds (IoT device uses direction antenna with narrow radiation pattern to avoid higher delay spreads). IoT device ignores received signals (reflected, broadcast, Ethernet) that are from objects at a distance more than three meters by measuring the RSSI of a received signal and compare it with a table of RSSI versus distance or uses TOD of transmission and reception of ranging signal.

Four nanosecond delay spread corresponds to 250 MHz coherence bandwidths. If IoT device bandwidth is less than 250 MHz the channel only experiences flat fading across the channel bandwidth. This bandwidth corresponds to a symbol time of higher than 4 nanosecond or symbol rate of less than 250 Mega symbol per second. If IoT device uses QPSK (quadrature phase shift keying) modulation, then the bit rate should be less than 500 mega bits per second (Mbs).

Two hundred miles per hour relative or approaching speed for a carrier frequency of 1 GHz corresponds to 296 Hz Doppler Shift which results in a coherence time of 844 microseconds. When time slot 31 or 41 is used for both ranging and transmission of broadcast/Ethernet packet, 1 GHz carrier frequency is not high enough to provide an acceptable ranging resolution. An acceptable resolution (approximately 4 feet or 4 nanosecond) using a simple IoT ranging device requires a symbol time of approximately 4 nanosecond or a symbol rate of 250 MHz. Using QPSK modulation the 250 MHz channel supports 500 Mbs (mega bits per second). QPSK modulation also requires simple hardware and software at higher carrier frequency. Carrier frequencies that support channels with 250 MHz bandwidth should be from higher frequency band assigned to 5G, 6G, beyond 5G/6G and WiFi. Carrier frequency should not be extremely high to avoid lower coherence time.

A suitable frequency band for the time slot assigned to an IoT device that performs ranging and transmission of broadcast and Ethernet packet is 28 GH. The Doppler shift at 28 GHz is 296×28=8.288 KHz which results to 30 microsecond coherence time which is more than sufficient for a time slot. Therefore, for a 10 microseconds time slot that supports ranging, guard times and broadcast/Ethernet communication time, a 250 MHz channel bandwidth only experiences flat fading and does not change with time.

Since time of day (TOD) is obtained from an exactly accurate source one microsecond guard time is sufficient to avoid an overlap of time slots. The time assigned to ranging time could be as much as 2 microseconds. When 25 nanoseconds assigned to a complete transmission and reception of a symbol using QPSK, 2 microseconds ranging time supports 80 segments of 2 bits (one QPSK symbol). If ranging pattern is 20 bits, then during 2 microseconds ranging time 8 complete ranging can be performed. In summary:

Carrier frequency=28 GHz and
Relative speed or approaching speed=200 miles/hour
Results in a Doppler shift=8288 Hz or coherence time of 30 microsecond.
Delay spread=4 nanosecond results in a coherence bandwidth=250 MHz
Using QPSK, 250 MHz channel bandwidth supports 500 mega bits per second (Mbs).
Assigning 10 microseconds for each time slots allows for 300 independent time slots in 3 millisecond frame period to be used by 300 objects.

FIG. 14E depicts the duration of a time slot 41 used for ranging, communication (broadcast packets, Ethernet packets), and monitoring by the wireless sensor system 970 (or IoT device 400, and 500 shown in FIGS. 4, 5). The only difference between FIGS. 14E and 14D is that ranging is performed before end of time slot 41 and everything else is the same.

In another embodiment, wireless sensor system 970 (or IoT device 400, and 500 shown in FIGS. 4, 5) is aware of the absolute times and time slot durations (if time slot durations are different) assigned to all other wireless sensor systems 970 in its smart environment or operation frame.

In another embodiment, all wireless sensor systems 970 (or IoT device 400, and 500 shown in FIGS. 4, 5) in a smart environment are registered with one or more IoT networks (4G, 5G, 6G, 7G and beyond), WiFi networks or private networks that are linked and share (SOMC, and SD), control and manage the information (function, type, location, etc.) received from all wireless sensor systems 970.

For a navigation and protection system (NPS) to operate in all circumstances an artificial intelligent (AI) algorithm is used that receives information data from following source:
1. All internal sensors used by an object.
2. Wireless sensors, Radars, Image sensors, Lidars, laser, and ultrasonic sensors that perform ranging to provide a distance between two objects.

3. Image sensors that provide the same information as wireless sensor as well as image identification of the objects.
4. IoT devices that in conjunction with IoT network provide a distance and an approaching speed of the two objects towards each other using time of day (TOD) time stamps.

AI algorithm requires information data from at least three of the above sources to be able to decide. Having access to more than three sources results in a more accurate decision and better support for navigation and activating the most effective devices within protection system.

Figure 14F:
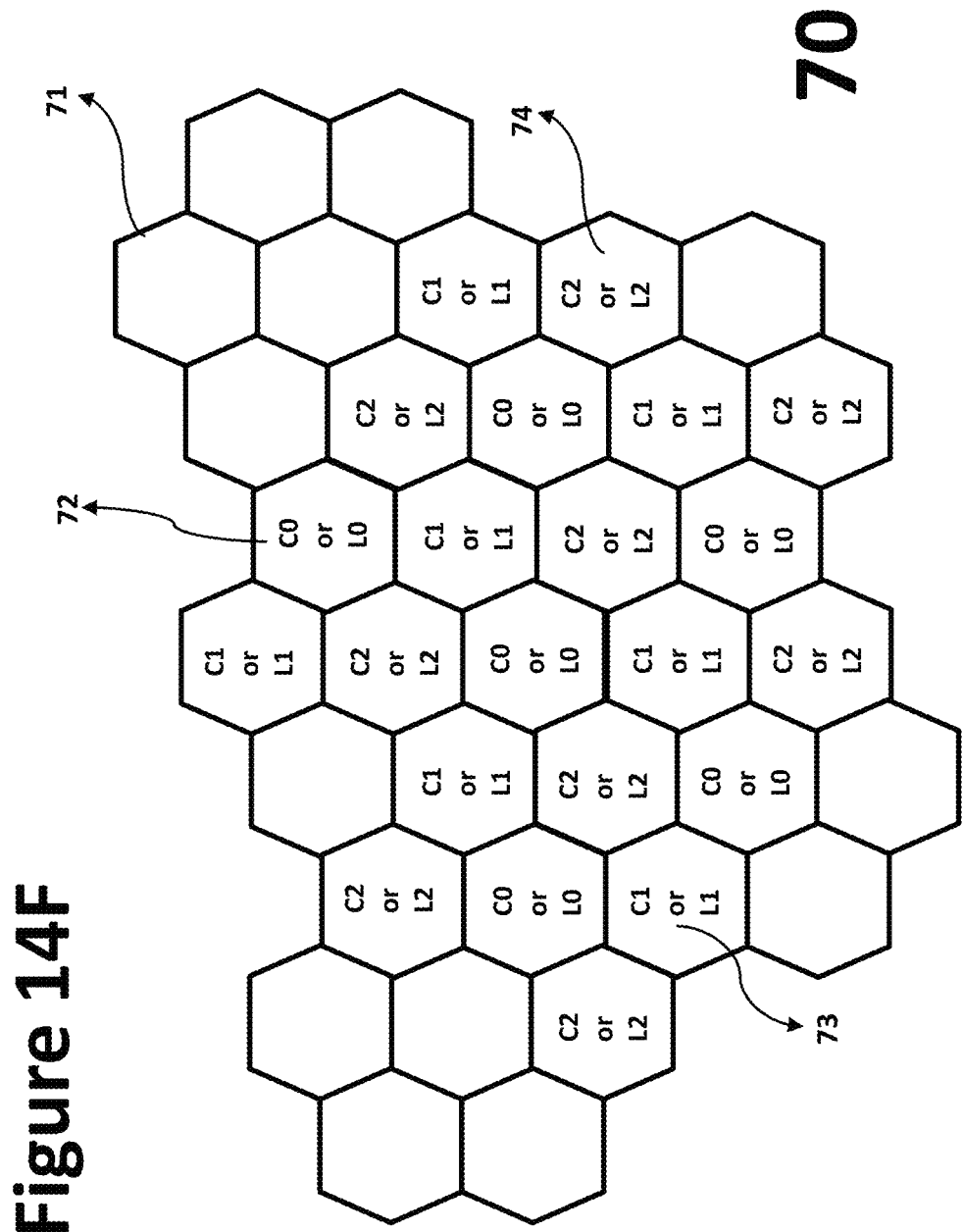
FIG. 14F shows a cell planning for an object control system OCS used by an IoT network.
Figure 15A:
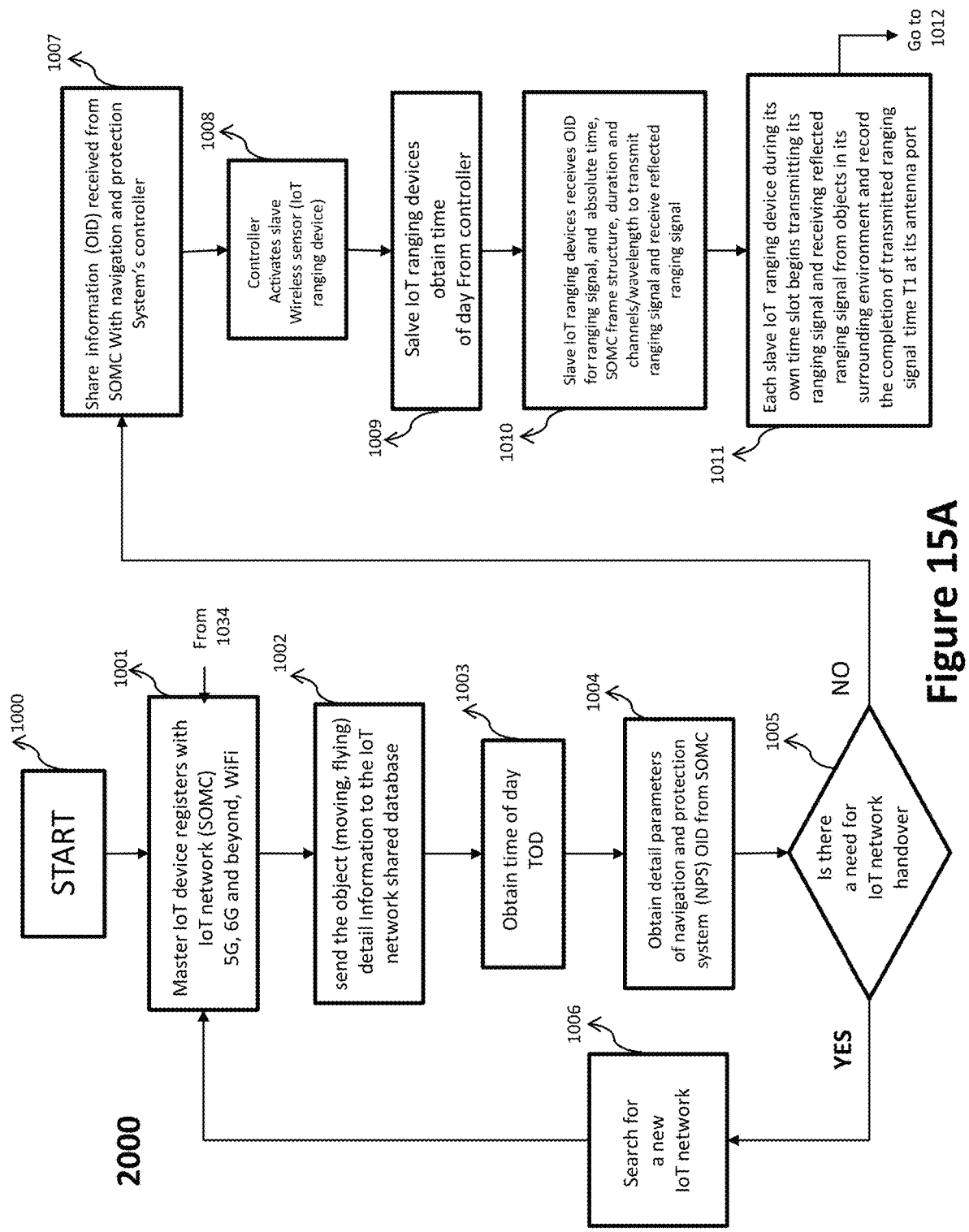
FIGS. 15A, 15B, 15C, and 15D depict the process steps to calculate environmental parameters.
Figure 15B:
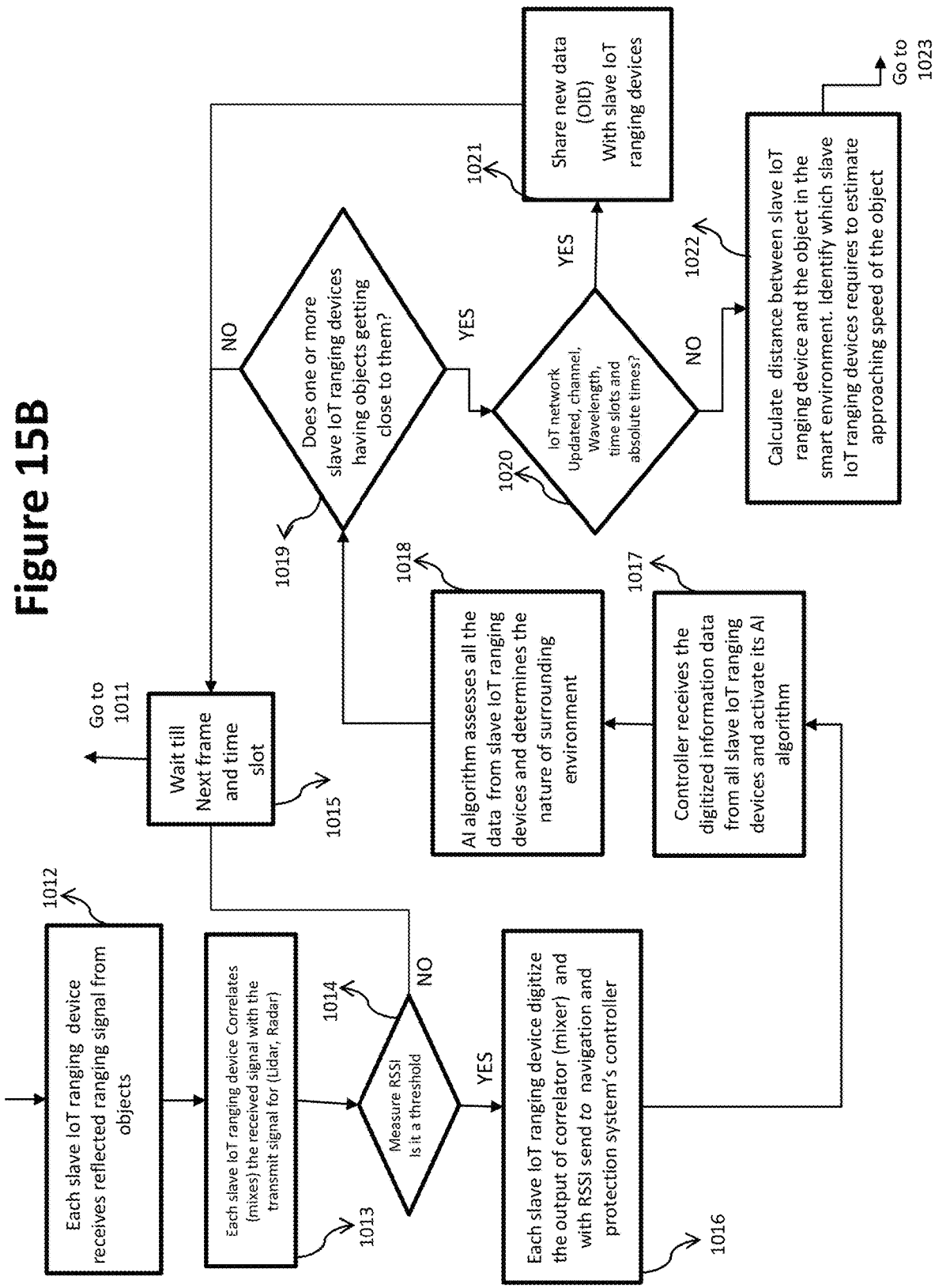
Figure 15C:
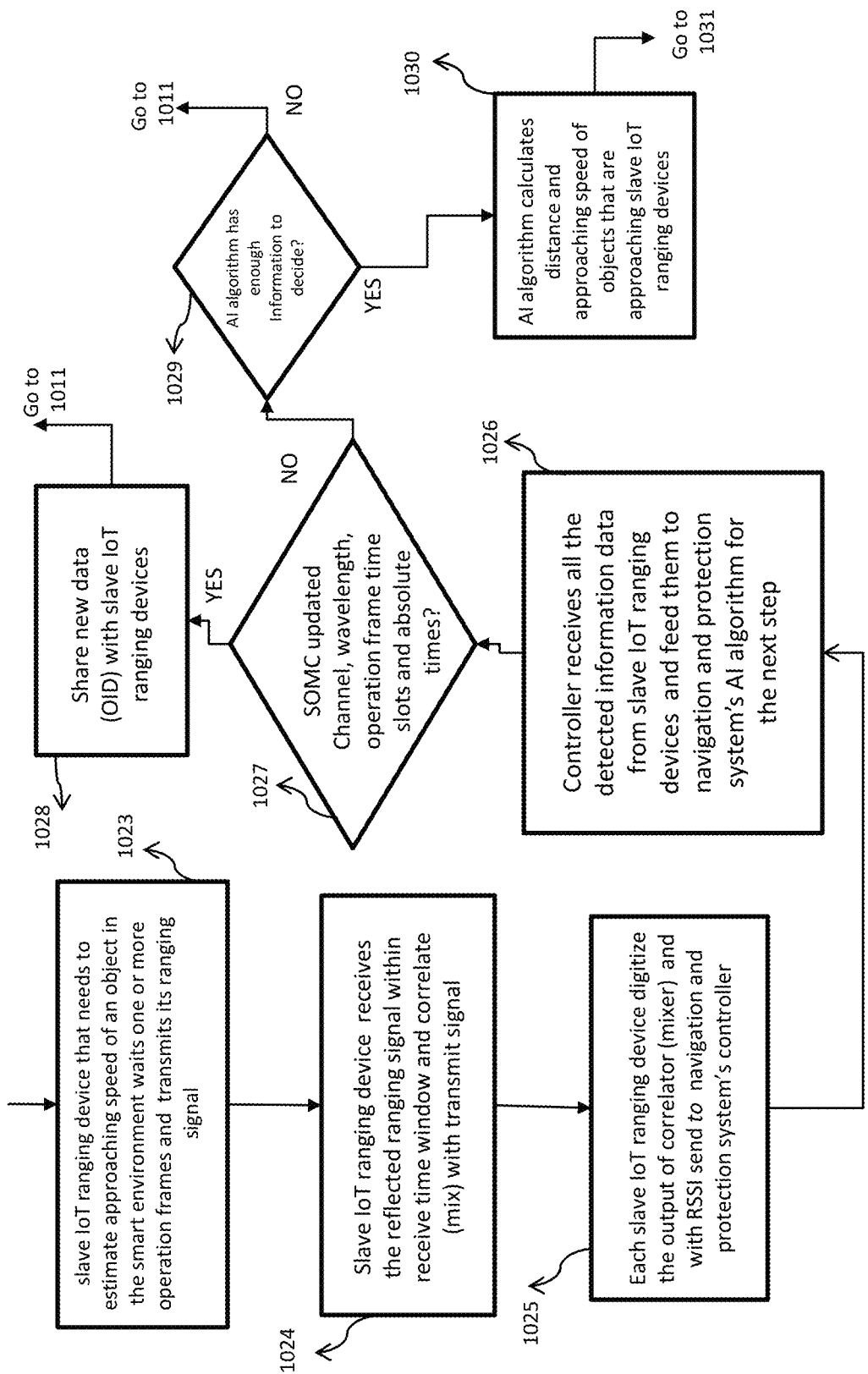
Figure 15D:
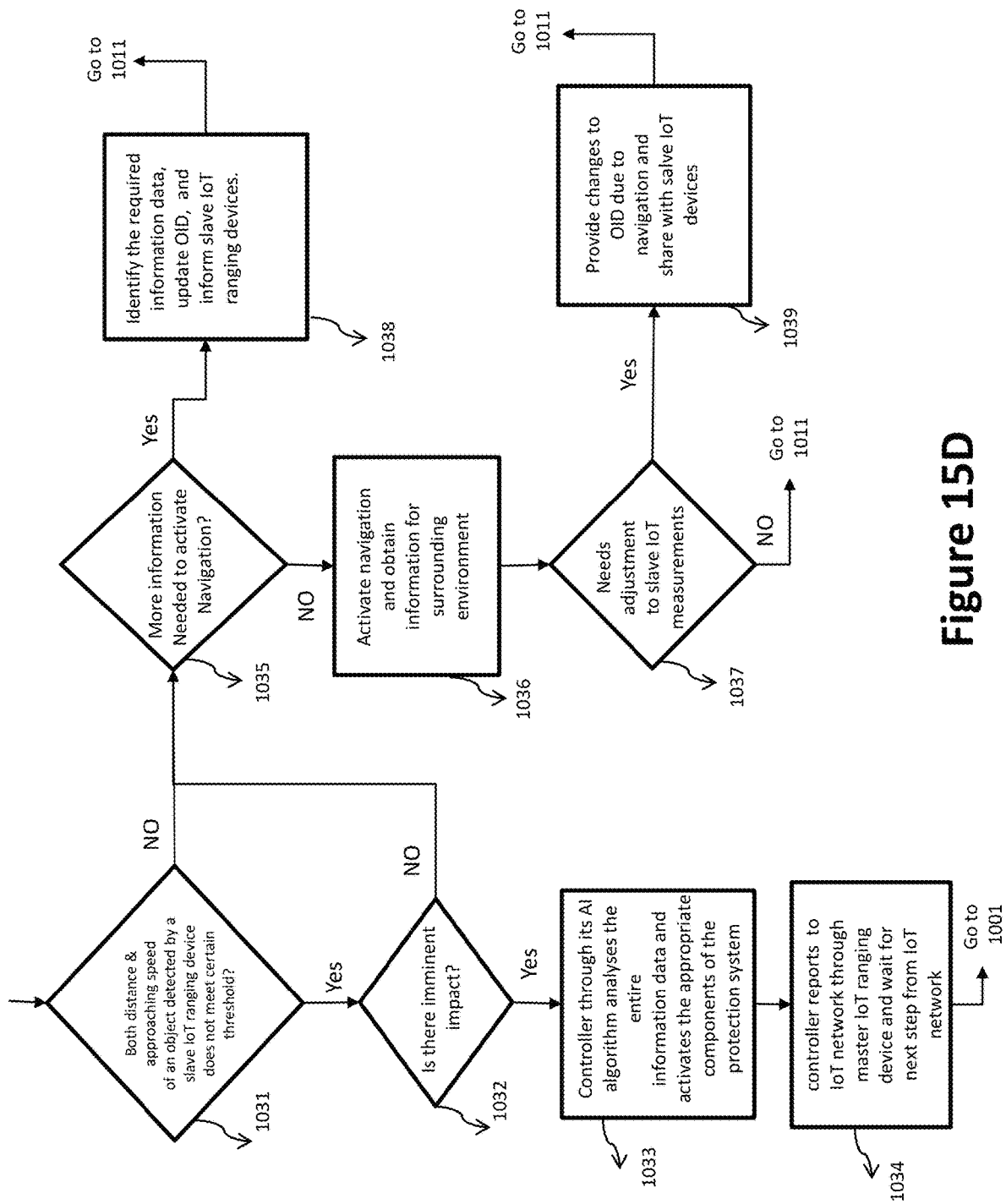

FIG. 14F shows cell planning 70 for object control system OCS used by IoT network. Cell planning 70 shows hexagonal cells 71 but other cell shapes can also be used. Cell planning 70 shows three channels/wavelengths. These three channels/wavelengths C0/L0 (72), C1/L1 (73), and C2/L2 (74) are reused to cover the entire IoT network coverage. The channel (C0, C1, and C2) bandwidth depends on the frequency band in the frequency spectrum. These channels are used for ranging, broadcasting, communication using Ethernet packets, monitoring, data collecting and other functions. Channel bandwidth and center frequency must meet the requirements of the coherence bandwidth and coherence time. It is always possible to have other channel planning and cell planning. In case of LIDAR, Laser, or infrared L0, L1, and L2 that are the wavelength of the wave is used.

The terrain map of the cells, critical peripheral coordinates, location coordinates of import objects (buildings with height, stationary objects like traffic lights, junctions, roundabout, different turns, tunnels, mountains, valleys, river, sea, lake, exits, construction work, closed road, one way or two ways roads, direction of traffic, type of roads, streets, lanes, etc.), and information about any critical object in a cell is stored in the SD to be used by SOMC of OCS.

A moving object at regular times updates its location coordinates in SD. Location coordinates is obtained by a simple low-cost GPS receiver and a master IoT device used by the object sends it to SD regularly. GPS receiver can update the location coordinates from as low as every 50 milliseconds to one second depending on complexity of GPS receiver. A moving object through its master IoT device updates its location coordinates in SD.

The cells are assigned an operation frame structure shown in FIG. 14C. The structure and duration of the operation frame can be the same for all cells. The best approach is to have operation frames with the same duration for all cells. This way only the structure of the frame is tailored to the cells. And in the structure of operation frame the only thing that may be different is duration of time slots assigned to various moving objects. If all moving objects, follow a requirement for their specification defined by standard, then all time slots will have the same duration and structure. Therefore, SOMC can use identical operation frames for all cells in OCS.

The start time of the operation frame shown in FIG. 14C is set by a specific TOD for all cells and cell's channels/wavelengths (C0/L0, C1/L1, and C2/L2). Since the duration of operation frame does not change then SOMC assigns absolute TOD for every time slot to be used by moving objects. The absolute time is assigned based on the start TOD of the operation frame and the number of frames already passed the start TOD. Once a moving object knows its absolute time, from duration of the operation frame it can calculate its next time slots, and this continues even when a moving object moves from one cell to neighboring cell with a new channel/wavelength (for example moving from C0/L0 to C2/L2). The timing of everything stays the same (when a moving object in its new cell changes its operating channel/wavelength) and the object still uses the same absolute time and time slot that was given to it by SOMC at the start of its operation.

Three issues need to be discussed here. First is time of day TOD and how it is obtained. TOD is based on coordinated universal time UTC that is provided by satellite to GPS receivers. This time is used by various objects for different applications. In data communication system some components of the system use GPS and directly obtain the TOD. It is also possible to centralize the GPS receiver and through a master port propagate this time of day through data communication network using IEEE1588 protocol. So, what happens if something goes wrong with the satellites or GPS receiver? GPS receiver that produces TOD uses an oven control crystal oscillator or rubidium clock. These two clocks are very stable and easily can have hold over time up to 24 hours or even more.

Second is the transition of a moving object from one cell to a neighboring cell. Question is how a moving object detects if it has transitioned to the neighboring cell? SOMC has knowledge of the location coordinates of each moving object that is updated every second or less. Moving object using its low-cost GPS receiver obtains the location coordinates and sends it to SD through its master IoT device. Therefore, SOMC will inform the moving object through the operation information data OID that it has transitioned to a new cell (SD has the coordinates of peripheral of each cell) and the channel it needs to use during its time slot.

The third issue is the location coordinates of a moving object when GPS receiver loses the satellites or cannot see 4 satellites (problem with satellites, satellites not in operation, or satellite is blocked) to be able to calculate the location coordinates. This is an issue during transition to a new cell by a moving objet. One solution is for moving object NPS to ask its slave IoT devices to detect all three channels/wavelengths (C0, C1, C2, L0, L1, and L2) until the problem goes away. A second solution is to switch to manual operation until the problem is resolved.

In case of flying object, the same operation frame shown in FIG. 14C can be used and some time slots can be assigned to flying objects. This way interference in OCS is eliminated. The flying objects before reaching the desirable and assigned elevation by SOMC may use the same channels and wavelengths SOMC assigned to terrestrial moving objects and when they reach to assigned elevation use the same channels and wavelengths but in a larger cell structure shown in FIG. 6.

Flying objects may also have their own operation frame and channels/wavelength assigned to them by SOMC. In this scenario during takeoff and landing they may need to switch to terrestrial operation frame and channels/wavelengths.

Finally, when moving objects like an automobile is parked on the street it is considered as a stationary object and it can either turn its NPS off or leave it on. If the NPS is left on, then the slave IoT devices that are facing the street function and the automobile still uses the terrestrial operation frame and time slot assigned to it. Solar power may be used when the automobile is parked on the street to preserve the battery.

FIGS. 15A through 15D depict an embodiment of a process 2000 for using an IoT device (wireless sensor system 970 or IoT device 400 and 500, Radar, Lidar, ultrasonic sensor, and laser) by an object to estimate and calculate environmental parameters. The distance can be measured accurately if the IoT device (wireless sensor system 970 or IoT device 400 and 500, Radar, ultrasonic sensor, laser, and Lidar) operates in an environment that have low average delay spread or high coherence bandwidth. Therefore, the process 2000 requires to limits its ranging radius for low average delay spread. Average delay spread depends on the ranging distance and elevation of the IoT ranging device from the ground. As explained before for moving objects like automobiles, trucks, robots, and stationary objects 3 meters ranging radius and an elevation of less than 2 meters results in an average delay spread of 4 nanoseconds (frequency modulated ranging signals are exempt). This average delay spread allows the IoT ranging device uses a ranging signal with approximately 250 MHz bandwidth. Higher bandwidth results in higher ranging resolution. However, higher bandwidth requires higher carrier frequency which needs lower delay spread to avoid inter symbol interference (ISI). Therefore, for an optimum solution ranging radius, average delay spread, ranging signal bandwidth, relative speed of two objects and carrier frequency need to be considered and chosen for best and reliable operation. In cases FMCW (frequency modulation constant wave) RADAR and LIDAR the ISI is avoided but doppler shift can be a parameter to consider.

One parameter that may be useful for the IoT ranging device is the receive signal strength intensity (RSSI). IoT ranging device's receiver measures the RSSI and Tr (the time-of-day TOD the reflected signal with highest RSSI arrived) of received reflected ranging signal after the completion of transmission of ranging signal at time-of-day Ts. If Tr–Ts (which is proportional to distance between IoT ranging device and the object) is within the ranging radius then the signal is detected.

In various embodiments, the process 2000 is carried out by controller (central) processing unit (CPU) and electrical circuit under the control of a processes or executable instructions. The readable and executable instructions reside, for example, in a data storage medium such as processor usable volatile and non-volatile memory. However, the readable and executable instructions may reside in any type of processor readable storage medium. In some embodiments, the process 2000 is performed at least by one of the circuits described herein.

A moving or flying object may use multiple IoT devices (wireless sensor system 970 or IoT device 400 and 500, Radar, ultrasonic sensor, laser, and Lidar) as shown in FIG. 11 to monitor its surrounding environment as well as other sensors and monitoring devices that are used internal or external to the object. In this case IoT device 904 acts as a master and is used to communicate, register, receives information data, transmit information data, obtain time of day (TOD) and synchronize to an IoT wireless network (4G, 5G, 6G, 7G, and WiFi). The master IoT device 904 also shares the operation information data (OID) it receives from the IoT network with other slave IoT devices, wireless sensors, ranging devices, and monitoring devices (901$_1$ to 901$_j$) through controller of object's NPS. All IoT devices including the master IoT device monitor the surrounding environment of the object and participate in identifying if a received signal meets the requirements for detection.

The object's navigation and protection system's (NPS's) operation process 2000 is activated at start 1000. The object's NPS shown in FIG. 11 comprises of a controller processing unit (CPU), a master IoT device, a plurality of slave IoT devices (Radar, Lidar, ranging IoT device, laser, ultrasonic), other internal and external sensors, monitoring devices, protection devices such as multilayer airbags, compressed air tank with multiple outlets, expandable pads, and navigation devices (steering wheel, accelerator, break, alarm, horn, high beam light etc.). In addition to IoT ranging device mentioned earlier other key sensors are Lidar (light detection and ranging), Radar (radio detection and ranging), wireless sensors for ranging, ultrasonic sensors, laser, and image sensors for ranging and identification of objects in the smart environment.

At 1001 the master IoT device registers with one of the available wireless 5G, beyond 5G, 6G and beyond or WiFi IoT network. The master IoT device can have an account with all the operators that support IoT network or use roaming to be always connected. All IoT networks from different service providers or operators share the same database (SD) and operation and management center (SOMC) for the NPS's operation process 2000. The master IoT device after registering with IoT network shares its location coordinates, and detail information (type, model, dimensions, capabilities, function, specification, etc.) of the object to be stored in SD in the cloud. The shared operation and management center (SOMC) uses the stored location coordinates of the master IoT devices used by NPSs (regularly updated in the SD) and shares the SOMC's operation frame details (structure, duration, channels/wavelengths explained in FIGS. 14C and 14F) with master IoT device 904 with an assigned absolute time and a time slot within SOMC's operation frame. The master IoT device shares the SOMC's operation frame details with the controller used by object's NPS. The controller shares the data which is OID with all slave IoT devices (Radars, Lidar, wireless sensors, image sensor, laser, and ultrasonic sensors) used by NPS. If the time slot duration is identical for all master IoT devices then each NPS needs its own assigned time slot, absolute time, and number of time slots within SOMC's operation frame. If the time slot duration is different for master IoT devices or NPSs then each NPS may need to have all absolute times and the time slot durations assigned to all master IoT devices or NPSs in the smart environment. NPS from operation frame duration calculates the start (absolute time) of its time slot in next operation frame. In addition to absolute times and time slots for different activities, SOMC assigns a frequency, a channel, a wavelength, a bandwidth, a modulation method, and an effective radiation power (ERP) to the NPSs based on their location coordinate. The ERP assigned to NPS is for the slave IoT devices used by NSP. Master IoT device uses an ERP for communication with IoT network specified by the standard body. In general, SOMC through master IoT device of NPS controls all activities of slave IoT devices (Radar, ultrasonic, Lidar, IoT ranging device) used by NPS. Both shared database and SOMC are in a cloud used by all operators and service providers (IoT networks) through an open interface. The slave IoT devices in process 2000 perform ranging function. Shared database SD and SOMC are updated on regular time interval specified by SOMC. The update information is provided by master IoT device of each object (moving, flying, and stationary) in smart environment. SOMC has divided the entire environment to sub-environment (cell) with specified area (triangular, square, hexagonal, and other shapes). Each cell is a smart environment. SOMC manages all the cells and the objects within them. The management is two ways. Objects through their master IoT devices send their information data explained above to SOMC. SOMC provide every object with OID that was explained earlier and has information data used by NPS for navigation and protection of the object. SOMC monitors the movement of each object by receiving information data from its master IoT device and based on its location and the cell (smart environment) provides an updated OID. Therefore, in a smart environment navigation and protection of an object is controlled by both SOMC and object's NPS. In other words, NPS of an object is slave to SOMC that acts as master controller.

An object in smart environment only uses its NPS when all the devices used by NPS are correctly operating and there is proper communication between the object and SOMC for exchange of information data. If SOMC identifies an object's NPS in a cell (smart environment) does not fully meet all the requirements, then that object is prohibited to use NPS for navigation and the object must use other methods. This needs to be standardizing in order all objects that want to operate in a smart environment meet all requirements of standard.

At 1002 the master IoT device that belongs to a moving, a flying and a stationary object share the information data of their NPS with the IoT network to be stored in the shared database SD used by the SOMC. The information data consists of the master IoT device's location coordinates, the specification of the slave IoT devices (operating spectrum, operating bandwidth, supported wavelength, supported modulations, ERP capability, etc.), type of the object, function of the object, specification (including dimensions) of the object, and status of the object (traffic light color). The master IoT device and slave IoT devices require having a minimum specification for the object to use its NPS.

At 1003 the master IoT device of NPS obtains the time of day (TOD). The TOD can be obtained from the IoT network (using one of IEEE1588 PTP, unused subcarriers, cyclic prefix), or GPS (Global Positioning System) receiver. TOD can also be obtained from another master IoT device in proximity within the smart environment using protocol explained in FIG. 10C.

At 1004 master IoT device obtains detail operation information data (OID) for the NPS from SOMC through wireless IoT network. The OID includes frequency, channel, wavelength, modulation, ERP, absolute times (start of time slots), time slot duration for all objects in the smart environment, and duration and structure of SOMC's operation frame. The start time is a microsecond within millisecond ($1^{st}$, $K_{th}$, $N_{th}$, etc.). Time slot's duration is the time window assigned to each object for various activities (sensing, ranging, communication, broadcasting, etc.).

At 1005 master IoT device evaluates if it needs to perform a handover to another of its own IoT network's gNodeB/eNodeB, (WiFi router) or to roam to another IoT network. If it requires performing handover or roaming, then it goes to 1006.

At 1006 master IoT device search for a new eNodeB/gNodeB, or (WiFi router) from its own service provider or another service provider to handover or roam. Once the handover or roaming is completed it goes to 1001 or 1002 depending on circumstances.

At 1007 master IoT device shares the OID received from SOMC through the IoT network with NPS's controller. Then controller at 1008 activates slave IoT devices (wireless sensor, Radar sensor, LIDAR sensor, Image sensor, ultrasonic sensor, and other sensors/devices).

At 1009 slave IoT devices obtain OID which includes the time of day (TOD) from NPS's controller. The TOD is the same as master IoT device TOD and is exchanged between controller and slave IoT devices using IEEE1588 PTP messages. Slave IoT devices after synchronizing with master IoT device or controller and obtaining TOD continue at 1010.

At 1010 slave IoT devices or/and master IoT device receive all parameters, information for ranging, and all the absolute times for the time slots (OID) assigned to various objects in the smart environment. The absolute time is the start of time slot or time window and is a microsecond within millisecond. The time slot or time window shows the time that assigned to the slave or/and the master IoT devices for receiving or transmitting a broadcast or an Ethernet packet, ranging using RADAR or LIDAR, ranging using an IoT ranging device (wireless sensor, IoT device 400, and 500), ultrasonic sensor and ranging using image sensor. All slave IoT devices or/and master IoT device within the NPS use their own time slot within SOMC's operation frame to transmit broadcast or Ethernet packets and time slots assigned to other NPSs to receive broadcast packets and receive or transmit Ethernet packets. Time slot also is used for ranging using at least one of an IoT ranging device, a RADAR, an Image sensor, a LIDAR, and ultrasonic sensor.

At 2011 all slave IoT ranging devices or/and master IoT ranging device (IoT ranging device can also be a RADAR, LIDAR, an image sensor/camera, and an ultrasonic sensor that belong to the object's NPS) begin to perform ranging during the time slot assigned to the object's NPS.

Each slave IoT ranging device during its own time slot begins transmitting ranging signal. As mentioned above during the ranging time within the time slot the object can use one or more ranging devices (Radar sensor, Lidar sensor, ultrasonic sensor, image sensor, and IoT ranging). IoT ranging, Radar ranging, Lidar sensing, and ultrasonic ranging can be performed at the same time assigned for ranging or at any time during the time slot. In process 2000 FMCW Radar and Lidar that transmit a chirp signal are considered. The chirp signal reflects from an object in the smart environment.

At 1012 Each slave IoT ranging device receives reflected ranging chirp signal from objects and at 1013 mixes it with transmit chirp signal to produce an IF (Intermediate Frequency) signal. IF signal is used to measure RSSI.

At 1014 slave IoT ranging device decides if the RSSI is within acceptable range. If RSSI is not within acceptable range, then at 1015 slave IoT ranging device waits until the next operation frame and process 2000 continues at 1011.

At 1016 each slave IoT ranging device digitizes the output of mixer and sends it with RSSI to navigation and protection system's controller.

At 1017 controller receives the digitized information data from all slave IoT ranging devices and activate its AI algorithm. At 1018 AI algorithm assesses all the data from slave IoT ranging devices and determines the nature of surrounding environment.

At 1019 AI algorithm checks if one or more slave IoT ranging devices having objects getting close to them. If the answer is negative, then the process 2000 continues at 1015.

At 1020 NPS checks if SOMC has updated operation frame, channel, Wavelength, time slots, or absolute time. If the answer is positive, then at 1021 NPS through controller shares new data (OID) with slave IoT ranging devices and continues at 1015.

At 1022 AI algorithm calculates the distance between slave IoT ranging device and the object in the smart environment and identifies which slave IoT ranging device requires to estimate approaching speed of the object.

At 1023 slave IoT ranging devices that need to estimate approaching speed of an object in the smart environment wait one or more operation frames and then transmit their ranging signal. At 1024 slave IoT ranging devices receive the reflected ranging signal and mix it with transmit signal.

At 1025 each slave IoT ranging device digitize the output of mixer and with RSSI send to navigation and protection system's controller. At 1026 controller receives all the detected and digitized information data from slave IoT ranging devices and feed them to NPS's AI algorithm for the next step.

At 1027 NPS checks if SOMC has updated operation frame, channel, wavelength, time slots or absolute times. If the answer is positive, then at 1028 NPS shares new data (OID) with slave IoT ranging devices and process 2000 continues at 1011.

At 1029 AI algorithm assesses whether there is sufficient information to decide the next step. If the answer is negative process 2000 continues at 1011. At 1030 AI algorithm calculates distance and approaching speed of objects that are approaching slave IoT ranging devices.

At 1031 the AI algorithm examines if both distance & approaching speed of an object detected by a slave IoT ranging device (Radar, Lidar, ultrasonic, or image sensors if any used) meet certain threshold. If it does not meet, then the process continues at 1035.

At 1032 the AI algorithm checks if there is an imminent impact. If there is not, then the process continues at 1035.

At 1033 the AI algorithm analyses the entire detected information data (DID) and activates the appropriate protection devices.

At 1034 the AI algorithm through NPS's controller, maser IoT device and IoT network reports to SOMC, then NPS waits for next step from SOMC. At this point when it is appropriate the NPS resets and at the right time start process 2000 at 1001.

At 1035 the AI algorithm determines whether more information is needed to activate navigation devices such as steering wheel, break, accelerator, etc. If DID is not enough to decide, then process 2000 continues at 1038.

At 1038 the AI algorithms identifies the necessary operation information data (OID) for each slave IoT (Radar, Lidar, ultrasonic, or image sensors if any used) ranging device and sends it to them through controller. Once each individual slave IoT ranging device (Radar, Lidar, ultrasonic, or image sensors if any used) or master IoT device is provided with its new OID then the process continues at 1011.

At 1036 due to sufficient information for AI algorithm, navigation system is activated and more information data from surrounding environment is collected by other internal and external sensors used by NPS for the AI algorithm. AI algorithm uses all the detected information data (DID) and provides required changes to various navigation devices such as steering wheel, break, accelerator, etc.

At 1037 AI algorithm determines if there are any changes to the OID for each individual IoT ranging device (Radar, Lidar, ultrasonic, or image sensors if any used) due to activating navigation. If there are not any changes then process 2000 continues at 1011.

At 1039 AI algorithm sends the updated OID to each IoT ranging device (Radar, Lidar, ultrasonic, or image sensors if any used) through controller and the process 2000 continues at 1011.

Various embodiments are thus described. While embodiments have been described, it should be appreciated that the embodiments should not be construed as limited by such description, but rather construed according to the following claims.

The invention claimed is:

1. An object control system (OCS) to control movement of an object in a smart environment comprising:
   a shared database (SD) and a shared operation management center (SOMC) that uses an information data stored in said SD to provide an operation information data (OID);
   said SD and said SOMC are virtualized in a cloud;
   a navigation and protection system (NPS) that resides in said object;
   said NPS uses a master Internet of Things (IoT) device to communicate with said SD through an IoT network to store said information data that includes at least one of a specification of the NPS, and a regularly updated location coordinate of the NPS and obtains said OID from said SOMC to:
   perform a ranging of said objects in said smart environment;
   assess a result of said ranging;
   activate a protection device when an impact is imminent; or
   activate a navigation device to avoid the impact.

2. The OCS of claim 1, wherein the NPS comprises of said master IoT device, a plurality of slave IoT ranging devices and a controller processing unit (CPU) with an artificial intelligent (AI) algorithm.

3. The OCS of claim 2, further said master IoT device registers with said IoT network at power up.

4. The OCS of claim 2, wherein said NPS uses said plurality of slave IoT ranging devices to perform ranging of the objects in said smart environment and obtain a detected information data (DID).

5. The OCS of claim 4, further a slave IoT ranging device within said plurality of slave IoT ranging devices uses said OID to transmit a ranging signal, receive a reflected ranging signal from the objects in said smart environment, and retrieve said DID from said reflected ranging signal.

6. The OCS of claim 5, wherein said NPS uses said controller processing unit (CPU) to execute said AI algorithm that uses said OID and said DID to assess the smart environment's parameters, activate said protection device used by said NPS when said impact is imminent, activate said navigation device to avoid the impact, or update the OID and send it to the slave IoT ranging device through said CPU.

7. The OCS of claim 5, wherein said ranging signal is at least one of a FMCW (frequency modulated continue wave) signal, a continuous wave (CW) signal, a pulsed signal (used by time-of-flight ToF), a Laser signal, a ranging pattern, and a broadcast or/and an Ethernet packet.

8. The OCS of claim 5, wherein said slave IoT ranging device is at least one of a wireless sensor, a RADAR (Radio Detection and Ranging), a LIDAR (Light Detection and Ranging), an image sensor, an ultrasonic sensor, and an IoT ranging.

9. The OCS of claim 1, further said master IoT device communicates with said IoT network to obtain a time of day (TOD).

10. The OCS of claim 9, wherein the OID includes at least one of an operation frame, an absolute time that is derived from the TOD, and a time slot.

11. The OCS of claim 10, further said absolute time indicates the TOD said time slot in said operation frame begins.

12. The OCS of claim 10, wherein said absolute time is said TOD that includes at least one of a first microsecond in a millisecond, a $K_{th}$ microsecond in a millisecond, and a $N_{th}$ microsecond in a millisecond.

13. The OCS of claim 10, wherein said time slot is used for at least one of ranging, broadcasting, and communication with another said slave IoT ranging device.

14. The OCS of claim 10, further said OID also includes at least one of a detail structures of said operation frame, an operating frequency, a channel, a wavelength, a bandwidth, a modulation, and an effective radiation power (ERP).

15. The OCS of claim 1, wherein said object is at least one of a moving vehicle, a flying vehicle, a stationary object, a robot, and a live animal (human).

16. The OCS of claim 1, wherein said IoT network is at least one of a fifth generation (5G) wireless network, a sixth generation (6G) wireless network, a seventh generation (7G) wireless network, a beyond 5G network, a WiFi (wireless fidelity) network, and a private wireless network.

17. A method for controlling movement of an object in a smart environment, the method comprising:
    storing an information data of the object in a shared database (SD) that is virtualized in a cloud;
    visualizing a shared operation management center (SOMC) in said cloud to be used by said objects;
    installing a navigation and protection system (NPS) on the body of said object to:
    obtain a time of day (TOD) from an Internet of Things (IoT) Network using a master IoT device;
    communicate with the SD and the SOMC using said master IoT device through the IoT network to exchange said information data;
    obtain an operation information data (OID) from said SOMC;
    retrieve an operation frame from said OID that includes an absolute time and a time slot for the NPS;
    monitor the smart environment by a slave IoT ranging device;
    obtain a detected information data (DID) from said IoT ranging device that transmits a ranging signal and receives a reflected ranging signal during said time slot; and
    use an algorithm within the NPS's controller processing unit (CPU) to:
    process said detected information data (DID) including information from all the NPS's sensors or devices;
    estimate a distance and an approaching speed of said objects in the smart environment using the DID provided by the salve IoT ranging devices;
    detect an imminent impact and then activate a protection device; or
    activate a navigation device if a potential impact is detected.

18. The method of claim 17, wherein said IoT ranging devices, and the protection devices are mounted on external locations of a body of the object.

19. The method of claim 17, wherein said protection device is at least one of a multilayer airbag, a compressed air, and an expandable pad.

20. The method of claim 17, wherein said navigation device is at least one of a steering wheel, an accelerator, a break, a horn, and a beam light.

* * * * *